US012527672B2

(12) United States Patent
Benning

(10) Patent No.: US 12,527,672 B2
(45) Date of Patent: Jan. 20, 2026

(54) PROSTHETIC DIGITS AND ACTUATORS

(71) Applicant: Touch Bionics Limited, Livingston (GB)

(72) Inventor: Matthew James Benning, Livingston (GB)

(73) Assignee: Touch Bionics Limited, Livingston (GB)

( * ) Notice: Subject to any disclaimer, the term of this patent is extended or adjusted under 35 U.S.C. 154(b) by 907 days.

(21) Appl. No.: 17/760,742

(22) PCT Filed: Sep. 17, 2020

(86) PCT No.: PCT/IB2020/058643
§ 371 (c)(1),
(2) Date: Mar. 15, 2022

(87) PCT Pub. No.: WO2021/053557
PCT Pub. Date: Mar. 25, 2021

(65) Prior Publication Data
US 2022/0339009 A1 Oct. 27, 2022

Related U.S. Application Data

(60) Provisional application No. 62/902,227, filed on Sep. 18, 2019.

(51) Int. Cl.
A61F 2/58 (2006.01)
A61F 2/50 (2006.01)
A61F 2/70 (2006.01)

(52) U.S. Cl.
CPC ...... A61F 2/586 (2013.01); A61F 2002/5043 (2013.01); A61F 2002/5072 (2013.01); A61F 2002/701 (2013.01)

(58) Field of Classification Search
CPC ............. A61F 2/586; A61F 2002/5043; A61F 2002/5072; A61F 2002/701; A61F 2/583;
(Continued)

(56) References Cited

U.S. PATENT DOCUMENTS 760,102 A 5/1904 Carnes
1,253,823 A 1/1918 Hobbs
(Continued)

FOREIGN PATENT DOCUMENTS

CN 1803413 7/2006
CN 100 336 639 9/2007
(Continued)

OTHER PUBLICATIONS

"Axon-Bus Prosthetic System" User Manual, Ottobock, Apr. 15, 2021, 308 pages. (English translation on pp. 24-46).
(Continued)

Primary Examiner — Bruce E Snow
(74) Attorney, Agent, or Firm — Knobbe, Martens, Olson & Bear, LLP

(57) ABSTRACT

Features for prosthetic digits and actuation systems including transmission features for a worm wheel rotation by a lead screw. A keyed member such as a central axle is spring-biased and transmits rotation from the worm wheel to the digit while allowing for manual rotation of the digit without damaging the worm wheel or other components. In some embodiments, the digit may include a link having flexibility to cause rotation of the digit segments while absorbing shock or otherwise high rotational loads. The digit may include a single-sided drive mechanism, where the opposite side provides support in case of high lateral loads. The digit may include a motor and gearbox in parallel and connected mechanically via a transfer gearbox. The digit may include a variable speed and variable torque gearbox.

24 Claims, 56 Drawing Sheets

(58) Field of Classification Search
CPC ...... A61F 2002/5038; A61F 2002/6827; A61F 2002/6836
See application file for complete search history.

(56) References Cited

U.S. PATENT DOCUMENTS

| | | |
|---|---|---|
| 1,507,683 A | 9/1924 | Pecorella et al. |
| 2,445,711 A | 7/1948 | Fitch |
| 2,477,463 A | 7/1949 | Otterman |
| 2,549,716 A | 4/1951 | Simpson |
| 2,586,293 A | 2/1952 | Birkigt |
| 2,592,842 A | 4/1952 | Alderson |
| 2,669,727 A | 2/1954 | Opuszenski |
| 2,983,162 A | 5/1961 | Musser |
| 3,509,583 A | 5/1970 | Fraioli |
| 3,582,857 A | 6/1971 | Kishel |
| 3,641,832 A | 2/1972 | Shigeta et al. |
| 3,683,423 A | 8/1972 | Crapanzano |
| 3,700,845 A | 10/1972 | Jonsson |
| 3,751,995 A | 8/1973 | Carlson |
| 3,837,010 A | 9/1974 | Prout |
| 3,866,246 A | 2/1975 | Seamone et al. |
| 3,883,900 A | 5/1975 | Jerard et al. |
| 3,922,930 A | 12/1975 | Fletcher et al. |
| 3,983,986 A | 10/1976 | Allard |
| 4,044,274 A | 8/1977 | Ohm |
| 4,084,267 A | 4/1978 | Zadina |
| 4,094,016 A | 6/1978 | Eroyan |
| 4,114,464 A | 9/1978 | Schubert et al. |
| 4,332,038 A | 6/1982 | Freeland |
| 4,398,110 A | 8/1983 | Flinchbaugh et al. |
| 4,558,704 A | 12/1985 | Petrofsky |
| 4,565,457 A | 1/1986 | Flander |
| 4,577,127 A | 3/1986 | Ferree et al. |
| 4,623,354 A | 11/1986 | Childress et al. |
| 4,660,702 A | 4/1987 | Flotow |
| 4,678,952 A | 7/1987 | Peterson et al. |
| 4,808,187 A | 2/1989 | Patterson et al. |
| 4,813,303 A | 3/1989 | Beezer et al. |
| 4,822,238 A | 4/1989 | Kwech |
| 4,946,380 A | 8/1990 | Lee |
| 4,955,918 A | 9/1990 | Lee |
| 4,957,320 A | 9/1990 | Ulrich |
| 4,990,162 A | 2/1991 | LeBlanc et al. |
| 5,062,673 A | 11/1991 | Mimura |
| 5,172,951 A | 12/1992 | Jacobsen et al. |
| 5,413,611 A | 5/1995 | Haslam, II et al. |
| 5,501,498 A | 3/1996 | Ulrich |
| 5,581,166 A | 12/1996 | Eismann et al. |
| 5,605,071 A | 2/1997 | Buchanan, Jr. |
| 5,888,246 A * | 3/1999 | Gow ...................... A61F 2/583 623/64 |
| 6,223,615 B1 | 5/2001 | Huck |
| 6,344,062 B1 | 2/2002 | Abboudi et al. |
| 6,361,570 B1 | 3/2002 | Gow |
| 6,517,132 B2 | 2/2003 | Matsuda et al. |
| 6,591,707 B2 | 7/2003 | Torii et al. |
| 6,660,043 B2 | 12/2003 | Kajitani et al. |
| 6,786,112 B2 | 9/2004 | Ruttor |
| 6,846,331 B2 | 1/2005 | Senoir |
| 6,896,704 B1 | 5/2005 | Higuchi et al. |
| 6,908,489 B2 | 6/2005 | Didrick |
| 6,918,622 B2 | 7/2005 | Kim et al. |
| 7,041,141 B2 | 5/2006 | Iversen et al. |
| 7,243,569 B2 | 7/2007 | Takahashi et al. |
| 7,316,304 B2 | 1/2008 | Heravi et al. |
| 7,370,896 B2 | 5/2008 | Anderson et al. |
| 7,481,782 B2 | 1/2009 | Scott et al. |
| 7,655,051 B2 | 2/2010 | Stark |
| 7,823,475 B2 | 11/2010 | Hirabayashi et al. |
| 7,867,287 B2 | 1/2011 | Puchhammer |
| 7,922,773 B1 | 4/2011 | Kuiken |
| 8,052,185 B2 | 11/2011 | Madhani |
| 8,100,986 B2 | 1/2012 | Puchhammer et al. |
| 8,257,446 B2 | 9/2012 | Puchhammer |
| 8,337,568 B2 | 12/2012 | Macduff |
| 8,343,234 B2 | 1/2013 | Puchhammer |
| 8,460,394 B2 | 6/2013 | Lee et al. |
| 8,491,666 B2 | 7/2013 | Schulz |
| 8,579,991 B2 | 11/2013 | Puchhammer |
| 8,662,552 B2 | 3/2014 | Torres-Jara |
| 8,663,339 B2 | 3/2014 | Inschlag et al. |
| 8,739,315 B2 | 6/2014 | Baacke |
| 8,747,486 B2 | 6/2014 | Kawasaki et al. |
| 8,795,387 B1 | 8/2014 | Razink |
| 8,803,844 B1 | 8/2014 | Green et al. |
| 8,808,397 B2 | 8/2014 | Gow |
| 8,900,327 B2 | 12/2014 | Bertels et al. |
| 8,915,528 B2 | 12/2014 | Haslinger |
| 8,920,519 B2 | 12/2014 | Johannes et al. |
| 8,951,303 B2 | 2/2015 | Dehoff et al. |
| 8,979,943 B2 | 3/2015 | Evans et al. |
| 8,984,736 B2 | 3/2015 | Radocy |
| 8,986,395 B2 | 3/2015 | McLeary |
| 8,999,003 B2 | 4/2015 | Wenstrand et al. |
| 9,016,744 B2 | 4/2015 | Starkey |
| 9,017,422 B2 | 4/2015 | Locker |
| 9,039,057 B2 | 5/2015 | Schvalb et al. |
| 9,071,170 B2 | 6/2015 | Baba et al. |
| 9,072,614 B2 | 7/2015 | Starkey et al. |
| 9,072,616 B2 | 7/2015 | Schulz |
| 9,101,499 B2 | 8/2015 | Haggas |
| 9,114,028 B2 | 8/2015 | Langenfeld et al. |
| 9,320,621 B2 | 4/2016 | Iversen et al. |
| 9,333,096 B2 | 5/2016 | Perez de Alderete et al. |
| 9,364,364 B2 | 6/2016 | Williams |
| 9,370,430 B2 | 6/2016 | Macduff |
| 9,375,319 B2 | 6/2016 | Macduff |
| 9,375,325 B2 | 6/2016 | Garrec et al. |
| 9,381,099 B2 | 7/2016 | Perry et al. |
| 9,387,095 B2 | 7/2016 | McLeary et al. |
| 9,402,749 B2 | 8/2016 | Gill et al. |
| 9,435,400 B2 | 9/2016 | Cheung et al. |
| 9,456,909 B2 | 10/2016 | Johnson et al. |
| 9,463,085 B1 | 10/2016 | Theobald |
| 9,468,540 B2 | 10/2016 | Nagatsuka et al. |
| 9,474,630 B2 | 10/2016 | Veatch |
| 9,474,631 B2 | 10/2016 | Veatch |
| 9,510,958 B2 | 12/2016 | Mori |
| 9,579,218 B2 | 2/2017 | Lipsey et al. |
| 9,579,219 B2 | 2/2017 | Amend, Jr. et al. |
| 9,585,771 B2 | 3/2017 | Baba et al. |
| 9,592,134 B2 | 3/2017 | Varley |
| 9,629,731 B2 | 4/2017 | Thompson, Jr. et al. |
| 9,636,270 B2 | 5/2017 | Miyazawa |
| 9,707,103 B2 | 7/2017 | Thompson, Jr. et al. |
| 9,730,813 B2 | 8/2017 | Evans et al. |
| 9,737,418 B2 | 8/2017 | Veatch |
| 9,744,055 B2 | 8/2017 | Engeberg et al. |
| 9,814,604 B2 | 11/2017 | Jury |
| 9,861,499 B2 | 1/2018 | Sensinger |
| 9,861,500 B2 | 1/2018 | Puchhammer |
| 9,877,848 B2 | 1/2018 | Ikebe |
| 9,889,059 B2 | 2/2018 | Arakawa |
| 9,913,737 B2 | 3/2018 | Hunter |
| 9,931,229 B2 | 4/2018 | Veatch |
| 9,974,667 B1 | 5/2018 | Cazenave |
| 9,999,522 B2 | 6/2018 | Gill |
| 10,004,611 B2 | 6/2018 | Iversen et al. |
| 10,004,612 B2 | 6/2018 | Iversen et al. |
| 10,022,248 B2 | 7/2018 | Thompson, Jr. et al. |
| 10,028,880 B2 | 7/2018 | Arata et al. |
| 10,034,780 B2 | 7/2018 | Lipsey et al. |
| 10,045,865 B2 | 8/2018 | Veatch |
| 10,045,866 B2 | 8/2018 | Armbruster |
| 10,052,216 B2 * | 8/2018 | Moyer .................... A61F 2/586 |
| 10,076,425 B2 | 9/2018 | Farina et al. |
| 10,092,423 B2 | 10/2018 | Goldfarb et al. |
| D884,176 S | 5/2020 | Jury et al. |
| 10,973,660 B2 | 4/2021 | Gill et al. |
| 11,547,581 B2 | 1/2023 | Byrne et al. |
| 11,786,381 B2 | 10/2023 | Gill et al. |
| 11,931,270 B2 | 3/2024 | Rivera et al. |
| 2002/0135241 A1 | 9/2002 | Kobayashi et al. |

(56) References Cited

U.S. PATENT DOCUMENTS

| | | |
|---|---|---|
| 2003/0036805 A1 | 2/2003 | Senior |
| 2004/0054423 A1 | 3/2004 | Martin |
| 2004/0103740 A1 | 6/2004 | Townsend et al. |
| 2004/0117034 A1 | 6/2004 | Weir et al. |
| 2005/0021154 A1 | 1/2005 | Brimalm |
| 2005/0021155 A1 | 1/2005 | Brimalm |
| 2005/0102037 A1 | 5/2005 | Matsuda |
| 2005/0192677 A1 | 9/2005 | Ragnarsdottir et al. |
| 2006/0158146 A1 | 7/2006 | Tadano |
| 2006/0167564 A1 | 7/2006 | Flaherty et al. |
| 2006/0212129 A1 | 9/2006 | Lake et al. |
| 2007/0102228 A1 | 5/2007 | Shiina et al. |
| 2007/0137351 A1 | 6/2007 | Schwendemann |
| 2007/0276303 A1 | 11/2007 | Jenner, Jr. |
| 2008/0097269 A1 | 4/2008 | Weinberg et al. |
| 2008/0146981 A1 | 6/2008 | Greenwald et al. |
| 2008/0262634 A1 | 10/2008 | Puchhammer |
| 2009/0145254 A1 | 6/2009 | Hirabayashi et al. |
| 2010/0016990 A1 | 1/2010 | Kurtz |
| 2010/0116078 A1 | 5/2010 | Kim |
| 2010/0274365 A1 | 10/2010 | Evans et al. |
| 2011/0048098 A1 | 3/2011 | Rollins et al. |
| 2011/0278061 A1 | 11/2011 | Farnan |
| 2012/0221122 A1 | 8/2012 | Gill et al. |
| 2012/0303136 A1 | 11/2012 | Macduff |
| 2012/0330432 A1 | 12/2012 | Fong |
| 2013/0030550 A1 | 1/2013 | Jopek et al. |
| 2013/0076699 A1 | 3/2013 | Spencer |
| 2013/0175816 A1* | 7/2013 | Kawasaki ............ B25J 15/024 294/198 |
| 2013/0226315 A1 | 8/2013 | Varley |
| 2013/0268090 A1 | 10/2013 | Goldfarb et al. |
| 2013/0268094 A1 | 10/2013 | Van Wiemeersch |
| 2013/0310949 A1 | 11/2013 | Goldfarb et al. |
| 2013/0345828 A1 | 12/2013 | Starkey et al. |
| 2014/0060236 A1 | 3/2014 | Watanabe |
| 2014/0114439 A1 | 4/2014 | Iversen et al. |
| 2014/0148918 A1 | 5/2014 | Pedersen et al. |
| 2014/0148919 A1 | 5/2014 | Pedersen et al. |
| 2014/0236314 A1 | 8/2014 | Van Wiemeersch |
| 2014/0251056 A1 | 9/2014 | Preuss |
| 2014/0277588 A1 | 9/2014 | Patt et al. |
| 2014/0288665 A1 | 9/2014 | Gill |
| 2015/0112448 A1 | 4/2015 | Scott et al. |
| 2015/0183069 A1 | 7/2015 | Lee |
| 2015/0190245 A1 | 7/2015 | McLeary et al. |
| 2015/0216679 A1 | 8/2015 | Lipsey et al. |
| 2015/0351935 A1 | 12/2015 | Donati et al. |
| 2015/0360369 A1 | 12/2015 | Ishikawa et al. |
| 2015/0374515 A1 | 12/2015 | Meijer et al. |
| 2016/0089251 A1 | 3/2016 | Mandl et al. |
| 2016/0166409 A1 | 6/2016 | Goldfarb et al. |
| 2016/0235555 A1 | 8/2016 | Hunter |
| 2016/0250044 A1 | 9/2016 | Iversen et al. |
| 2016/0296345 A1 | 10/2016 | Deshpande et al. |
| 2016/0367383 A1 | 12/2016 | Sensinger et al. |
| 2017/0007424 A1 | 1/2017 | Gill |
| 2017/0014245 A9 | 1/2017 | Hunter |
| 2017/0168565 A1 | 6/2017 | Cohen et al. |
| 2017/0340459 A1 | 11/2017 | Mandelbaum |
| 2018/0036145 A1 | 2/2018 | Jury et al. |
| 2018/0098862 A1 | 4/2018 | Kuiken et al. |
| 2018/0116829 A1 | 5/2018 | Gaston et al. |
| 2018/0133032 A1 | 5/2018 | Poirters |
| 2018/0140441 A1 | 5/2018 | Poirters |
| 2018/0168830 A1 | 6/2018 | Evans et al. |
| 2018/0202538 A1 | 7/2018 | Wilson-Jones et al. |
| 2018/0207005 A1 | 7/2018 | Chen et al. |
| 2018/0221177 A1 | 8/2018 | Kaltenbach et al. |
| 2018/0256365 A1 | 9/2018 | Bai |
| 2018/0256366 A1 | 9/2018 | Bai |
| 2018/0256367 A1 | 9/2018 | Bai |
| 2018/0263791 A1 | 9/2018 | Bai |
| 2018/0296368 A1 | 10/2018 | Gill |
| 2018/0303633 A1 | 10/2018 | Yi |
| 2019/0091040 A1 | 3/2019 | Gill et al. |
| 2019/0209345 A1 | 7/2019 | LaChappelle |
| 2019/0368237 A1 | 12/2019 | Distefano et al. |
| 2020/0047351 A1 | 2/2020 | Zappatore |
| 2020/0306059 A1 | 10/2020 | Cornman et al. |
| 2021/0145610 A1 | 5/2021 | Rivera et al. |
| 2021/0251779 A1 | 8/2021 | Mark |
| 2021/0307934 A1 | 10/2021 | Gill et al. |
| 2021/0361446 A1 | 11/2021 | Griebling et al. |
| 2022/0160521 A1 | 5/2022 | Benning |
| 2022/0313456 A1 | 10/2022 | Acevedo et al. |
| 2022/0339009 A1* | 10/2022 | Benning ............... A61F 2/586 |
| 2023/0033693 A1 | 2/2023 | Babin et al. |
| 2023/0088565 A1 | 3/2023 | Benning |
| 2024/0074878 A1 | 3/2024 | Gill et al. |
| 2024/0245532 A1 | 7/2024 | Rivera et al. |
| 2024/0299192 A1 | 9/2024 | Rivera et al. |
| 2024/0299193 A1 | 9/2024 | Rivera et al. |
| 2024/0390164 A1 | 11/2024 | Griebling et al. |
| 2025/0235330 A1 | 7/2025 | Bokser |

FOREIGN PATENT DOCUMENTS

| | | |
|---|---|---|
| CN | 204274727 | 4/2015 |
| CN | 103830025 | 8/2015 |
| CN | 103705323 | 3/2016 |
| CN | 106994694 | 8/2017 |
| CN | 108 272 537 | 7/2018 |
| CN | 106491250 | 9/2018 |
| CN | 109 620 487 | 4/2019 |
| CN | 110 340 913 | 10/2019 |
| CN | 112 873 252 | 6/2021 |
| CN | 108 544 518 | 5/2024 |
| DE | 309 367 | 11/1918 |
| DE | 319 092 | 2/1920 |
| DE | 323 970 | 8/1920 |
| DE | 24 34 834 | 2/1976 |
| DE | 26 07 499 | 9/1977 |
| DE | 198 54 762 | 6/2000 |
| DE | 101 05 814 | 9/2002 |
| DE | 203 01 116 | 3/2003 |
| DE | 698 16 848 | 4/2004 |
| DE | 10 2012 009 699 | 11/2013 |
| DE | 10 2017 005 761 | 2/2020 |
| DE | 10 2017 005 762 | 2/2020 |
| DE | 10 2017 005 764 | 2/2020 |
| DE | 10 2017 005 765 | 2/2020 |
| EP | 0 145 504 | 6/1985 |
| EP | 0 484 173 | 5/1992 |
| EP | 1 043 003 | 10/2000 |
| EP | 1 557 547 | 1/2011 |
| EP | 2 612 619 | 7/2013 |
| EP | 2 616 017 | 7/2013 |
| EP | 2 653 137 | 10/2013 |
| EP | 2 664 302 | 11/2013 |
| EP | 2 719 361 | 4/2014 |
| EP | 2 114 315 | 5/2016 |
| EP | 2 890 333 | 12/2016 |
| EP | 2 978 389 | 5/2017 |
| EP | 3 589 242 | 1/2020 |
| EP | 3 996 885 | 8/2023 |
| EP | 3 977 965 | 2/2024 |
| GB | 239 004 | 9/1925 |
| GB | 326 970 | 3/1930 |
| GB | 862 437 | 3/1961 |
| GB | 1 510 298 | 5/1978 |
| GB | 1 585 256 | 2/1981 |
| GB | D 3023680 | 4/2006 |
| GB | 2 444 679 | 6/2008 |
| GB | 2 521 748 | 7/2015 |
| GB | 2 521 749 | 7/2015 |
| JP | 53-011456 | 2/1978 |
| JP | 2002-310242 | 10/2002 |
| JP | 2004-224280 | 8/2004 |
| JP | 2018-167375 | 11/2018 |
| WO | WO 95/024875 | 9/1995 |
| WO | WO 99/021517 | 5/1999 |
| WO | WO 00/069375 | 11/2000 |
| WO | WO 03/017878 | 3/2003 |

(56) References Cited

FOREIGN PATENT DOCUMENTS

| | | |
|---|---|---|
| WO | WO 03/017880 | 3/2003 |
| WO | WO 2006/069264 | 6/2006 |
| WO | WO 2007/063266 | 6/2007 |
| WO | WO 2007/076764 | 7/2007 |
| WO | WO 2007/076765 | 7/2007 |
| WO | WO 2007/126854 | 11/2007 |
| WO | WO 2007/127973 | 11/2007 |
| WO | WO 2008/044207 | 4/2008 |
| WO | WO 2008/098059 | 8/2008 |
| WO | WO 2008/098072 | 8/2008 |
| WO | WO 2010/018358 | 2/2010 |
| WO | WO 2010/050765 | 5/2010 |
| WO | WO 2010/051798 | 5/2010 |
| WO | WO 2011/001136 | 1/2011 |
| WO | WO 2011/022569 | 2/2011 |
| WO | WO 2011/036473 | 3/2011 |
| WO | WO 2011/107778 | 9/2011 |
| WO | WO 2013/038143 | 3/2013 |
| WO | WO 2013/185231 | 12/2013 |
| WO | WO 2014/027897 | 2/2014 |
| WO | WO 2014/177272 | 11/2014 |
| WO | WO 2015/128604 | 9/2015 |
| WO | WO 2017/061879 | 4/2017 |
| WO | WO 2017/084637 | 5/2017 |
| WO | WO 2017/199127 | 11/2017 |
| WO | WO 2017/212128 | 12/2017 |
| WO | WO 2018/006722 | 1/2018 |
| WO | WO 2018/054945 | 3/2018 |
| WO | WO 2018/056799 | 3/2018 |
| WO | WO 2018/096188 | 5/2018 |
| WO | WO 2018/121983 | 7/2018 |
| WO | WO 2018/130428 | 7/2018 |
| WO | WO 2018/132711 | 7/2018 |
| WO | WO 2018/158554 | 9/2018 |
| WO | WO 2018/178420 | 10/2018 |
| WO | WO 2018/180782 | 10/2018 |
| WO | WO 2018/218129 | 11/2018 |
| WO | WO 2019/116321 A1 | 6/2019 |
| WO | WO 2020/019992 | 1/2020 |
| WO | WO 2020/199240 | 10/2020 |
| WO | WO 2020/208557 | 10/2020 |
| WO | WO 2020/234777 | 11/2020 |
| WO | WO 2021/053557 | 3/2021 |
| WO | WO 2021/095014 | 5/2021 |
| WO | WO 2021/244708 | 12/2021 |
| WO | WO 2023/080796 | 5/2023 |

OTHER PUBLICATIONS

"Functional Devices—Split Hooks and Spare Parts", Steeper, Wayback Machine, Mar. 20, 2023, 3 pages. URL:https://www.steepergroup.com/SteeperGroup/media/SteeperGroupMedia/Prosthetics/Upper%20Limb%20Prosthetics/Split-Hook-Catalogue-Pages_1.pdf.

"Hero Flex", Open Bionics, Wayback Machine, Dec. 8, 2023, 13 pages. URL: https://openbionics.com/heroflex/.

"MyoHand VariPlus Speed", Ottobock, Wayback Machine, Sep. 30, 2023, 6 pages. URL: https://www.ottobock.com/en-us/product/8E38~59.

"ProPlus MC ETD", Fillauer, Wayback Machine, Sep. 24, 2023, 5 pages. URL: https://fillauer.com/products/proplus-mc-etd/.

"ProPlus MC ETD2", Fillauer, Wayback Machine, Sep. 28, 2023, 5 pages. URL: https://fillauer.com/products/proplus-mc-etd2/.

"Quick Disconnect Wrist", Steeper, Wayback Machine, Sep. 26, 2023, 6 pages. URL: https://www.steepergroup.com/prosthetics/upper-limb-prosthetics/wrists/quick-disconnect-wrist/.

Sears, "Evaluation and Development of a New Hook-Type Terminal Device", Department of Bioengineering, The University of Utah, Jun. 1983, 151 pages.

"System Electric Hand Digital Twin", Ottobock, Wayback Machine, Mar. 29, 2023, 4 pages. URL: https://www.ottobock.com/en-us/product/8E38~57.

9 Worm Gear Pair, KHK Technical Information, Oct. 21, 2008, pp. 291-299.

Adee, Sally, "A 'Manhattan Project' for the Next Generation of Bionic Arms", IEEE Spectrum, https://spectrum.ieee.org/a-manhattan-project-for-the-next-generation-of-bionic-arms#toggle-gdpr, Mar. 22, 2008, pp. 3.

Ama, Excerpts from American Medical Association, Guides to the Evaluation of Permanent Impairment (5th ed. 2000), pp. 432-453.

Baek et al., "Design and Control of a Robotic Finger for Prosthetic Hands", Proceedings of the 1999 IEEE International Conference on Intelligent Robots and Systems, pp. 113-117.

Belter et al., "Mechanical Design and Performance Specifications of Anthropomorphic Prosthetic Hands: A Review", JRRD, Nov. 5, 2013, vol. 50, No. 5, pp. 599-617.

Bretthauer et al., "A New Adaptive Hand Prosthesis", Handchirurgie Mikrochirurgie Plastische Chirurgie, Feb. 2008, pp. 40-45.

Butterfaß et al., "DLR-Hand II: Next Generation of a Dextrous Robot Hand", IEEE International Conference on Robotics and Automation, Seoul, Korea, May 21-26, 2001, vol. 1, pp. 109-114.

Connolly, "Prosthetic Hands from Touch Bionics", Industrial Robot, Emerald Group Publishing Limited, Jun. 2008, vol. 35, No. 4, pp. 290-293.

Dimery, Rob, "1993: First Bionic Arm", Guinness World Records, https://www.guinnessworldrecords.com/news/60at60/2015/8/1993-first-bionic-arm-392887, Aug. 18, 2015, pp. 2.

"DuPont Engineering Design—The Review of DuPont Engineering Polymers in Action", <http://www.engpolymer.co.kr/x_data/magazine/engdesign07_2e.pdf>, Feb. 2007, pp. 16.

Edsinger-Gonzales, Aaron, "Design of a Compliant and Force Sensing Hand for a Humanoid Robot", Engineering, DOI:10.21236/ADA434151, 2005, pp. 5.

"EMAS: The First Bionic Arm", National Museums Scotland, https://web.archive.org/web/20200805045443/https://www.nms.ac.uk/explore-our-collections/stories/science-and-technology/made-in-scotland-changing-the-world/scottish-science-innovations/emas-bionic-arm/, archived Aug. 5, 2020, pp. 8.

Fildes, Jonathan, "Bionic Hand Wins Top Tech Prize", BBC News, Jun. 9, 2008, http://news.bbc.co.uk/2/hi/science/nature/7443866.stm, p. 3.

Gaiser et al., "A New Anthropomorphic Robotic Hand", 2008 8th IEEE-RAS International Conference on Humanoid Robots, Dec. 1-3, 2008, Daejeon, Korea, pp. 418-422.

Goggins, Sophie, "EMAS—An Award Winning Bionic Arm", National Museums Scotland, https://blog.nms.ac.uk/2017/11/29/emas-an-award-winning-bionic-arm/, Nov. 29, 2017, pp. 6.

Gow, David, "The Development of the Edinburgh Modular Arm System", Institute of Biomedical Engineering, University of New Brunswick, MEC '99 "Narrowing the Gap", pp. 64-66.

Grant, C. "Touch Bionics has i-LIMB Bionic Arm to go with your Bionic Hand", Engadget, https://www.engadget.com/2008-01-05-touch-bionics-has-i-limb-bionic-arm-to-go-with-your-bionic-hand.html, Jan. 6, 2008, p. 1.

Greenemeier, Larry, "Bionic Hand Recognized as Top Invention", Scientific American, https://blogs.scientificamerican.com/news-blog/bionic-hand-recognized-as-top-inven-2008-11-06, Nov. 6, 2008, pp. 3.

"i-Limb™ Hand", Touch Bionics, User Manual, Revision 1.5, 2007, pp. 12.

"iLimb Bionic Hand Now Ready for Market", Technovelgy.com, www.technovelgy.com/ct/Science-Fiction-News.asp?NewsNum=1125, as printed Jul. 6, 2020 in 3 pages.

Kargov et al., "Applications of a Fluidic Artificial Hand in the Field of Rehabilitation", Rehabilitation Robotics, Ch. 15, Aug. 2007, pp. 261-286.

Kargov et al., "Development of a Multifunctional Cosmetic Prosthetic Hand", Proceedings for the 2007 IEEE 10th International Conference on Rehabilitation Robotics, Jun. 12-15, 2007, Noordwijk, The Netherlands, pp. 550-553.

Kargov et al., "Modularly Designed Lightweight Anthropomorphic Robot Hand", 2006 IEEE International Conference on Multisensor Fusion and Integration for Intelligent Systems, Sep. 3-6, 2006, Heidelberg, Germany, pp. 155-159.

(56) References Cited

OTHER PUBLICATIONS

Kawasaki et al., "Design and Control of Five-Fingered Haptic Interface Opposite to Human Hand", IEEE Transactions on Robotics, Oct. 2007, vol. 23, No. 5., pp. 909-918.
"Living with a Dead Man's Hand", BBC News, http://news.bbc.co.uk/2/hi/health/980069.stm, Oct. 22, 2000, pp. 4.
Lotti et al., "UBH 3: A Biologically Inspired Robotic Hand", IEEE International Conference on Intelligent Manipulation and Grasping, Jan. 2004, pp. 7.
MEC '05: Integrating Prosthetics and Medicine, University of New Brunswick's MyoElectric Controls/Powered Prosthetics Symposium, Aug. 17-19, 2005, Fredericton NB Canada, pp. 260.
Miller et al., "Control of a Six Degree of Freedom Prosthetic Arm After Targeted Muscle Reinnervation Surgery", Archives of Physical Medicine and Rehabilitation, Nov. 2008, vol. 89, pp. 2057-2065.
"Motor Technology—Girard Gearboxes Low Backlash Principle Explained", Motor Technology, https://www.motec.co.uk/tip-gearbox_principle.htm as printed May 23, 2012 in 3 pages.
Pilgrim, Michael, "Meet the Man Who Was Given Britain's First Bionic Hand on the NHS—and is now Learning to Fly", Daily Mail, https://www.dailymail.co.uk/health/article-1038857/Meet-man-given-Britains-bionic-hand-NHS--learning-fly.html, Jul. 26, 2008, pp. 7.
Poppe, Zytel HTN Provides a Helping Hand, DuPont Engineering Design 8 (2007), pp. 3.
"ProDigits The Partial Hand Solution", Touch Bionics, Next Generation Bionic Technology: Transforming the everyday lives of extraordinary people, 2007, pp. 4.
Puig et al., "A Methodology for the Design of Robotic Hands with Multiple Fingers", International Journal of Advanced Robotic Systems, 2008, vol. 5, No. 2, pp. 177-184.
Roberts, Lizzie, "Bionic Hand Among Top Inventions of 2008", The Telegraph, https://www.telegraph.co.uk/news/health/3391089/Bionic-hand-among-top-inventions-of-2008.html, Nov. 6, 2008, pp. 2.
Ryew et al., "Robotic Finger Mechanism with New Anthropomorphic Metacarpal Joint", 26th Annual Conference of the IEEE Industrial Electronics Society, 2000. IECON 2000, vol. 1, pp. 416-421.
Schulz et al., "Die Entwicklung Einer Multifunktionalen Kosmetischen Handprothese", Prothetik, Orthopädie-Technik, Aug. 2006, pp. 627-632.
Sensinger et al., "Cycloid vs. Harmonic Drives for use in High Ratio, Single Stage Robotic Transmissions", 2012 IEEE Conference on Robotics and Automation (ICRA), Saint Paul, MN, USA, May 14-18, 2012, pp. 4130-4135.
Shigley's Mechanical Engineering Design Eighth Edition, ISBN 0-390-76487-6 (2008), pp. 1059.
Shigley's Mechanical Engineering Design Seventh Edition, ISBN 0-07-252036-1 (2004), pp. 1064.
Stix, Gary, "Phantom Touch: Imbuing a Prosthesis with Manual Dexterity", Scientific American, Oct. 1998, pp. 41 & 44.
"The i-LIMB Hand", Touch Bionics, Fitting Guide, 2005, pp. 22.
"The i-LIMB Hand", Touch Bionics, Next Generation Bionic Technology: Transforming the everyday lives of extraordinary people, 2007, pp. 8.
The Weir Thesis ("Weir Thesis") is entitled "An Externally-Powered, Myo-Electrically Controlled Synergetic Prosthetic Hand for the Partial-Hand Amputee", published Aug. 1989, pp. 365.
Topolsky, J., "Touch Bionics i-LIMB Bionic Hand", Engadget, https://www.engadget.com/2007-07-17-touch-bionics-i-limb-bionic-hand.html, Jul. 17, 2007, p. 1.
Touch Bionics PowerPoint presentation in 12 pages, Oct. 17, 2006, The i-LIMB™ System. (Applicant requests that the Examiner consider this reference as qualifying as prior art as of the date indicated, but Applicant does not admit its status as prior art by submitting it here and reserves the right to challenge the reference's prior art status at a later date).
Touch Bionics PowerPoint presentation in 32 pages, 2005, The i-LIMB™ System. (Applicant requests that the Examiner consider this reference as qualifying as prior art as of the date indicated, but Applicant does not admit its status as prior art by submitting it here and reserves the right to challenge the reference's prior art status at a later date).
Ward, Derek Kempton, "Design of a Two Degree of Freedom Robotic Finger", Sep. 1996, in 155 pages.
Weir et al., "A Myoelectrically Controlled Prosthetic Hand for Transmetacarpal Amputations", JPO Journal of Prosthetics and Orthotics, Jun. 2001, vol. 13, No. 2, pp. 26-31.
"World's First Bionic Arm for Scot", BBC News, http://news.bbc.co.uk/2/hi/health/154545.stm, Aug. 25, 1998, pp. 3.
"World's First Bionic Hand Factory Opened by Scottish Company", DailyMail.com, Jan. 8, 2008, https://www.dailymail.co.uk/sciencetech/article-506661/Worlds-bionic-hand-factory-opened-Scottish-company.html, pp. 4.
Amended Complaint for Patent Infringement in 166 pages filed by Vincent Systems GmbH, dated Apr. 15, 2020, in the lawsuit of *Vincent Systems GmbH v. Össur hf. and Össur Americas, Inc.* (collectively "Össur"), in the United States District Court, Central District of California, Case No. 8:19-VC-02157 JLS (DFMx), including Exhibits A-J. The Amended Complaint and the accompanying Exhibits include information regarding Össur's products that were on sale prior to the Sep. 18, 2019 priority date of the present application and were accused of infringement. Applicant requests that the Examiner consider the information describing details of Össur's products to have been described in a printed publication, or in public use, on sale, or otherwise available to the public, prior to the Sep. 18, 2019 priority date of the present application.
Complaint in 36 pages and English translation in 35 pages of the Complaint filed at the Regional Court Mannheim by the law firm Bardehle Pagenberg on behalf of Vincent Systems GmbH, dated Nov. 24, 2016, in the lawsuit of *Vincent Systems GmbH v. Touch Bionics Limited and Touch Bionics GmbH* (collectively "Touch"), and accompanying Exhibits K1-K23 (each listed separately herewith). The Complaint and the accompanying Exhibits include information regarding Touch's products that were on sale prior to the Sep. 18, 2019 priority date of the present application and were accused of infringement. Applicant requests that the Examiner consider the information describing details of Touch's products to have been described in a printed publication, or in public use, on sale, or otherwise available to the public, prior to the Sep. 18, 2019 priority date of the present application.
Exhibit K1—Companies House as printed Jul. 27, 2016 in 1 page.
Exhibit K2—Department B Reproduction of the Current Contents of the Register Retrieval as dated Jul. 14, 2016 in 1 page.
Exhibit K3—Touch Bionics Limited, Directors' Report and Financial Statements, Dec. 31, 2015 in 64 pages.
Exhibit K4—EP 2 364 129 as published Jun. 19, 2013 in 12 pages.
Exhibit K5—Register Excerpt for file # 502009007405.0 as registered Dec. 9, 2016 in 4 pages.
Exhibit K6—Notice of Change of Name by Resolution as filed Jun. 12, 2014 in 4 pages.
Exhibit K7—Decision Rejecting the Opposition in European Application No. 09801137.2 as dated Mar. 23, 2016 in 8 pages.
Exhibit K8—WO 2007/063266 as published Jun. 7, 2007 in 30 pages.
Exhibit K12—i-digits™ quantum, Touch Bionics, Oct. 2015, 4 pages.
Exhibit K13—Touch Bionics, printed Nov. 20, 2016 in 4 pages.
Exhibit K14—Touch Bionics, printed Nov. 20, 2016 in 1 page.
Exhibit K15—Touch Bionics, Clinician Map, Germany, printed Aug. 11, 2016 in 1 page.
Exhibit K16—OTWORLD 2016 in 1 page.
Exhibit K17—OTWORLD—Overview, printed Nov. 2016 in 1 page.
Exhibit K18—Touch Bionics, Price List, Oct. 2015 in 18 pages.
Exhibit K19—Touch Bionics, i-digits quantum, dated Nov. 20, 2016 in 3 pages.
Exhibit K20—Touch Bionics, Document Library, dated Nov. 20, 2016 in 8 pages.
Exhibit K21—Touch Bionics, i-digits quantum, 2016 in 1 page.
Exhibit K22—Whols—Touch Bionics, printed Nov. 20, 2016 in 2 pages.

(56) References Cited

OTHER PUBLICATIONS

Exhibit K23—Denic, printed Nov. 20, 2016 in 3 pages.
I-Limb and Pro-Digits products, on sale or in public use in the United States by May 31, 2007, including a photograph, engineering drawings and assembly instructions, as described in the i-Limb and Pro-Digits Explanation of Relevance in 19 pages.
I-Limb Shoulder, on sale in the United States at least as early as 2005, as described in the i-Limb Shoulder Explanation of Relevance in 2 pages.
Plaintiff Vincent Systems GmbH's Supplemental Disclosure of Asserted Claims and Infringement Contentions dated Jul. 16, 2020, in 38 pages, in the lawsuit of *Vincent Systems GmbH* v. *Össur hf. and Össur Americas, Inc.* (collectively "Össur"), in the United States District Court, Central District of California, Case No. 8:19-VC-02157 JLS (DFMx). This reference includes information regarding Össur's products that were on sale prior to the Sep. 18, 2019 priority date of the present application. Applicant requests that the Examiner consider the information describing details of Össur's products to have been described in a printed publication, or in public use, on sale, or otherwise available to the public, prior to the Sep. 18, 2019 priority date of the present application.
The Edinburgh Modular Arm System (EMAS), as described in the Edinburgh Modular Arm System (EMAS) Explanation of Relevance in 3 pages. Applicant requests that the Examiner consider this reference to have been described in a printed publication, or in public use, on sale, or otherwise available to the public, prior to the Sep. 18, 2019 priority date of the present application.
International Search Report and Written Opinion in Application No. PCT/IB2020/058643, mailed Dec. 11, 2020.
International Search Report and Written Opinion received in App No. PCT/IB2020/058643 dated Dec. 11, 2020 in 14 pages.

\* cited by examiner

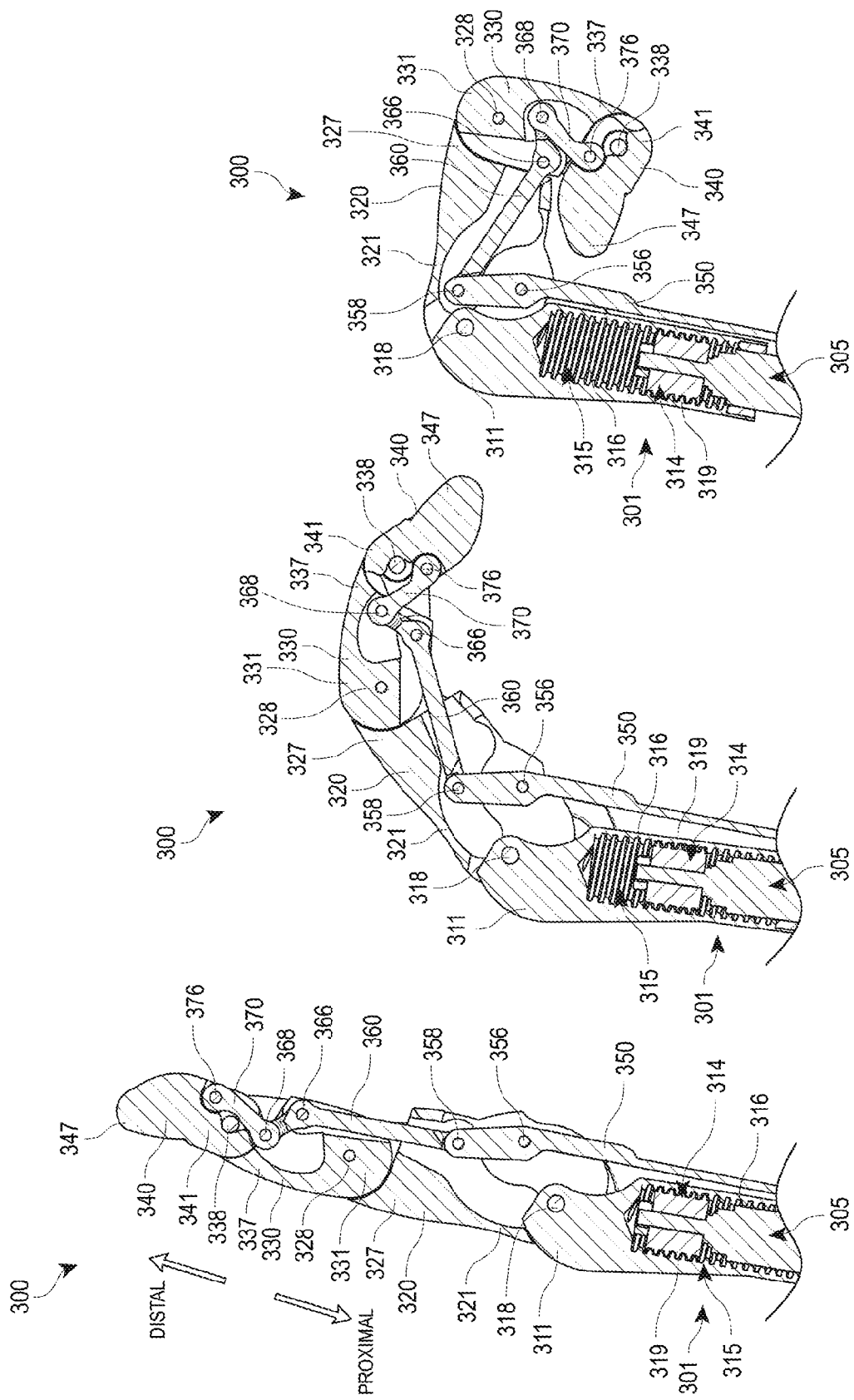

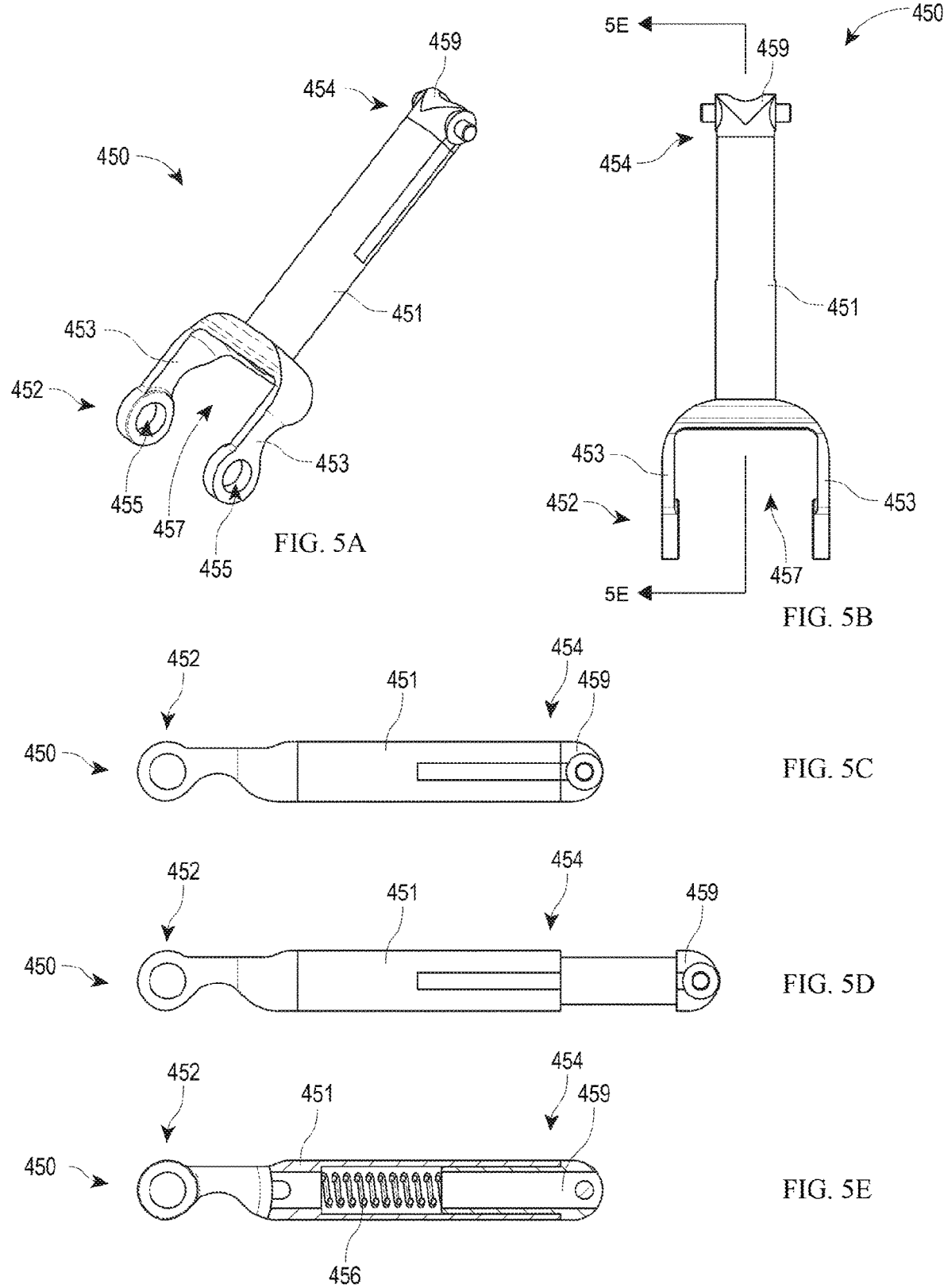

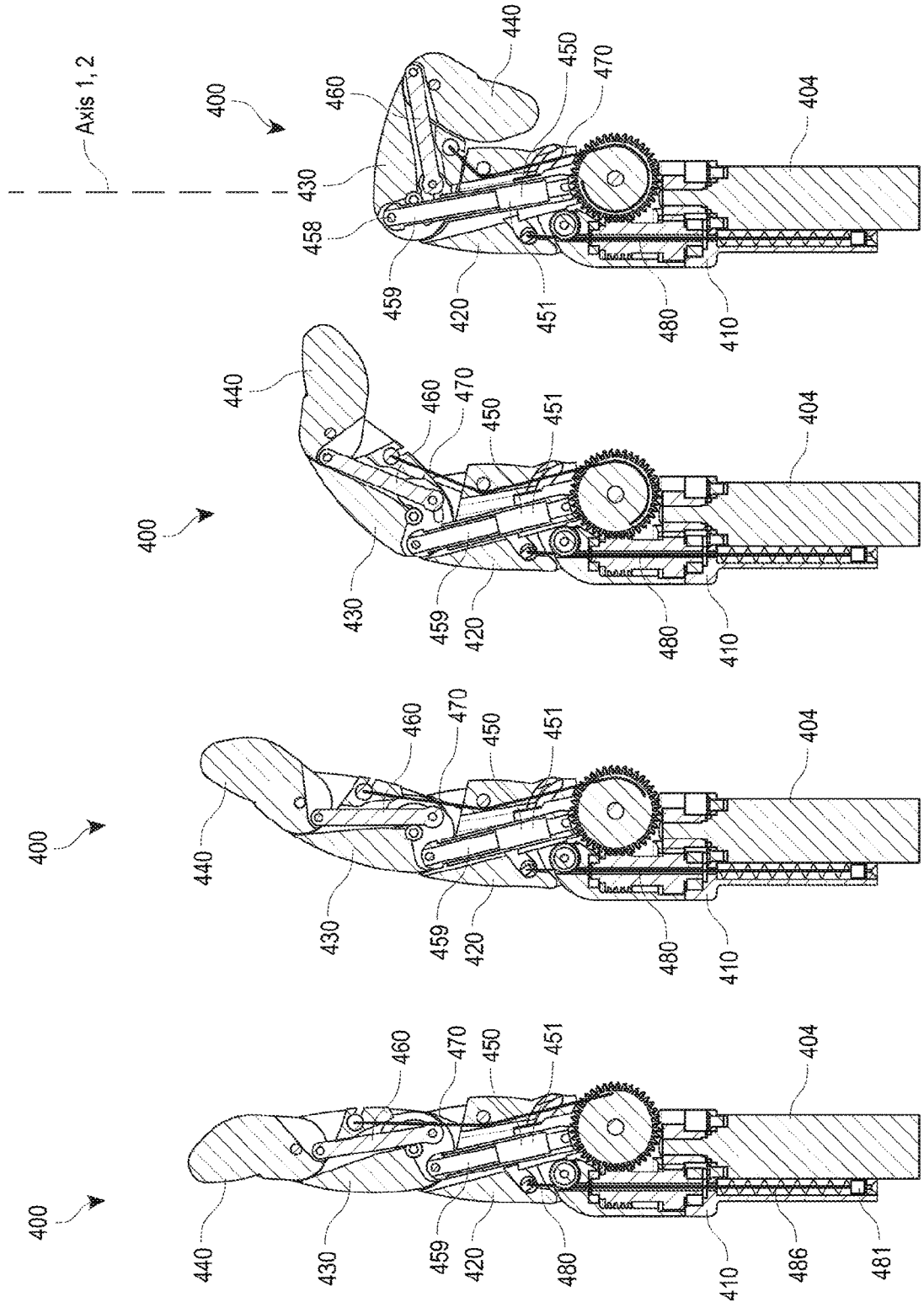

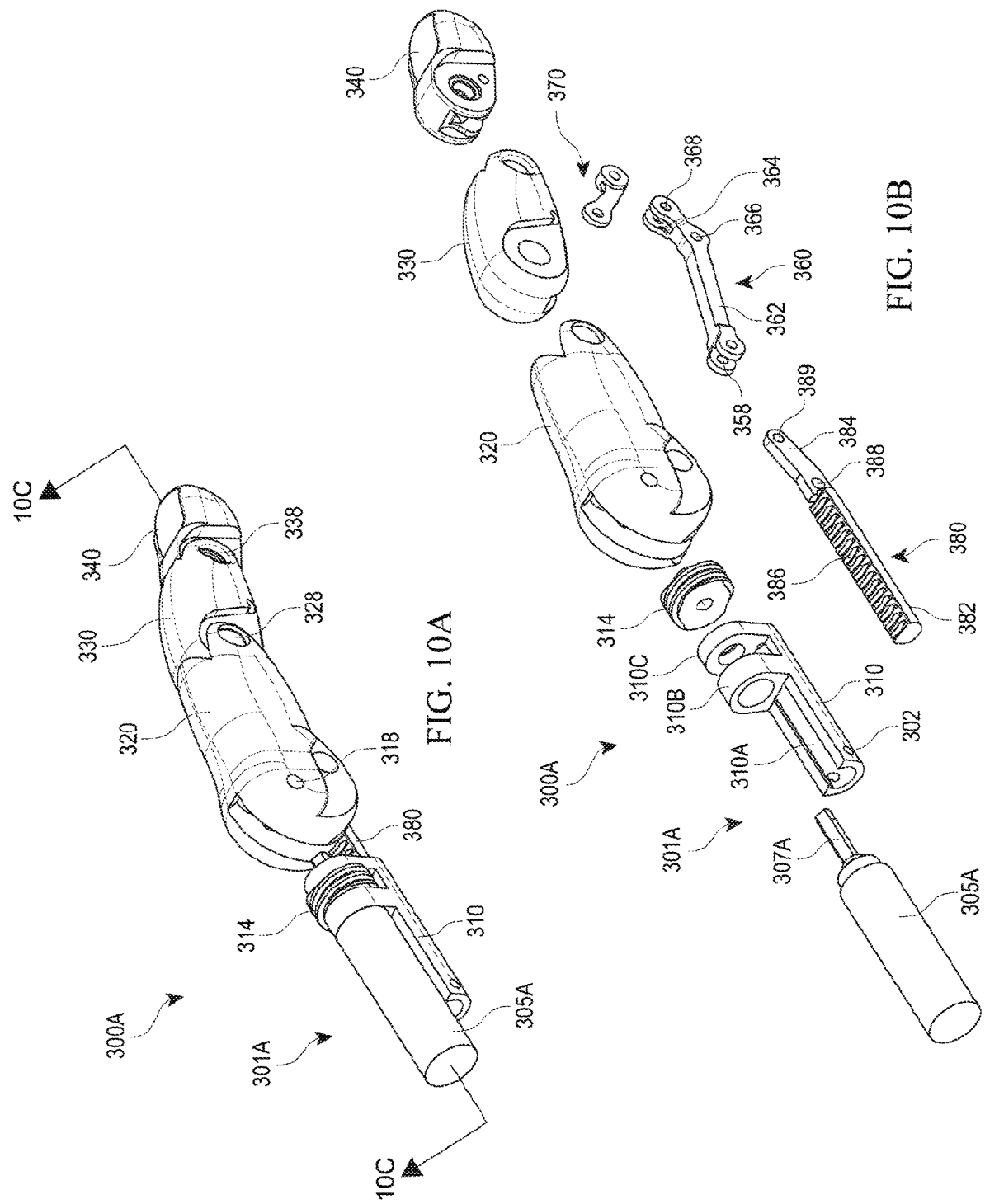

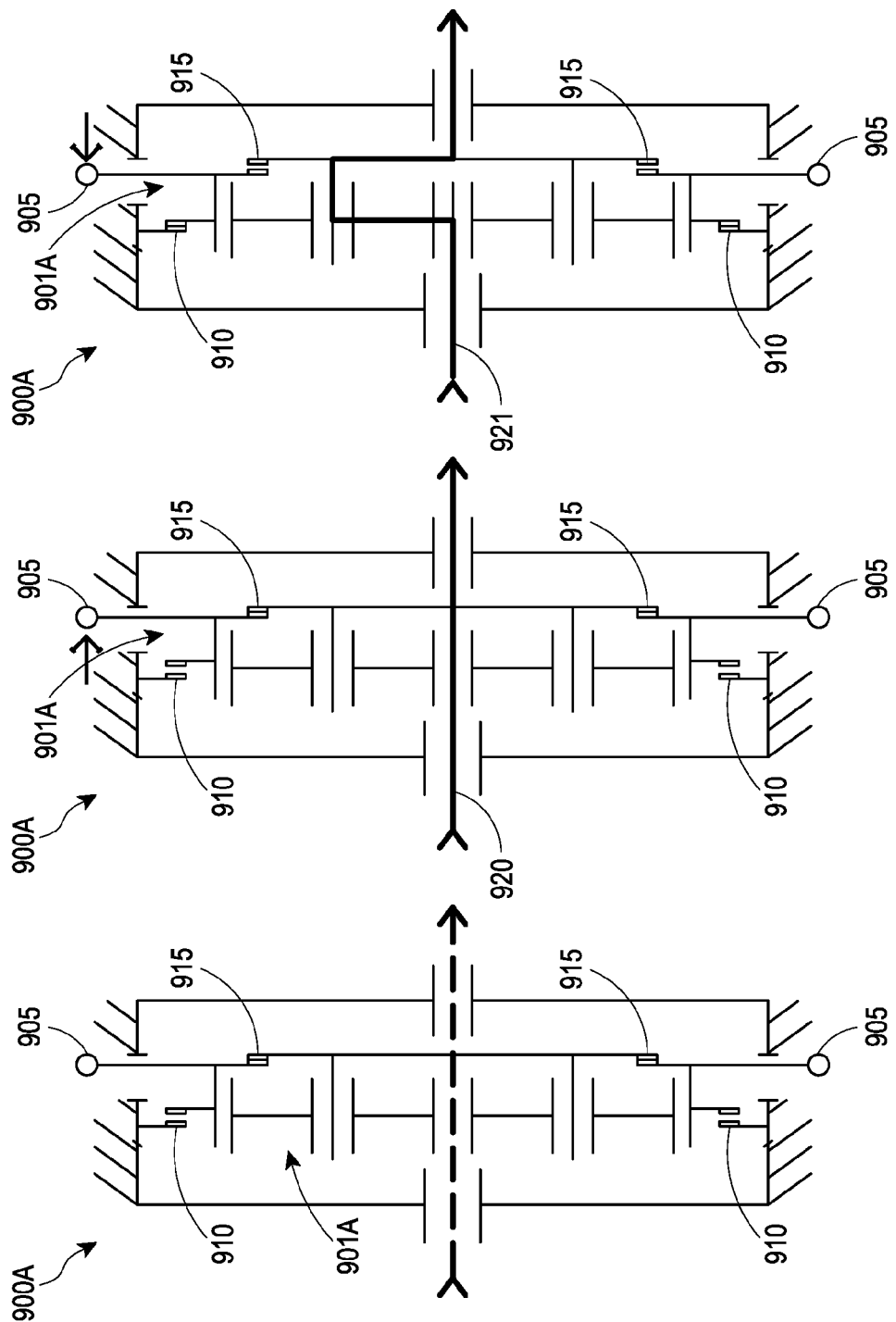

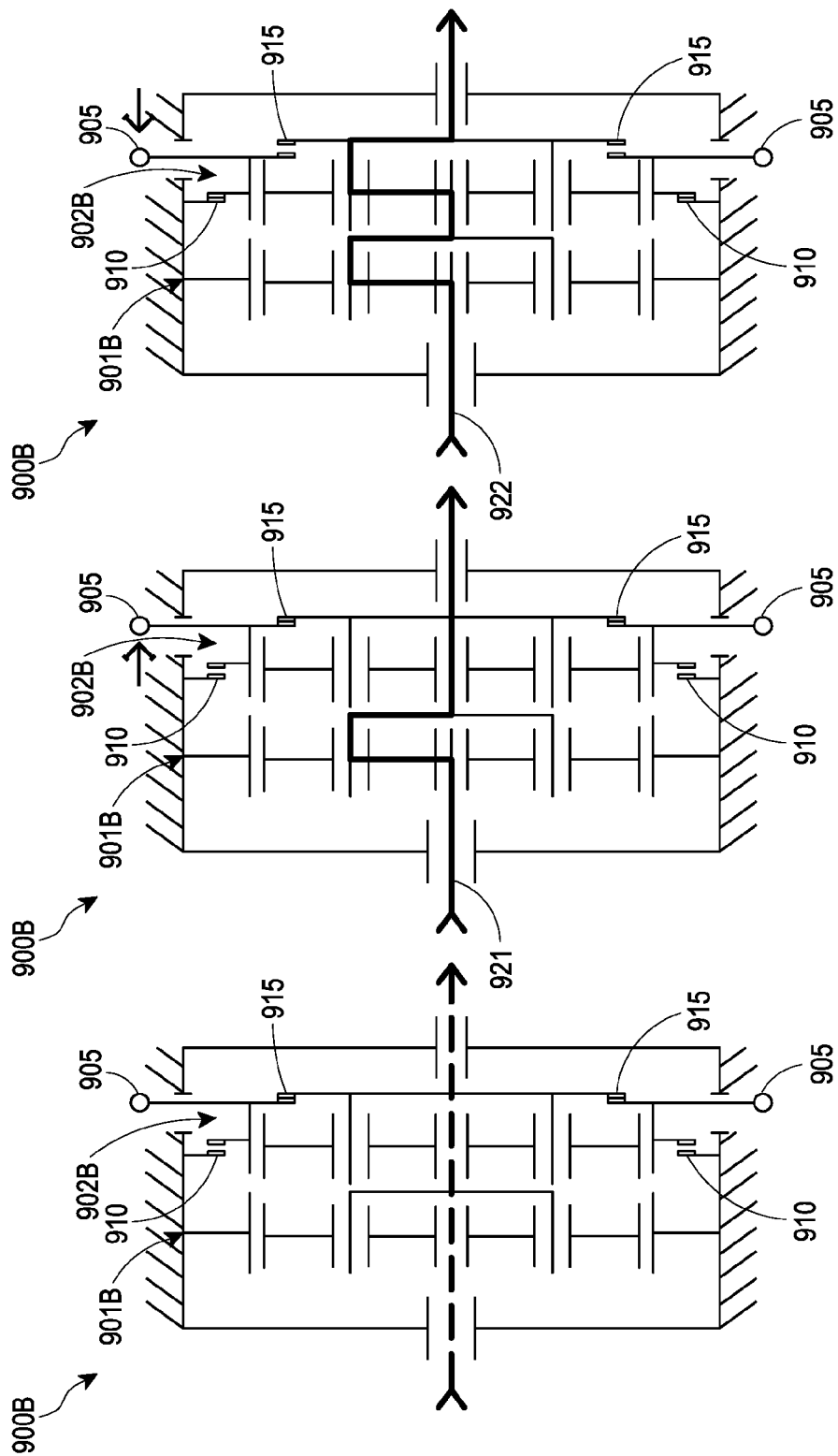

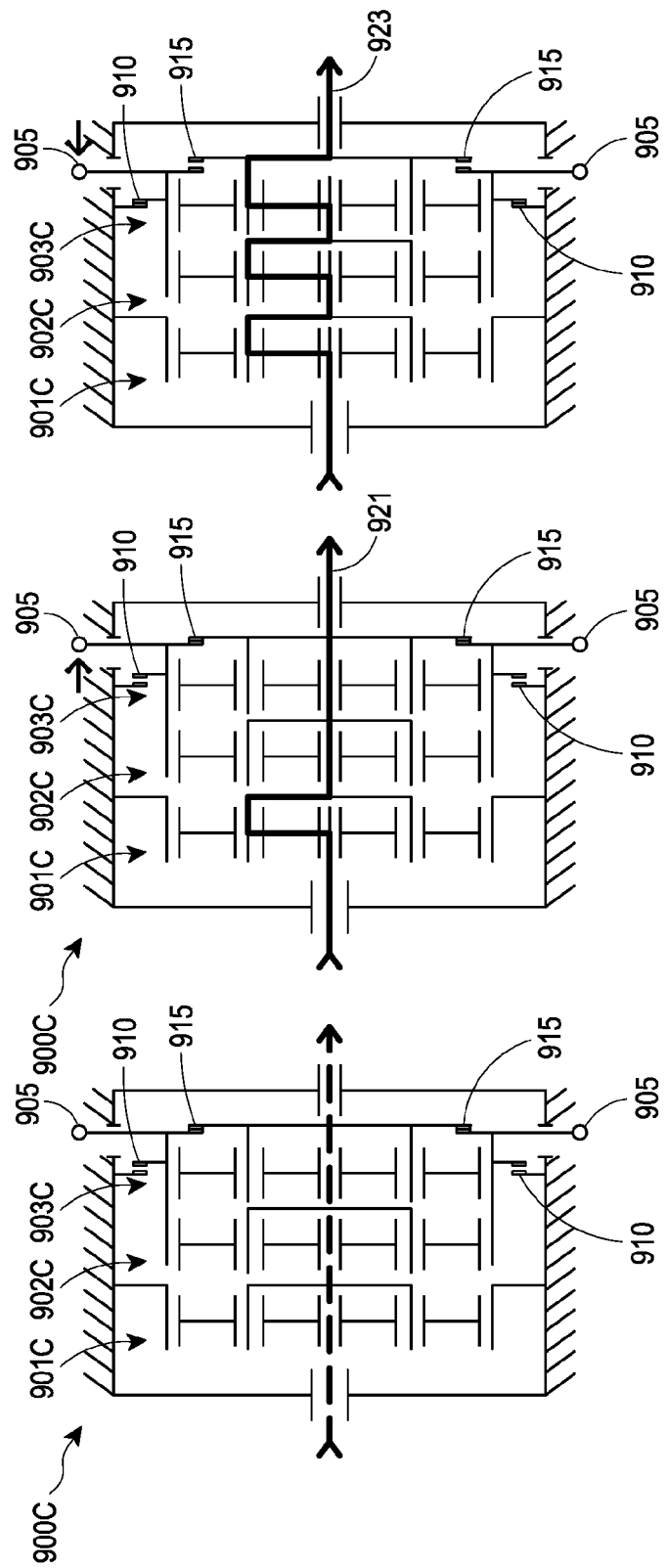

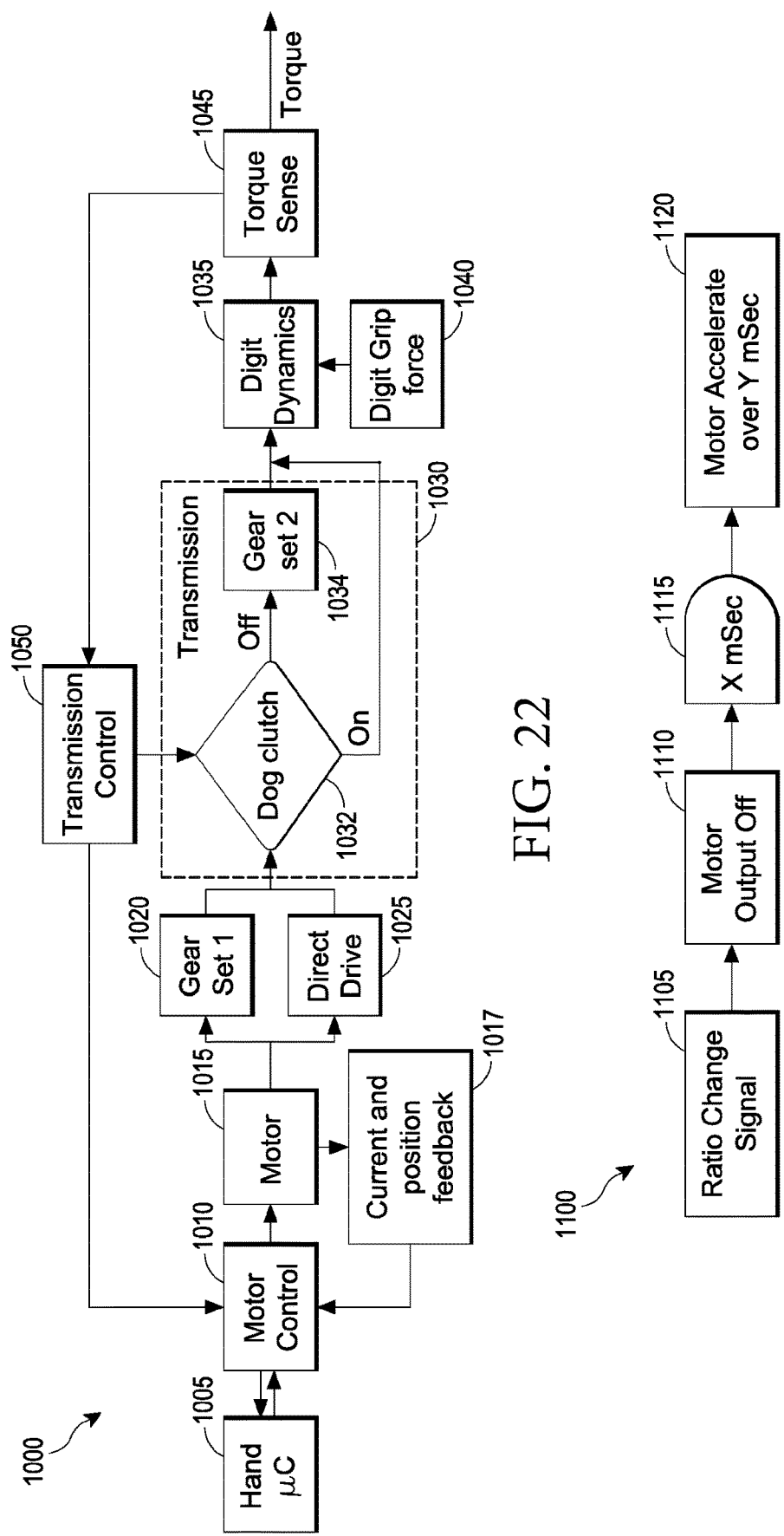

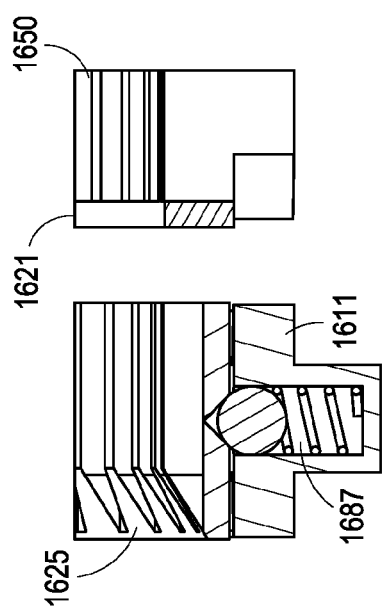
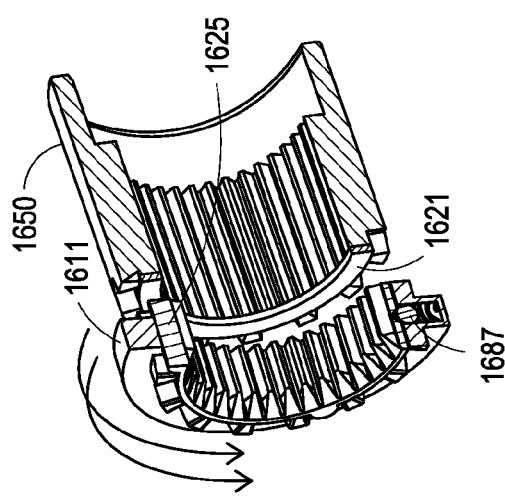
FIG. 30B
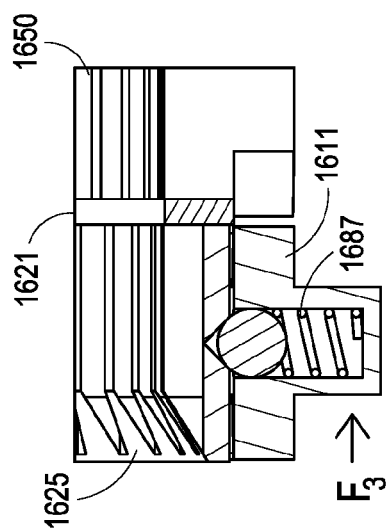
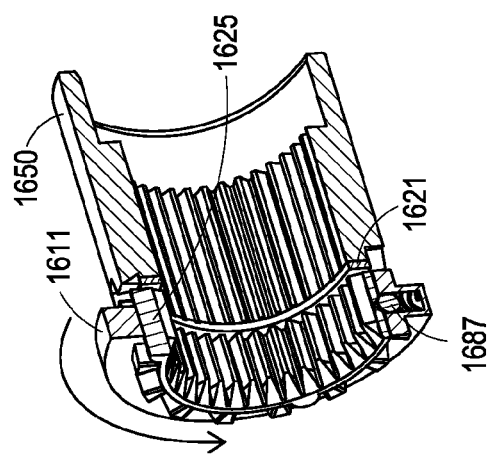
FIG. 30C
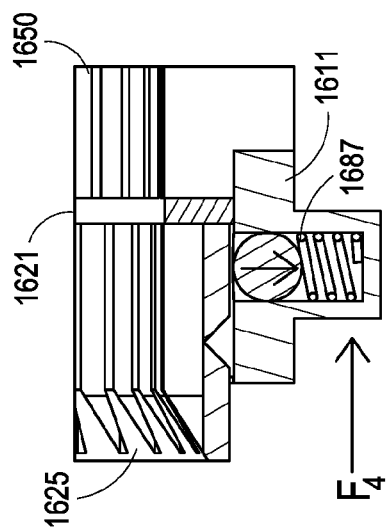
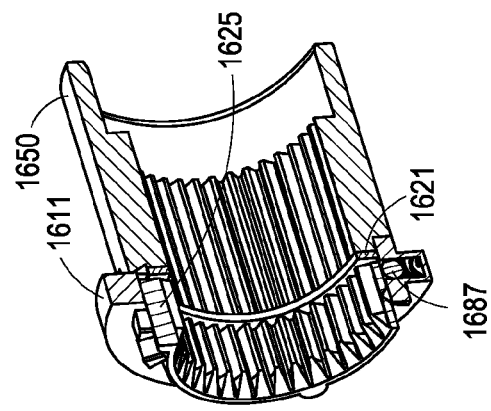
FIG. 30D FIG. 31A
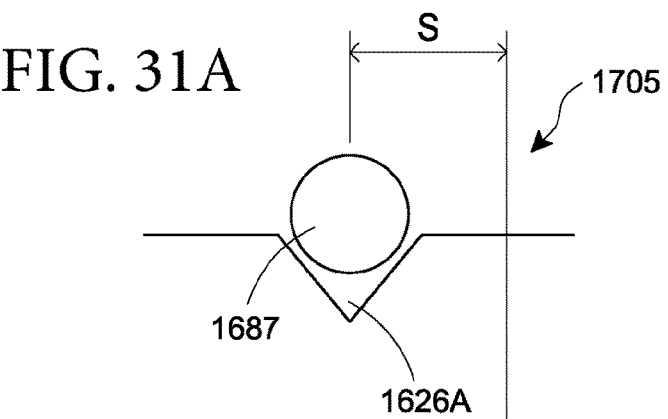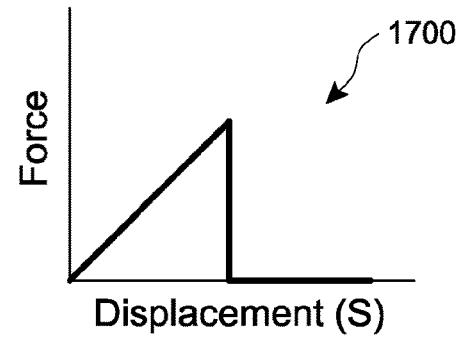
FIG. 31B
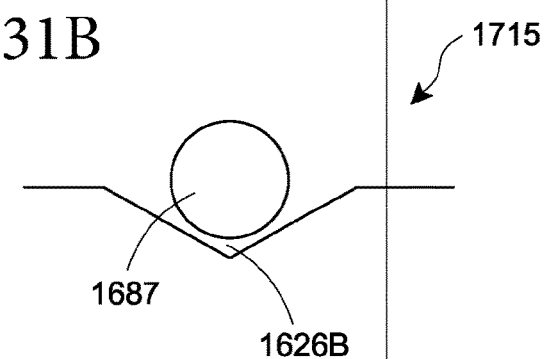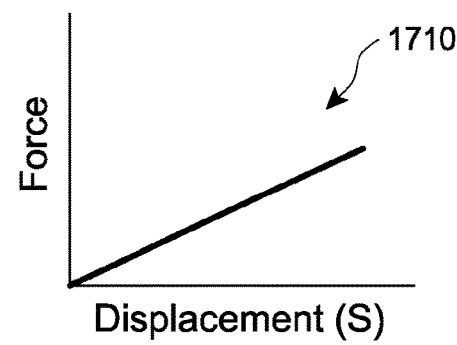
FIG. 31C
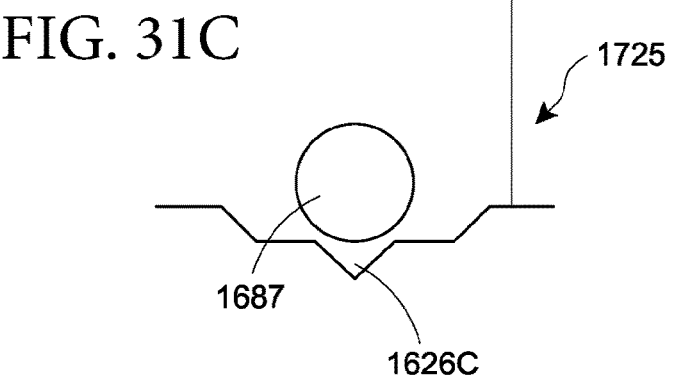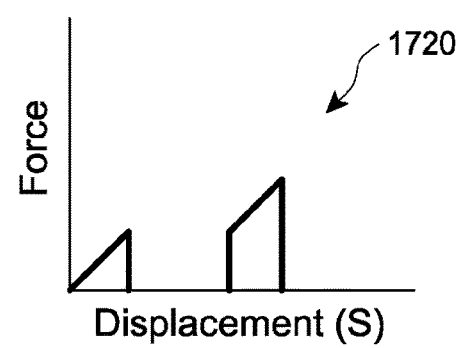

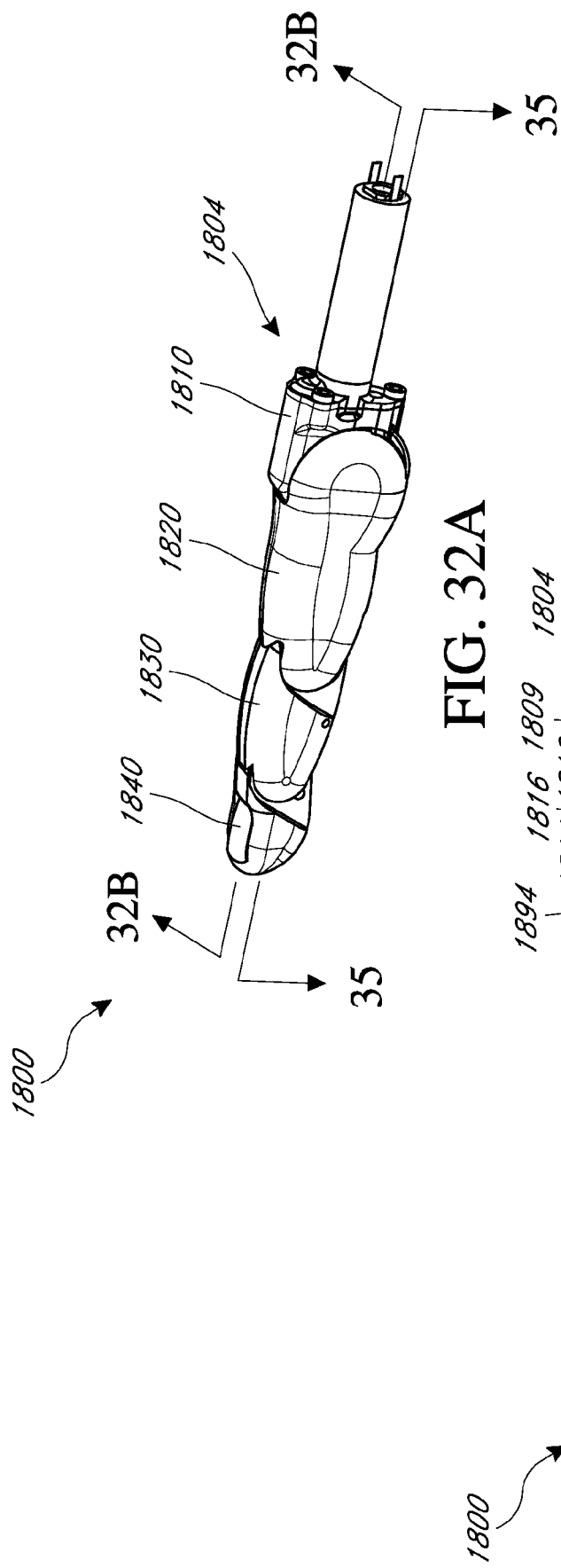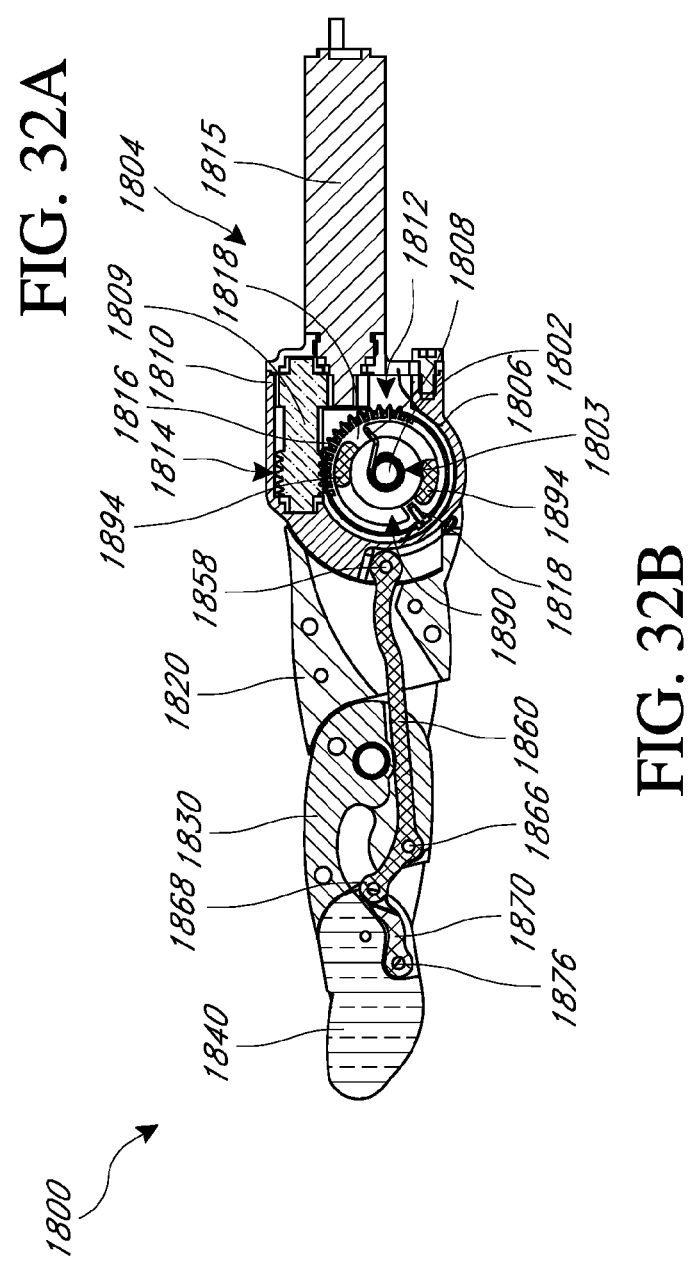
FIG. 32A
FIG. 32B

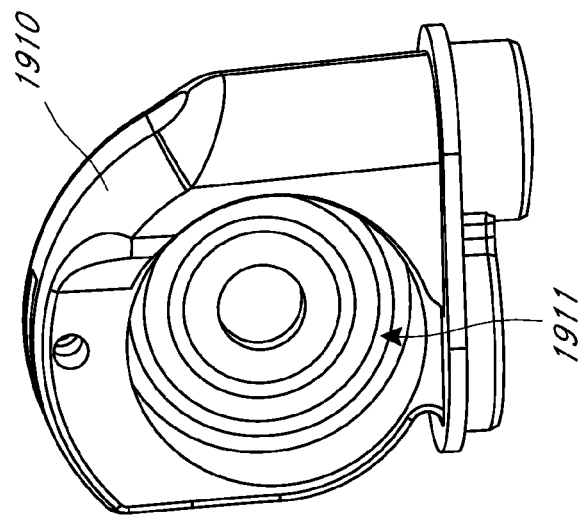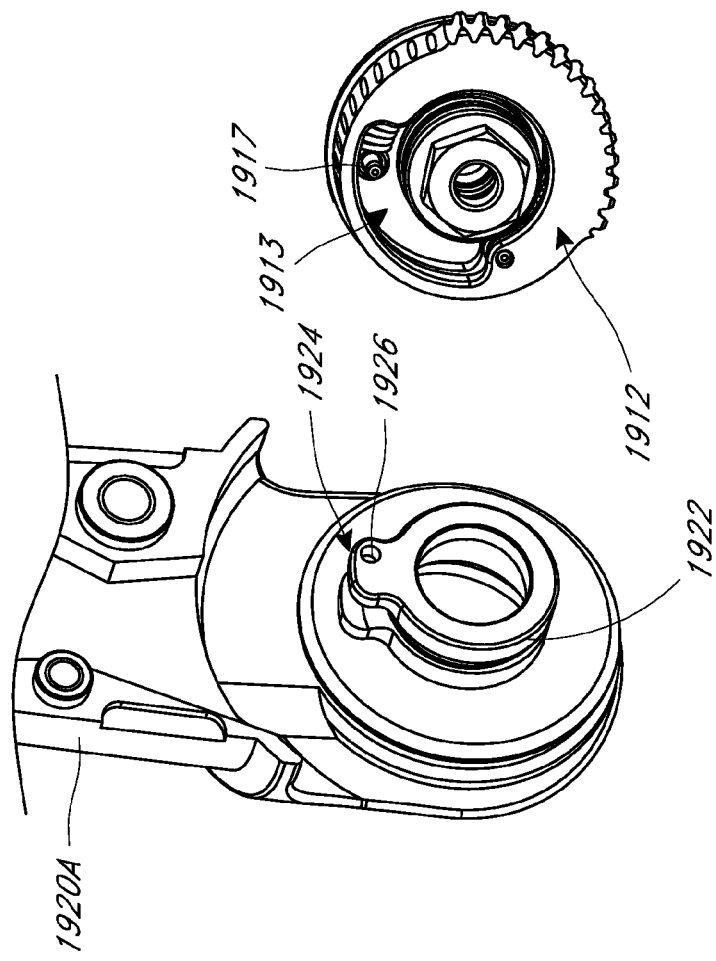
FIG. 39B

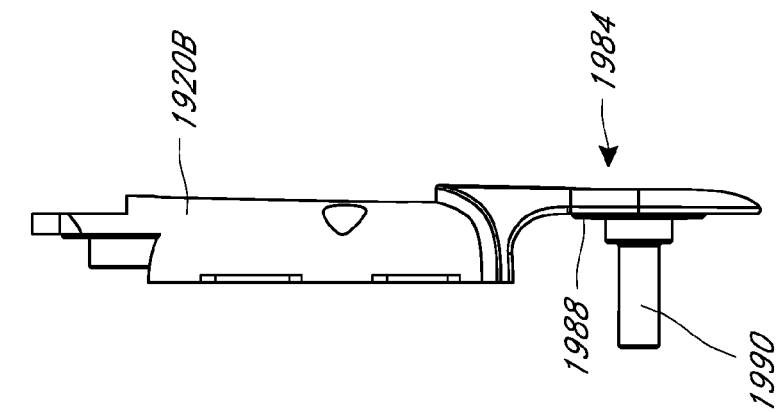
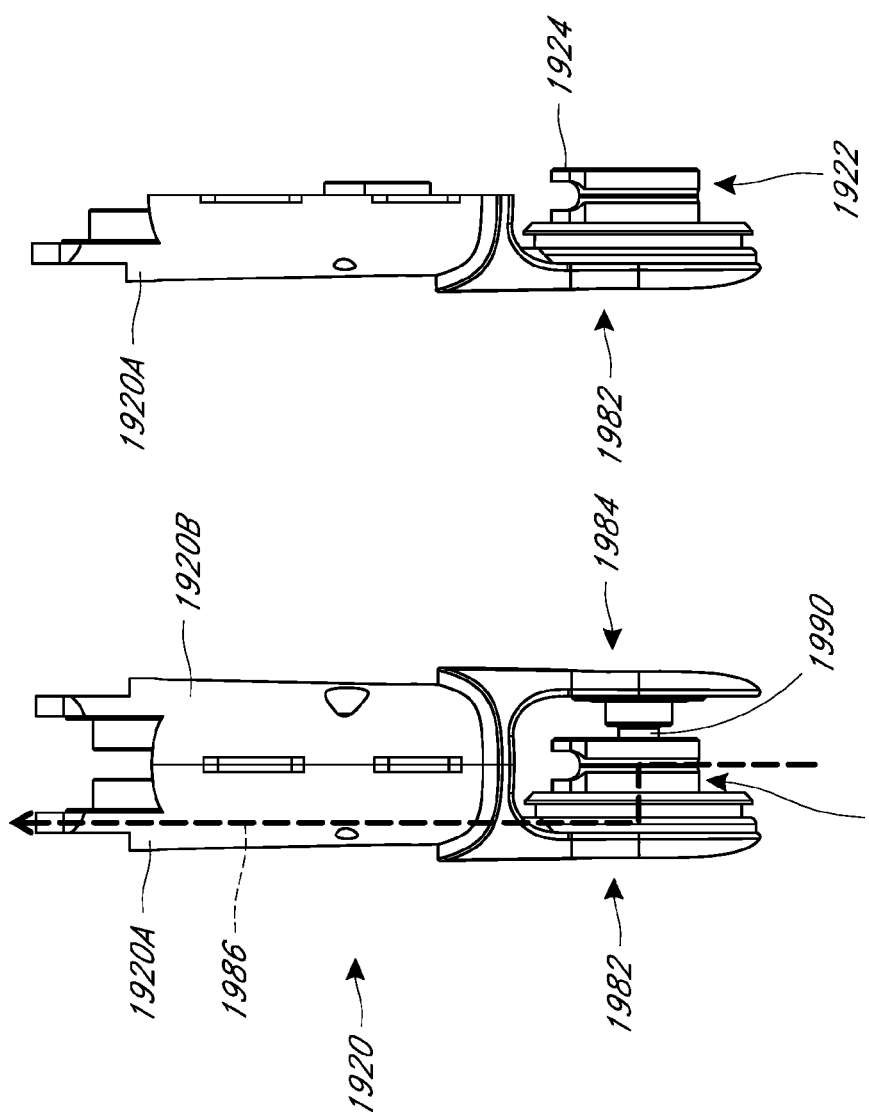
FIG. 40D   FIG. 40C   FIG. 40B

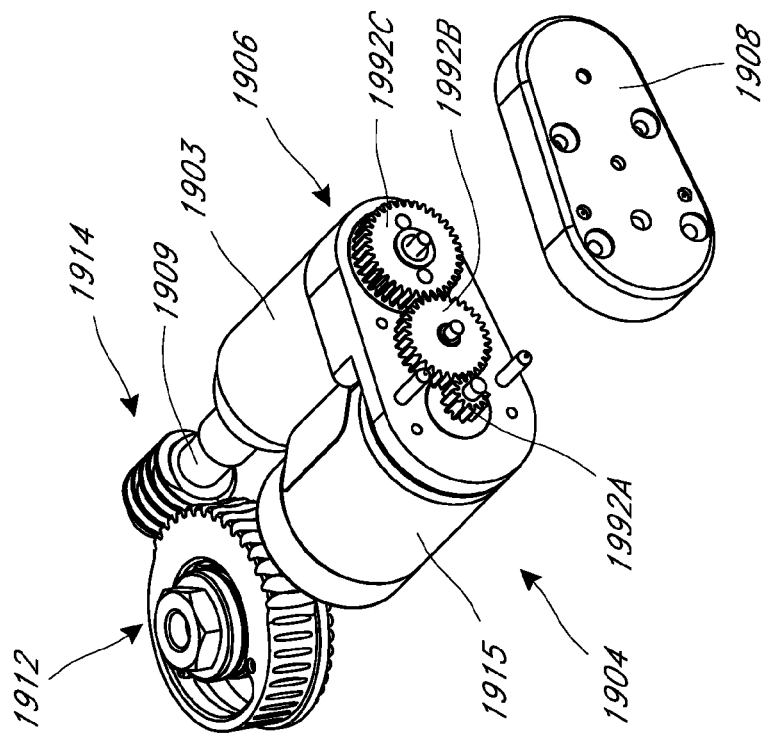
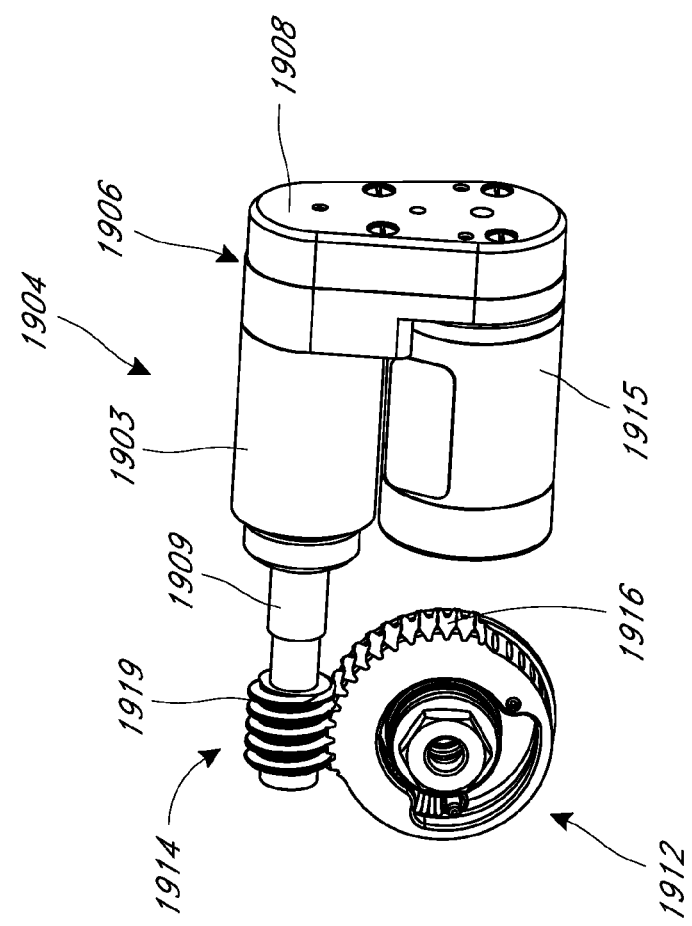
FIG. 41B
FIG. 41A

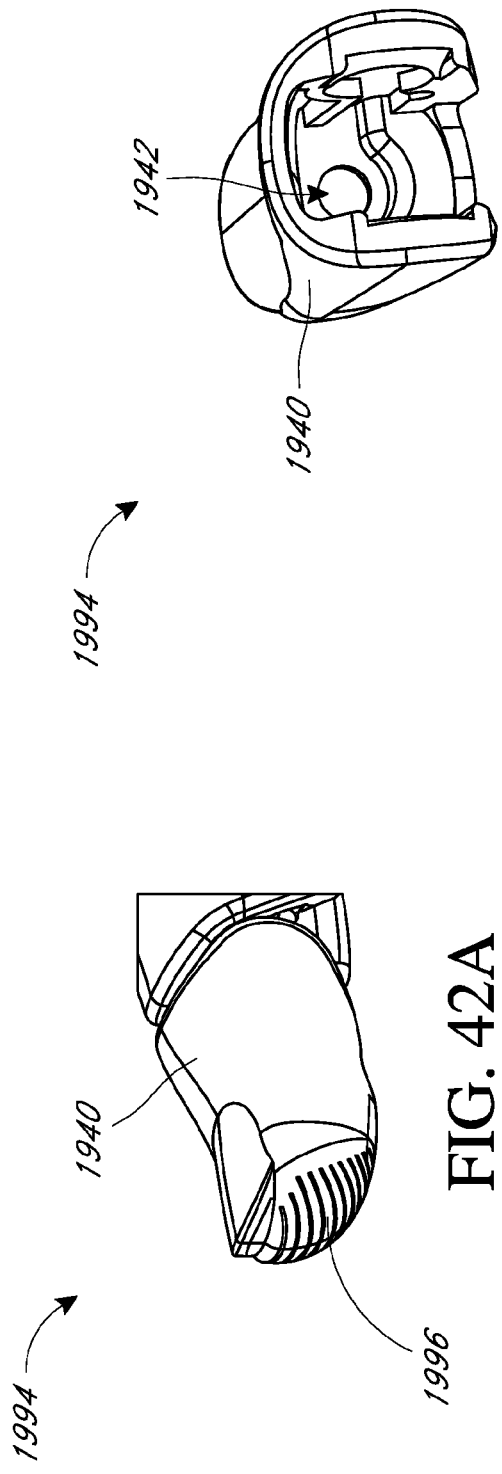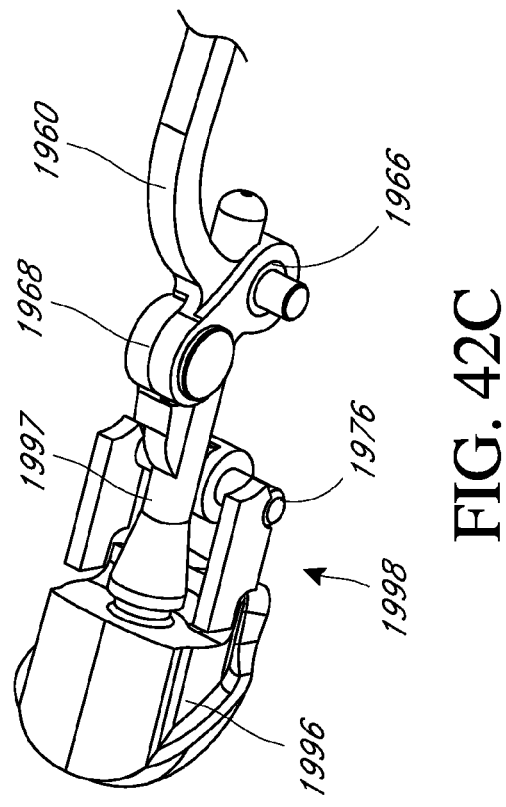
FIG. 42A
FIG. 42B
FIG. 42C

PROSTHETIC DIGITS AND ACTUATORS

INCORPORATION BY REFERENCE TO ANY PRIORITY APPLICATIONS

The present application claims priority to U.S. Provisional Patent Application No. 62/902,227, titled "PROSTHETIC DIGIT ACTUATORS WITH GEAR SHIFTING" and filed on Sep. 18, 2019, which is incorporated herein by reference in its entirety for all purposes and forms a part of this specification.

BACKGROUND

Field

Features for prosthetics are described, in particular prosthetic digits.

Description of the Related Art

Prosthetic digits are useful for amputees missing natural fingers. Existing solutions to prosthetic digits do not sufficiently mimic natural fingers and so functionality is not fully restored. Improvements to prosthetic digits are therefore desirable.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for prosthetic digits.

The following disclosure describes non-limiting examples of some embodiments. For instance, other embodiments of the disclosed systems and methods may or may not include the features described herein. Moreover, disclosed advantages and benefits can apply only to certain embodiments of the invention and should not be used to limit the disclosure.

Features for prosthetic digit actuation are described. The digit may include a rigid link having a flexible portion. The flexible portion may be a curved portion at a distal end thereof. The link may transmit rotational forces to segments of the digit to open and close the digit. The link's flexibility may absorb loads beyond a threshold amount to absorb force and reduce the risk of damage to the digit and actuator.

The digit may include a single-sided drive transmission on a lateral side of the digit. Actuation forces may be transmitted from the actuator to the link via a single side of the digit. The opposite side of the digit may include a supporting feature to assist with lateral loads beyond a threshold amount to prevent damage to the digit and actuator under such conditions. The support side may include two opposed surfaces with a gap therebetween, where under high lateral loads the gap is closed and the surfaces contact each other to introduce rotational resistive friction into the digit and prevent damage.

The digit may include a compact actuator having a motor and a gearbox positioned in parallel to each other. The motor and gearbox may be located at or near the knuckle joint of the prosthetic digit, or in the hand, and extend parallel to each other and parallel to a proximal segment of the digit. A transfer gear or gears, which may be arranged perpendicularly to the motor and gearbox, may transmit rotational force from the motor to the gearbox.

In another aspect, a prosthetic digit is described that comprises a mount, a proximal segment, a middle segment, a distal segment, a link, and an actuator. The mount is configured to attach to a hand. The proximal segment is rotatably attached to the mount. The middle segment is rotatably attached to the proximal and distal segments. The proximal segment has a drive side configured to be actuated to rotate the proximal segment. The proximal segment has a support side configured to provide rotational resistance to the digit in response to a threshold lateral load applied to the digit. The link is rotatably attached to the mount and rotatably attached to the middle segment. The link comprises a flexible portion at a distal portion thereof. The link is configured to flex in response to a threshold rotational force applied to the digit. The actuator is coupled with the mount. The actuator is configured to rotate the proximal segment via the drive side. The actuator comprises a motor and a gearbox in parallel and mechanically connected by one or more transfer gears.

In another aspect, a prosthetic digit is described that comprises a mount, a proximal segment, a middle segment, a distal segment, a link, and an actuator. The mount is configured to attach to a hand. The proximal segment is rotatably attached to the mount. The middle segment is rotatably attached to the proximal and distal segments. The proximal segment has a drive side configured to transmit actuation to the proximal segment. The proximal segment has a support side configured to provide support to the digit in response to a threshold lateral load applied to the digit. The support side comprises a first opposing surface separated from a second opposing surface by a gap therebetween. Under a lateral load applied to the digit beyond a threshold lateral load, the proximal segment is configured to flex laterally to close the gap such that the first and second opposing surfaces contact each other and increase rotational friction of the digit. The link is rotatably attached to the mount and rotatably attached to the middle segment. The link comprises a flexible portion. The actuator is coupled with the mount. The actuator is configured to rotate the proximal segment via the drive side. The actuator comprises a motor and a gearbox in parallel and mechanically connected by one or more transfer gears.

In another aspect, a prosthetic digit is described that comprises a mount, a proximal segment, a middle segment, a distal segment, a link, and an actuator. The mount is configured to attach to a hand. The proximal segment is rotatably attached to the mount. The middle segment is rotatably attached to the proximal and distal segments. The proximal segment has a drive side configured to be actuated to rotate the proximal segment. The proximal segment has a support side configured to provide rotational resistance to the digit in response to a threshold lateral load applied to the digit. The link is rotatably attached to the mount and the middle segment. The link comprises a flexible portion configured to flex in response to a threshold rotational force applied to the digit. The actuator is coupled with the mount. The actuator is configured to rotate the proximal segment via the drive side. The actuator comprises a motor extending parallel to a planetary gearbox. An output shaft of the motor is in mechanical communication with the planetary gearbox by a series of transfer gears located at a first end of the motor and planetary gearbox and that extend perpendicular to the motor and planetary gearbox.

Various embodiments of the various aspects may be implemented. For example, the link may further comprise a proximal link and a distal link. The distal link may comprise the flexible portion. The distal link may be rotatably attached to the proximal link and the distal segment. The proximal link may comprise a dogleg. Rotation of the proximal segment may cause the proximal, middle, and distal segments to rotate simultaneously.

In some embodiments, the actuator may further comprise an extension spring and a worm wheel. The extension spring may be configured to rotationally bias the worm wheel in an angular direction.

In some embodiments, the prosthetic digit may further comprise a thrust bearing. The thrust bearing may be configured to provide the rotational resistance in response to the threshold lateral load applied to the digit. The thrust bearing may be configured to provide rotational motion while taking an axial force. The thrust bearing may comprise the second opposing surface.

In some embodiments, the prosthetic digit may further comprise an elastomeric digit tip insert. The digit tip insert may be configured to couple to the distal segment. At least a portion of the insert may be conductive.

In some embodiments, a longitudinal axis of the motor may extend parallel to a longitudinal axis of the gearbox. A longitudinal axis of the motor may extend perpendicular to a longitudinal axis of a transfer gearbox housing the series of transfer gears.

In another aspect, features for a variable speed gearbox for prosthetic digit actuators are described. The gearbox shifts gears to adjust the speed and torque output by a motor. The gearbox allows for two or more combinations of speed and torque to be output. A shift ring is adjusted to selectively engage and/or disengage two or more stages of the gearbox. The stages may be planetary gears or harmonic drives. A motor provides rotational output via the engaged stages to an output shaft in mechanical communication with the prosthetic digit. The gear switching may be automatic based on mechanical and/or electronic feedback from the system. Axial force feedback may be provided, for example from a worm and wheel set using thrust detents that move in response to a threshold amount of axial force to cause a change in gear. Torque output feedback may be provided, for example by electronic sensors that cause an electronic actuator to cause a change in gear.

The gearbox may be incorporated into a variety of prosthetic digits, such as digits having multiple articulating digit segments, compact linear or rotational actuators, one or more rigid links, one or more tendons, and/or an expandable link, or other digits. Example digits using the gearbox mimic natural fingers by having three articulating segments, including a proximal, middle and distal segment. The segments are articulated by an actuator and mechanical links configured to cause rotation of the segments. The digit may have multiple degrees of freedom. A single actuator may be used for a single digit. A tendon may be used in some versions. The rotated digit may provide articulation that mimics a natural finger and thus fully surrounds a variety of shapes and sizes of objects to provide and restore enhanced gripping functionality to amputees. The digit provides space, weight and power savings due to the need for only a single actuator. These and other prosthetic digits may use the gearbox described herein. A spring-biased worm wheel transmission may provide a manual mode for rotation of the digit and prevent damage due to rotation induced by external forces acting on the digit.

In one aspect, a prosthetic digit is described. The prosthetic digit comprises a mount, a proximal segment, a middle segment, a distal segment, a proximal link, a distal link, and an actuator. The mount is configured to attach to a hand. The proximal segment is rotatably attached to the mount at a first pivot, and the middle segment is rotatably attached to the proximal and distal segments. The proximal link is rotatably attached to the mount and rotatably attached to the middle segment at a second pivot. The distal link is rotatably attached to the proximal link and rotatably attached to the distal segment at a third pivot. The actuator is coupled with the mount and the proximal segment, and the actuator is configured to cause the proximal segment to rotate about the first pivot, where rotation of the proximal segment about the first pivot causes the middle and distal segments to rotate.

In another aspect, a prosthetic digit is described. The prosthetic digit comprises a mount, a plurality of articulating segments comprising a proximal articulating segment, and an actuator. The mount is configured to attach to a hand. The proximal segment is rotatably attached to the mount at a first pivot and is rotatably attached to the actuator at a first joint. The first joint is located offset from the first pivot, such that linear actuation output by the actuator imposes a force at the first joint to cause the proximal segment to rotate about the first pivot.

In another aspect, a prosthetic hand is described that includes the prosthetic digit.

In another aspect, a prosthetic digit is described that comprises a mount, a proximal segment, a middle segment, a distal segment, a proximal expandable link, and an actuator. The mount is configured to attach to a hand. The proximal segment is rotatably attached to the mount, and the middle segment is rotatably attached to the proximal and distal segments. The proximal expandable link is rotatably coupled with the mount and configured to expand linearly such that the middle and distal segments can rotate independently of rotation of the proximal segment. The actuator is in mechanical communication with the middle and distal segments and configured to cause the middle and distal segments to rotate. In some embodiments, the actuator is in mechanical communication with the proximal segment via a tendon.

In another aspect, an actuator for a prosthetic digit is described that comprises a gearbox, a motor, a shaft, a leadscrew, and a housing. The motor is in mechanical communication with the gearbox. The shaft extends axially and distally from the gearbox. The leadscrew is coupled to the shaft and has an external thread. The motor is configured to cause the leadscrew to rotate in a first rotational direction. The housing is configured to couple with a prosthetic digit. The housing has an internal thread configured to engage the external thread of the leadscrew. Rotation of the leadscrew causes the housing to translate axially relative to the leadscrew to thereby cause the prosthetic digit to rotate.

In another aspect, a prosthetic digit is described that comprises an actuator having a mount, a motor, a leadscrew, and a housing. The mount is configured to attach to a hand. The motor is supported by the mount. The leadscrew is coupled with the motor and has an external thread. The motor is configured to cause the leadscrew to rotate about a first axis. The housing extends along the first axis and is configured to couple with a proximal end of a prosthetic digit. The housing defines an internal cavity having an internal thread that is engaged with the external thread of the leadscrew. Rotation of the leadscrew causes the housing to translate along the first axis to thereby cause the prosthetic digit to rotate.

In another aspect, a prosthetic digit comprises a base, a proximal segment, a middle segment, a distal segment, an actuator, a wheel, a tendon, a tendon guide, and an expandable link. The base is configured to attach to a prosthetic hand. The proximal segment is rotatably attached to the base. The middle segment is rotatably attached to the proximal and distal segments. The actuator is coupled with the base. The wheel is in mechanical communication with the actuator. The actuator is configured to rotate the wheel about a first axis. The tendon is coupled with the wheel and extending distally therefrom. The tendon guide is coupled with the prosthetic digit and the tendon extends along the tendon guide. The expandable link extends from a proximal end to a distal end. The proximal end is rotatably attached to the base about the first axis and the second end is rotatably attached with the middle segment. The actuator is configured to rotate the wheel in a first rotational direction to thereby pull the tendon proximally to cause the distal segment to rotate relative to the middle segment in a first rotational direction. The distal end of the expandable link is configured to extend distally relative to the proximal end of the expandable link to thereby allow the middle and distal segments to rotate independently of rotation of the proximal segment.

In another aspect, a gearbox for a prosthetic digit actuator is described. The gearbox comprises a housing, an output shaft, a first gear stage, a second gear stage, a third gear stage, and a shift ring. The housing extends axially from a proximal end to a distal end and the proximal end is configured to couple with a motor. The output shaft extends distally from the distal end of the housing. The first gear stage is positioned within the housing and is configured to mechanically communicate with the motor. The second gear stage is positioned distally of the first gear stage within the housing and configured to mechanically communicate with the first gear stage. The third gear stage is positioned distally of the second gear stage within the housing and is configured to mechanically communicate with the second gear stage and the output shaft. The shift ring is positioned within the housing and is configured to move axially between a first axial position and second axial position. In the first axial position, the shift ring is configured to engage the output shaft and the third gear stage to cause a first rotation of the output shaft having a first torque and a first speed in response to actuation of the motor. In the second axial position, the shift ring is configured to disengage with output shaft and engage the second and third gear stages to cause a second rotation of the output shaft with a second torque and second speed in response to actuation of the motor.

Various embodiments of the various aspects may be implemented. The first and second gear stages may each comprise a sun gear and a plurality of planetary gears. The third gear stage may comprise a plurality of planetary gears. The shift ring may be configured to engage the plurality of planetary gears of the third gear stage.

In another embodiment, the shift ring, the third gear stage, and the output shaft may be rotationally locked together in the first axial position. The shift ring may further comprise one or more projections extending distally, and the output shaft may comprise one or more splines. In the first axial position, the one or more projections may be received into the one or more splines such that the shift ring, the third gear stage, and the output shaft are rotationally locked together.

In another embodiment, the gearbox may further comprise a ring gear. The second gear stage may be configured to mechanically communicate with the first gear stage via the ring gear. In the second axial position, the shift ring may be configured to be in mechanical communication with the second gear stage via the ring gear.

In another embodiment, the shift ring may further comprise one or more first projections extending proximally and the ring gear may further comprise one or more second projections extending distally. In the second axial position, the one or more first projections may engage with the one or more second projections such that the shift ring is in mechanical communication with the second gear stage via the ring gear.

In another embodiment, the gearbox may further comprise a thrust detent located along the output shaft. The thrust detent may be configured to move axially in response to a threshold axial force applied to the thrust detent due to articulation of the prosthetic digit. The axial movement of the thrust detent may cause the shift ring to move axially between the first and second axial positions.

In another embodiment, the gearbox may further comprise an actuator configured to cause the shift ring to move axially between the first and second axial positions in response to receiving a signal from a torque sensor indicative of a threshold torque acting on the output shaft.

In another aspect, another gearbox for a prosthetic digit actuator is described. The gearbox comprises one or more first gear stages configured to mechanically communicate with a motor, a second gear stage configured to mechanically communicate with one of the one or more first gear stages, an output shaft configured to mechanically communicate with the second gear stage, and a shift ring configured to move axially between a first axial position and a second axial position. In the first axial position, the shift ring is configured to cause a first rotation of the output shaft in response to actuation of the motor. In the second axial position the shift ring is configured to cause a second rotation of the output shaft in response to actuation of the motor, with the first rotation having a different speed or torque than the second rotation.

In another embodiment, the one or more first gear stages may comprise two first gear stages. Each of the one or more first gear stages may comprise a sun gear and a plurality of planetary gears.

In another embodiment, in the first axial position, the shift ring may be configured to engage the output shaft and the second gear stage to cause the first rotation of the output shaft. In the second axial position, the shift ring may be configured to disengage the output shaft and engage the second gear stage and the one of the one or more first gear stages to cause the second rotation of the output shaft.

In another embodiment, the gearbox may further comprise a ring gear configured to mechanically communicate with the one of the one or more first gear stages. The second gear stage may be configured to mechanically communicate with the one of the one or more first gear stages via the ring gear.

In another embodiment, the gearbox may further comprise a thrust detent located along the output shaft. The thrust detent may be configured to move axially in response to a threshold axial force applied to the thrust detent due to articulation of the prosthetic digit. The axial movement of the thrust detent may cause the shift ring to move axially between the first and second axial positions.

In another embodiment, the gearbox may further comprise an actuator configured to cause the shift ring to move axially between the first and second axial positions in response to receiving a signal from a torque sensor indicative of a threshold torque acting on the output shaft.

In another embodiment, the shift ring may be configured to be moved manually between the first and second axial positions.

In another aspect, a mechanical method of switching gears for a prosthetic digit actuator is described. The method comprises articulating a prosthetic digit to apply an axial force to a thrust detent, adjusting an axial position of the thrust detent along a rotatable output shaft in response to the axial force exceeding a threshold axial force, and adjusting an axial position of a shift ring in response to the adjusting the axial position of the output shaft, to thereby change a torque and speed output by the rotatable output shaft.

In some embodiments, the prosthetic digit further comprises a distal link rotatably coupled with the proximal expandable link and with the distal segment.

In some embodiments, the proximal expandable link comprises a proximal portion, a distal portion, and a spring, where the proximal portion is in mechanical communication with the distal portion via the spring.

In another aspect, a prosthetic digit is described that comprises a mount, a plurality of articulating segments, and an actuator. The mount is configured to attach to a hand. The plurality of articulating segments comprise a proximal articulating segment. The proximal segment is rotatably attached to the mount at a first pivot, the proximal segment is rotatably attached to the actuator at a first joint, and the first joint is located offset from the first pivot, such that linear actuation output by the actuator imposes a force at the first joint to cause the proximal segment to rotate about the first pivot.

BRIEF DESCRIPTION OF THE DRAWINGS

FIGS. 3F-3H are sequential views of the prosthetic digit of FIGS. 3A-3D shown in various rotated configurations where the middle and distal segments rotate as the proximal segment rotates due to interaction of the links.

FIGS. 5A-5E are various views of the expandable link used in the prosthetic digit of FIGS. 4A-4D.

FIGS. 7A-7D are sequential views of the prosthetic digit of FIGS. 4A-4D shown in various rotated configurations where the middle and distal segments rotate independently of rotation of the proximal segment due to interaction of the links.

FIGS. 10A-10C are various views of an embodiment of a prosthetic digit, having articulating proximal, middle and distal segments and mechanically-connected rigid links, that may be used with the lower arm stump of FIGS. 1A-1B or prosthetic hand of FIGS. 2A-2B.

FIGS. 16A-C are schematics of a switchable one stage gearbox with a single stage switch.

FIGS. 17A-C are schematics of a switchable two stage gearbox with a single stage switch.

FIGS. 18A-C are schematics of a switchable three stage gearbox with a two stage switch.

FIG. 22 is a schematic showing an embodiment of a control system for the various actuators described herein.

FIG. 23 is a flow diagram depicting an embodiment of a method of controlling the motor while changing gears.

FIGS. 30B-D illustrate sequential steps in which the actuator in FIG. 28A achieves synchronization between the shift ring and the ring gear.

FIGS. 31A-31C depict three examples of detent profiles and resulting force vs. displacement plots.

FIGS. 32A-32B are perspective and cross-section views respectively of another embodiment of a prosthetic digit, having articulating proximal, middle and distal segments.

FIGS. 39A-39B are exploded views of portions of the proximal segment and mount of the prosthetic digit of FIGS. 36A-36B configured to engage the actuator.

FIGS. 40B-40D are various views of the proximal segment of the prosthetic digit of FIGS. 36A-36B illustrating the drive side and the support side of the proximal segment.

FIGS. 41A-41B are various views of the actuator of the prosthetic digit of FIGS. 36A-36B illustrating the motor, gearbox, and transfer gears.

FIGS. 42A-42C are various views of the digit tip assembly of the prosthetic digit of FIGS. 36A-36B illustrating the removable digit tip insert.

Figure 1A:
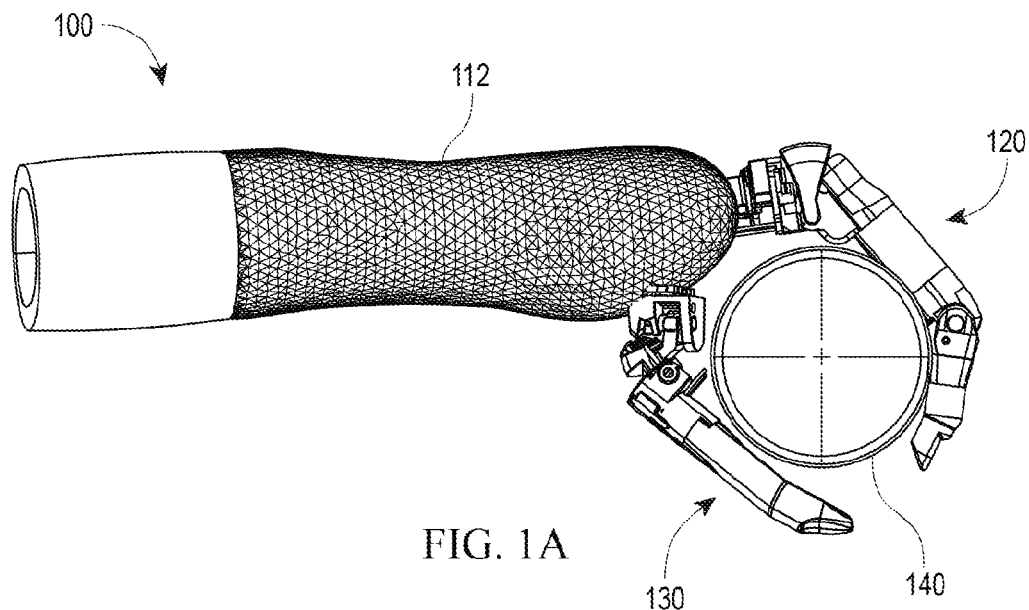
FIGS. 1A-1B are side and front views, respectively, of a lower arm stump having embodiments of prosthetic digits attached thereto, which prosthetic digits may be any of the prosthetic digits described herein.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure.

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Features for prosthetic digits are described. The digits mimic natural fingers by having three articulating segments, including a proximal, middle and distal segment. The segments are articulated by an actuator and rotatably connected mechanical links configured to contribute to and/or cause rotation of the digit segments. Some versions may use one or more tendons to apply opening and closing forces to the digit. Other version may not need a tendon to effect articulation of the segments. Rotation of a proximal segment causes rotation of the middle and distal segments via mechanical interaction of the links There may be a proximal link and a distal link. The digit may have an actuator that outputs linear actuation to cause rotation of the proximal segment and/or proximal link. The actuator may linearly translate a housing that is rotatably connected to the proximal segment at a joint. The housing pushes on the proximal segment at the joint to create a torque on the segment about an offset pivot. The pivot may be a pin attaching the proximal segment to the proximal link. The pivot is at a location offset from the joint. In some embodiments, the proximal link may be linearly expandable and retractable to allow for variable relative rotational positions of the digit segments. The distal digit segment may rotate independent of rotation of the proximal digit segment. The digit may thus have multiple degrees of freedom with only a single actuator. The rotated digit may provide articulation that mimics a natural finger and thus fully surrounds both small and large objects to provide and restore enhanced gripping functionality to amputees. The digit provides space, weight and power savings due to the need for only a single actuator. The segments may provide movement similar to movement of respective human phalanges in sound natural fingers.

In some embodiments, the digit includes transmission features for a worm wheel rotation by a lead screw. A keyed member such as a central axle is spring-biased and transmits rotation from the worm wheel to the digit while allowing for manual rotation of the digit without damaging the worm wheel or other components. In some embodiments, the digit may include a link having flexibility to cause rotation of the digit segments while absorbing shock or otherwise high loads. The digit may include a single-sided drive mechanism, where the opposite side provides support in case of high lateral loads. The digit may include a motor and gearbox in parallel and connected mechanically via a transfer gear or gears. Any of the features described with respect to any of the embodiments described herein may be used with any other embodiment. For example, any features of the digits or components thereof as described with respect to FIGS. 1A-31C may be used with any of the digits or components thereof as described with respect to FIGS. 32A-42C, and vice versa.

Figure 1B:
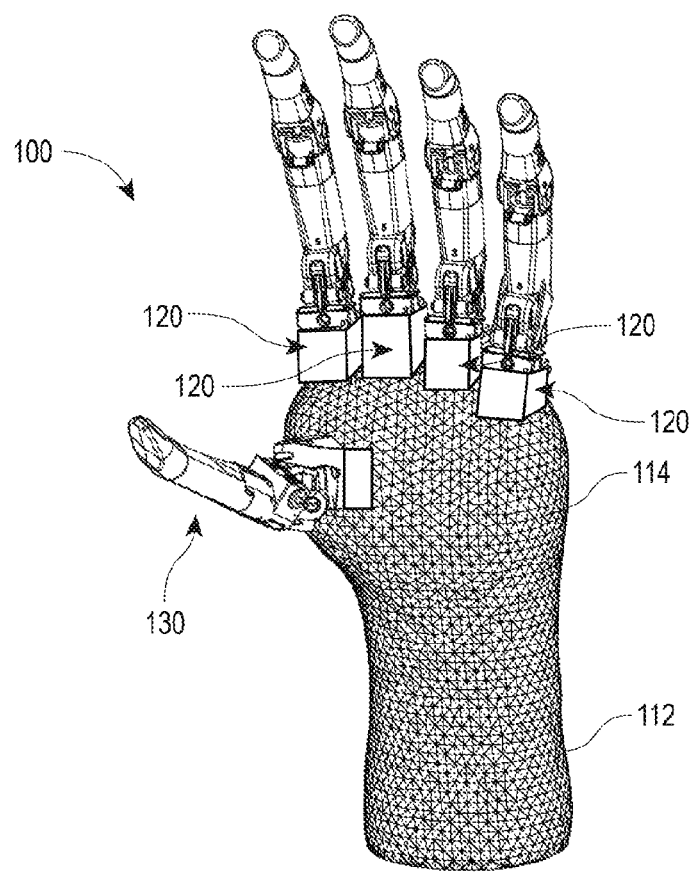

FIGS. 1A-1B are side and front views, respectively, of a lower arm prosthetic system 100 including a lower arm stump 112 having four prosthetic digits 120 and a prosthetic thumb 130 attached to the stump 112. FIG. 1A is a side view of the system 100. FIG. 1B is a front or palm-side view of the system 100. The prosthetic digits 120 and/or thumb 130 may be any of the prosthetic digits described herein. The digits 120 may be connected to the end of the lower arm stump 112, as shown in FIG. 1A, or to a residual natural palm 114, as shown in FIG. 1B.

As shown in FIG. 1A, the digits 120 and thumb 130 are grasping an object 140, shown as a round object such as a can or ball. The digits 120 are surrounding the object 140 such that the object 140 may be held securely by the system 100. The rotatable capability of the segments of the digits 120 allows for this secure grasp. The shape of the object 140 has a width and contour that allows the articulating digits 120 to provide a secure grasp. The digits 120 have various articulating segments that may rotate at various angles with respect to the adjacent segment. In some embodiments, the segments may rotate accordingly to a fixed angular relation, such that only certain sizes and shapes of objects 140 may be securely grasped. In some embodiments, the segments may rotate accordingly to a variable angular relation, such that only different sizes and shapes of objects 140 may be securely grasped.

Figures 2A, 2B:
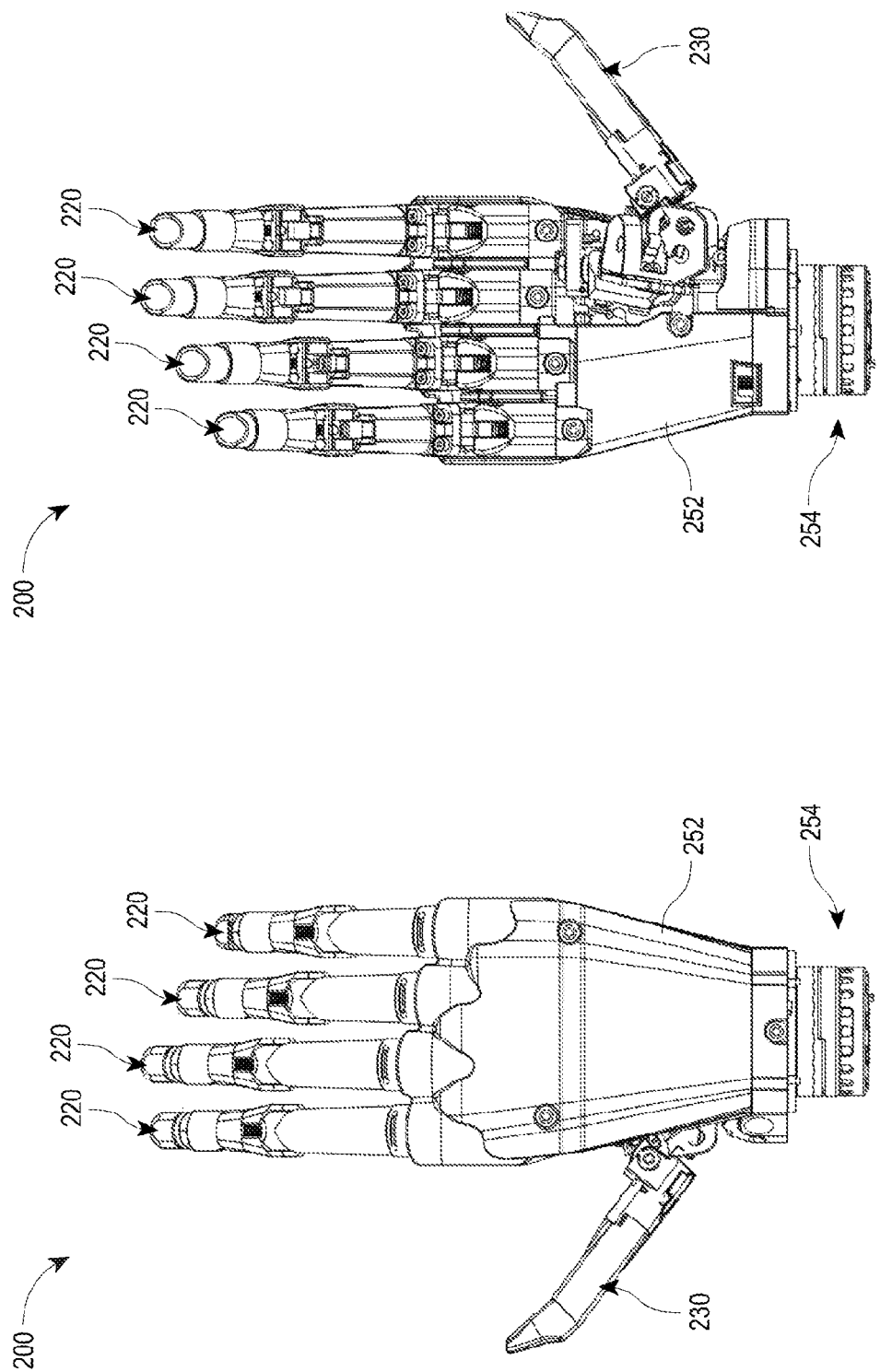
FIGS. 2A-2B are back and front views, respectively, of a prosthetic hand incorporating embodiments of prosthetic digits, which prosthetic digits may be any of the prosthetic digits described herein.

FIGS. 2A-2B are back and front views, respectively, of a prosthetic hand 200 incorporating embodiments of prosthetic digits 220 and a prosthetic thumb 230. The hand 200 has a palm portion 252 attached to proximal ends of the digits 220 and thumb 230. The hand 200 may have a wrist 254 that may rotate, which may allow for rotation of the palm portion 252, and the digits 220 and thumb 230 attached thereto, about a longitudinal axis defined by the wrist 254. The prosthetic digits 220 may be any of the prosthetic digits described herein. The prosthetic digits 220 may rotate according to a fixed or variable angular relation among the articulating digit segments, as described with respect to the system 100 of FIGS. 1A-1B.

FIGS. 3A-3D are various views of an embodiment of a prosthetic digit 300. The digit 300 may be used with the system 100 or hand 200. The digit 300 includes an actuator 301, a mount 350, a proximal segment 320, a middle segment 330, and a distal segment 340. The segments may articulate, for example rotate, relative to each other. The digit 300 includes mechanically-connected links, which may be rigid, as further described herein, for example with respect to FIGS. 3D-3G. The segments 320, 330, 340 may provide natural movement similar to that provided respectively by proximal, middle and distal phalanges of a sound natural finger.

The mount 350 and/or the actuator 301 may be connected with and/or located within, partially or completely, the arm stump 112, the residual palm 114, or the prosthetic palm 252. The proximal segment 320 may rotate relative to the mount 350 and/or the actuator 301. The middle segment 330 may rotate relative to the proximal segment 320. The distal segment 340 may rotate relative to the middle segment 330.

Figure 3A:
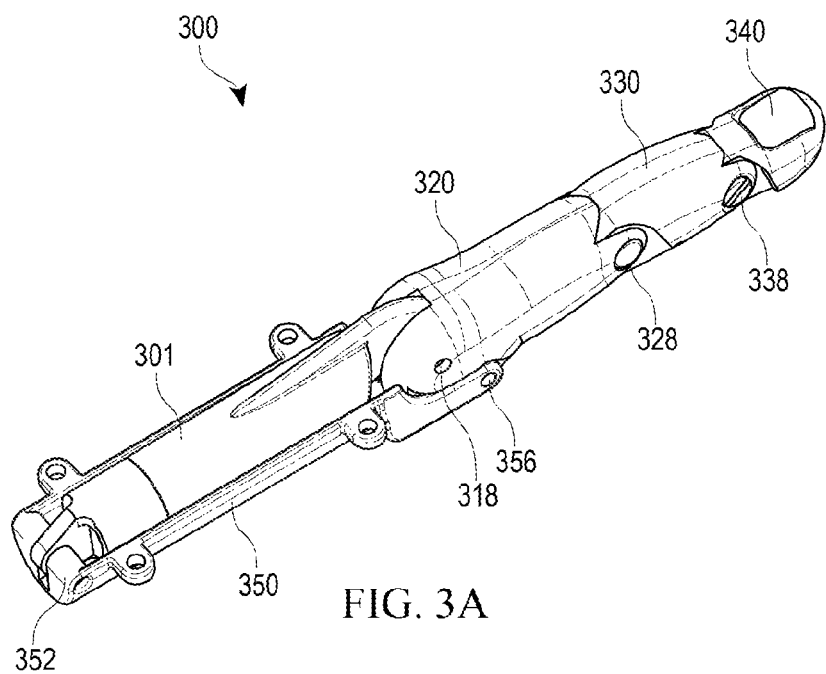
FIGS. 3A-3D are various views of an embodiment of a prosthetic digit, having articulating proximal, middle and distal segments and mechanically-connected rigid links, that may be used with the lower arm stump of FIGS. 1A-1B or prosthetic hand of FIGS. 2A-2B.
Figure 3B:
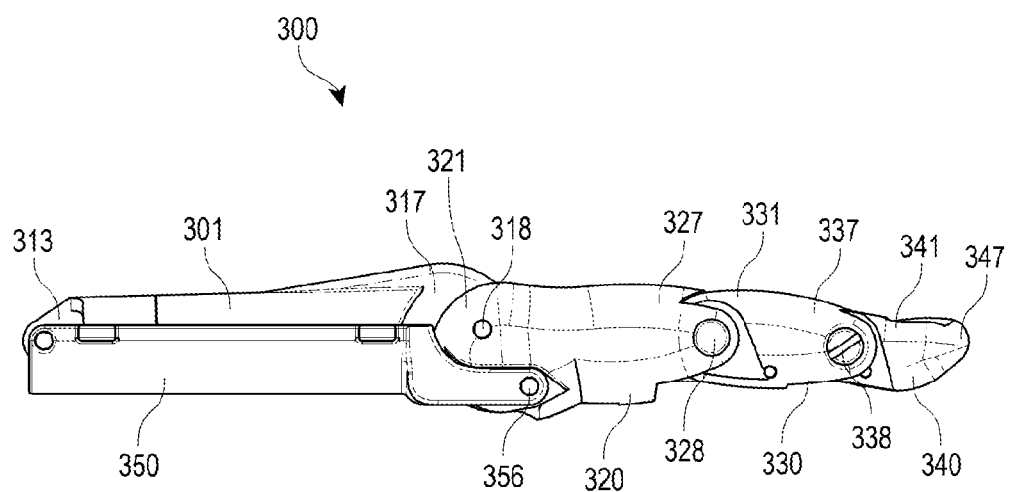

As shown in FIG. 3B, the actuator 301 includes a proximal end 313 and extends to a distal end 317. The proximal end 313 may attach to a hand, palm, etc. The distal end 317 attaches to a proximal end 321 of the proximal segment 320. The proximal segment 320 is rotatable relative to the actuator 301 about the joint 318. The actuator 301 may apply a normal force to the proximal segment 320 at the joint 318 to cause the proximal segment 320 to pivot about an offset first pivot 356, as further described herein. The proximal segment 320 extends from the proximal end 321 to a distal end 327. The distal end 327 attaches to a proximal end 331 of the middle segment 330. The middle segment 330 is rotatable relative to the proximal segment 320 about the joint 328. The middle segment 330 extends from the proximal end 331 to a distal end 337. The distal end 337 attaches to a proximal end 341 of the distal segment 340. The distal segment 340 is rotatable relative to the middle segment 330 about the joint 338. The rotatable connections at the joints 318, 328, 338 may include pin connections, hinges, and/or other suitable features for providing a rotatable engagement.

Figure 3C:
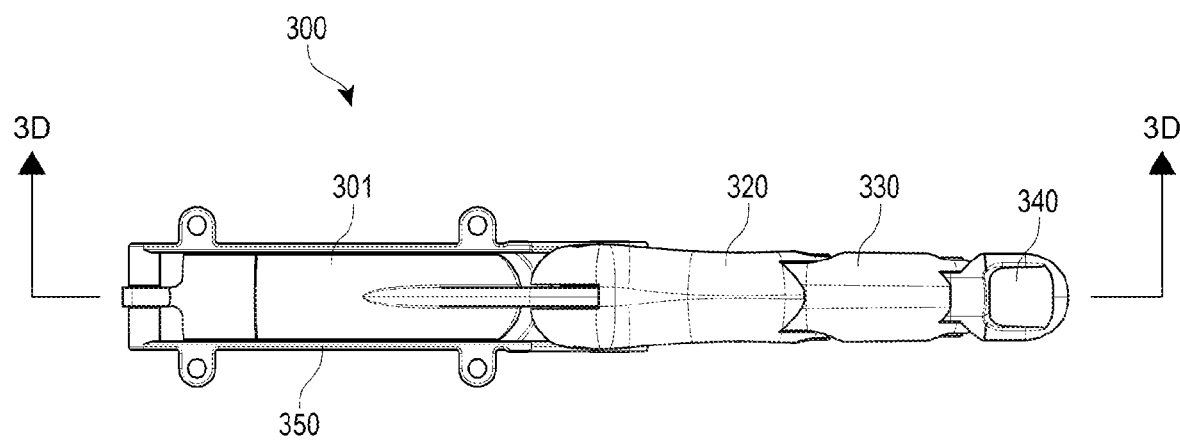
Figure 3D:
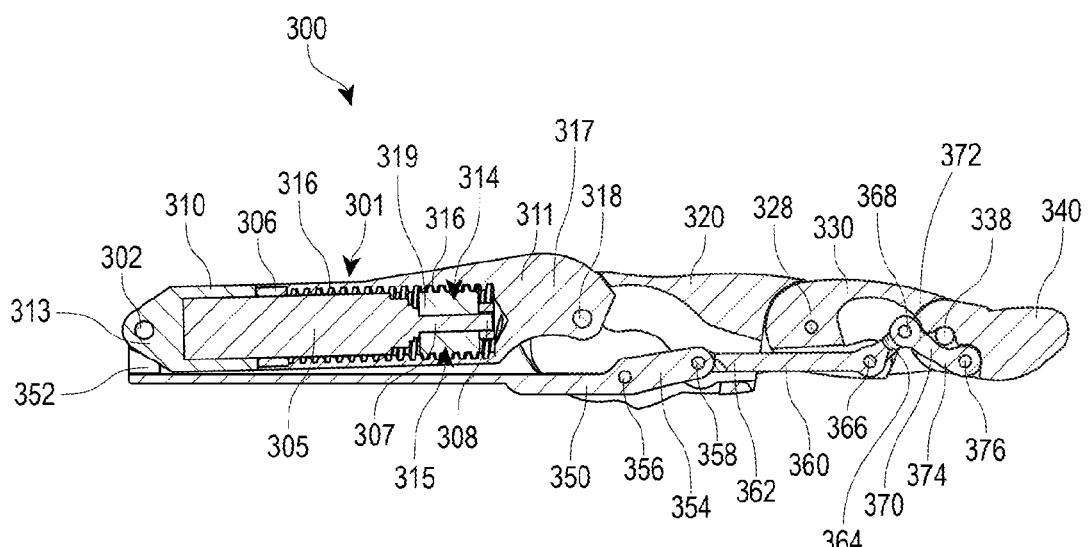

FIG. 3D is a cross-section view of the digit 300, as taken along the line 3D-3D indicated in FIG. 3C. As shown in FIG. 3D, the digit 300 may include the actuator 301. The actuator 301 may be a linear actuator. The actuator 301 produces or results in linear motion. As shown, the actuator 301 may include a motor 305 supplied with power from a battery, which may be in the hand or other location. A support 310, such as a motor mount or other structure, may carry or otherwise support the actuator 301. The support 310 may have a pin 302 or other suitable feature in a proximal end thereof to secure, for example rotatably attach, the support 310 with the mount 350.

The actuator 301 includes a housing 311. The housing 311 extends axially and defines a cavity 315 therein. The cavity 315 may be a cylindrical opening extending axially through the housing 311. A proximal end of the housing 311 may be open to the cavity 315. A distal end of the housing 310, for example at the distal end 37 of the actuator 301, connects with the proximal segment 320 at the joint 318. The housing 311 translates axially to cause rotation of the proximal segment 320, as further described herein.

The motor 305 may be supported, for example a fixed portion thereof, by the support 310. There may be a bushing 306 rotationally supporting a rotating portion of the motor 305, which may be located within and/or supported by the support 310. The motor 305 may include a shaft 307 extending therefrom, for example extending distally therefrom, that is rotated about an axis along which the shaft 307 extends. A cap 308, such as a nut, may attach to a distal end of the shaft 307. A leadscrew 314 having external threads 319 thereon may be positioned about the shaft 307 and secured in place by the cap 308. The leadscrew 314 may be a nut having external threads or other suitable features that engage corresponding internal structure of the housing 311 to translate the housing 311 back and forth.

The actuator 301 may output linear motion to cause rotation of the digit 300, as further described. The motor 305 or other portions of the actuator 301 may use or provide rotary, linear, cyclic and/or other types of motion. As shown, the actuator 301 is in mechanical communication with the leadscrew 314 having external threads 319. The actuator 301 rotates the leadscrew 314. The external threads 319 of the leadscrew 314 are in mechanical communication with internal threads 316 of the housing 311. The internal threads 316 may be located along the cavity 315 of the housing 311. The housing 311 may move relative to the support 310. The leadscrew 314 is rotated while remaining axially stationary to cause the housing 311 to translate axially along an axis defined by the cavity 315 via interaction of the external and internal threads 314, 316. The threaded engagement features and rotational motion of the actuator 301 is one example embodiment. Other features and/or actuator types may be used to output linear motion of the housing 311.

As the housing 311 is advanced distally and proximally, the actuator 301 may rotate about the pin 302 to accommodate the rotating proximal segment 320. For instance, the joint 318 may translate slightly during rotation, and the distal end of the housing 311 may move accordingly such that the actuator 301 rotates slightly at the pin 302. The actuator 301 may rotate counterclockwise as oriented in FIG. 3D during a distal movement of the housing 311 for a closing rotational movement of the segments 320, 330, 340. The actuator 301 may rotate clockwise as oriented in FIG. 3D during a proximal movement of the housing 311 for an opening rotational movement of the segments 320, 330, 340. Other configurations of the digit 300 may result in opposite rotations of the actuator 310 during opening and closing of the segments 320, 330, 340.

As further shown in FIG. 3D, the digit 300 includes a mount 350, a proximal link 360, and a distal link 370. The mount 350 extends from a proximal end 352 to a distal end 354. The proximal link 360 extends from a proximal end 362 to a distal end 364. The distal link 370 extends from a proximal end 372 to a distal end 374.

The proximal end 352 of the mount 350 may be attached to a proximal end of the actuator 301, for example rotatably attached thereto. The mount 350, such as at the proximal end 352 and/or other locations, may be attached to a hand, such as a prosthetic hand. Further details of the mount 350 are described herein, for example with respect to FIG. 3H. The distal end 354 of the mount 350 is rotatably attached to the proximal end 362 of the proximal link 360 about a connection 358. The mount 350 is also rotatably attached to the proximal segment 320 of the digit 300 about a first pivot 356. The first pivot 356 is located between the proximal and distal ends 352, 354 of the mount 350.

The proximal link 360 is rotatably attached to the middle segment 330 of the digit 300 about a second pivot 366. The second pivot 366 is located between the proximal and distal ends 362, 364 of the proximal link 360. The proximal link 360 may include a dogleg, where the proximal end 362 extends along a first axis and the distal end 364 extends a long a second axis that is at an angle relative to the first axis. The second pivot 366 may be located at or near the vertex of the dogleg of the proximal link 360. The distal end 364 of the proximal link 360 is rotatably attached to the proximal end 372 of the distal link 370 about a connection 368. The distal end 374 of the distal link 370 is rotatably attached to the distal segment 340 of the digit 300 about a third pivot 376.

In sum, the digit segments 320, 330, 340 are, respectively, rotatably attached to the links 320, 330, 340 at, respectively, the pivots 356, 366, 376. The segments 320, 330, 340 are rotatably attached to each other at the joint 318, which rotatably connects the proximal segment 320 to the middle segment 330, and at the joint 328, which rotatably connects the middle segment 330 to the distal segment 340. The links 350, 360, 370 are rotatably attached to each other at the connection 358, which rotatably connects the mount 350 to the proximal link 360, and at the connection 368, which rotatably connects the proximal link 360 to the distal link 370.

All or some of the rotatable connections at the joints 318, 328, 338, at the pivots 356, 366, 376, and at the connections 358, 368 may include pins, hinges, and/or other suitable features for providing a rotatable engagement. The axes of rotation for the joints 318, 328, 338, pivots 356, 366, 376, and connections 358, 368 may be perpendicular to a longitudinal axis of the digit 300. Such longitudinal axis may be defined by the fully extended digit 300, for example as shown in FIG. 3F. The longitudinal axis may be defined by the direction of linear movement provided by the actuator 301, for example the direction of linear movement of the leadscrew 314. The rotation axes for the joints 318, 328, 338, pivots 356, 366, 376, and connections 358, 368 may be parallel to each other. The locations of the joints 318, 328, 338, pivots 356, 366, 376, and connections 358, 368 may change as the digit 300 rotates, for example some or all of these the locations may change relative to the support 310 and/or relative to the mount 350.

Figure 3E:
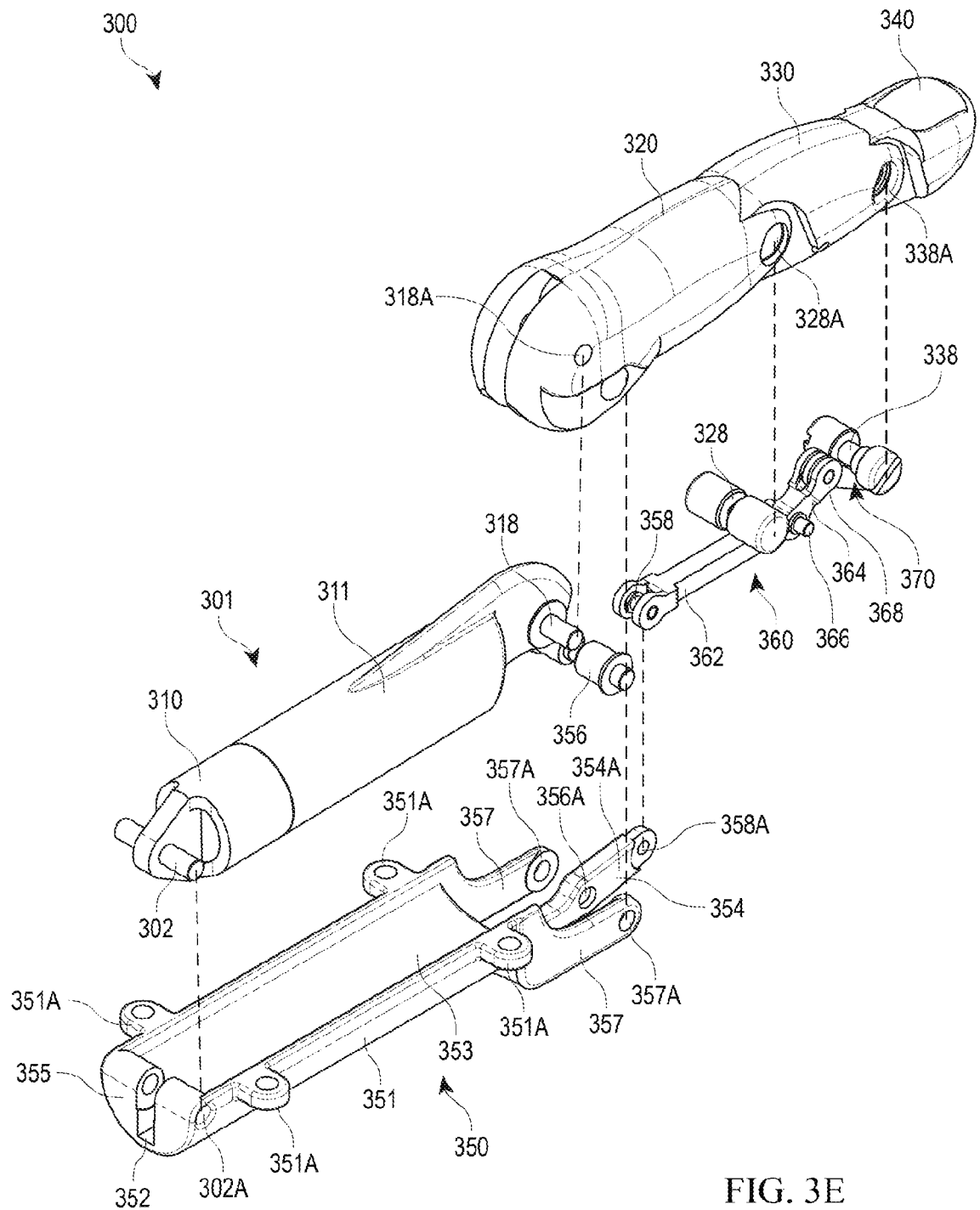
FIG. 3E is a partially exploded perspective view of the prosthetic digit of FIGS. 3A-3D.

FIG. 3E is a partially exploded perspective view of the prosthetic digit 400. As shown, the mount 350 includes an elongated proximal portion 351 defining a cavity 353 therein. The proximal end 352 includes a proximal wall 355 having openings 302A extending therethrough. The pin 302 of the support 310 may extend through the openings 302A to rotatably connect the proximal ends of the actuator 301 and mount 351. This allows the actuator 301 to rotate slightly at the proximal end as needed for digit actuation. The mount 350 includes a series of tabs 351A to connect the mount 350 to a hand, such as the prosthetic hand 200 or the palm 114. The mount 350 may fixedly attach to the hand. There may be four tabs 351A as shown, or more or fewer than four. The mount 350 includes two distally extending forks 357. The forks 357 extend from the distal end of the portion 351. The forks 357 define a space therebetween that receives a proximal portion of the proximal segment 320. The forks 357 include openings 357A that receive therein the pivot 356. The pivot 356 is shown as a pin with rollers.

The mount 350 includes a prong 354A extending distally from the proximal end of the portion 351. The prong 354A is located between the forks 357. The prong 354A is at the proximal end 354 of the mount 350. The prong 354A includes an opening 356A therethrough that receives therein a central portion of the pivot 356. The pivot 356 may thus rotate within the openings 356A, 357A, and/or provide an axle about which the proximal segment 320 rotates. The prong 354A includes an opening 358A at a distal end thereof. The opening 358A receives therein the connection 358, shown as a pin. The connection 358 may thus rotate within the openings 358A, and/or provide an axle about which the proximal link 360 rotates, as described herein.

The actuator 301 includes the joint 318, shown as a pin. The joint 318 is received into openings 318A of the proximal segment 320. The joint 318 may be a shear pin that is pushed by the housing 311 axially to impart a force on the proximal segment 320 at the openings 318A. The joint 318 is offset from the pivot 356. Thus pushing on the joint 318 will create a torque on the proximal segment about the pivot 356. The axes of rotation of the joint 318 and pivot 356 may be parallel to each other.

The middle segment 330 includes one or more openings 328A which receives the joint 328 therein. The joint 328 is shown as a pin. The joint 328 may thus rotate within the openings 328A, and/or provide an axle about which the proximal and middle segments 320, 330 rotate, as described herein. The distal segment 340 includes one or more openings 338A which receives the joint 338 therein. The joint 338 is shown as a pin. The joint 338 may thus rotate within the openings 338A, and/or provide an axle about which the middle and distal segments 330, 340 rotate, as described herein.

FIGS. 3F-3H are sequential views of the prosthetic digit 300 shown in various rotated configurations. "Distal" and "proximal" as used herein have their usual and ordinary meaning. For clarity, the "distal" and "proximal" directions are indicated in FIG. 3F for the fully extended digit 300, and generally refer to a direction or portion of the digit 300 that is, respectively, farther from or closer to the proximal end 352 of the mount 350 along the length of the digit 300. FIG. 3F shows an embodiment of a fully straightened digit 300, FIG. 3G shows an embodiment of partially closed digit 300, and FIG. 3H shows an embodiment of a fully closed digit 300.

The middle and distal segments 330, 340 may rotate as the proximal segment 320 rotates due to interaction of the mount 350 and links 360, 370 as further described. As shown, for example in FIG. 3H, the distal segment 340 may completely close such that the distal segment 340 is parallel or near parallel with the proximal segment 320. In some embodiments, the distal segment 340 may rotate through this parallel position such that at full rotation the distal segment 340 is angled back toward the middle segment 320. The distal segment 340 may contact the proximal segment 320 in the fully rotated configuration. Such full or more complete closure of the distal segment 340 provides advantageous gripping capability with the digit 300 and more fully restores lost sound finger dexterity to a user, such as an amputee. The features described herein, such as the configuration and interaction of the mount 350, links 360, 370 and segments 320, 330, 340, among other things, contribute to such advantages.

To cause rotation of the digit 300, the actuator 301 may rotate the leadscrew 314 having the external thread. The external threads of the leadscrew 314 mechanically communicate with internal threads 316 of the housing 311. The actuator 301 may rotate the leadscrew 314 in a first rotational direction to cause the housing 311 to move, for example to translate, distally relative to the leadscrew 314. The leadscrew 314 may remain axially stationary. The housing 311 moves farther distally as shown sequentially from FIG. 3F to FIG. 3G to FIG. 3H. The direction of rotation of the digit 300 may be reversed (e.g., from FIG. 3H to FIG. 3G to FIG. 3F) by the actuator 301 rotating the leadscrew 314 in a second rotational direction, that is opposite to the first rotational direction, to cause the housing 311 to move, for example to translate, proximally relative to the leadscrew 314.

Distal movement of the housing 311 causes the proximal end 321 of the proximal segment 320 to move distally via the rotatable connection at the joint 318. Distal movement of the proximal segment 320 at the joint 318 will cause the proximal segment 320 to rotate clockwise (as oriented in the figures) about the first pivot 356 due to the offset locations of the joint 318 and the pivot 356. A line of action of force is imparted on the proximal segment 320 that extends through the joint 318 and thus imparts a moment on the proximal segment 320 about the pivot 356. The clockwise rotation of the proximal segment 320 about the first pivot 356 causes clockwise rotation of the proximal segment 320 relative to the housing 311 about the joint 318. Thus, the proximal segment 320 rotates clockwise as shown sequentially viewed from FIG. 3F to FIG. 3G to FIG. 3H. To reverse the direction of rotation in the counterclockwise direction (as oriented in the figures), these movements may be reversed, where the housing 311 is moved proximally to cause the proximal end 321 of the proximal segment 320 to move proximally and rotate counterclockwise about the first pivot 356 and the joint 318. A pinned or other type connection at the joint 318 as described herein may allow for such pushing and pulling forces by the housing 311 to be transferred to the proximal segment 320.

As the proximal segment 320 rotates clockwise about the pivot 356, the middle segment 330 also rotates clockwise with the rotating proximal segment 320 due to the connection of the two segments 320, 330 at the joint 328. In some embodiments, the middle segment 320 may be constrained from rotating farther in the counterclockwise direction, for instance the configuration shown in FIG. 3F may be the limit of rotation of the middle segment 330 relative to the proximal segment 320 about the joint 328.

The rotation of the middle segment 330 also causes the distal segment 340 to rotate clockwise, due to the connection of the two segments 330, 340 at the joint 368. In some embodiments, the distal segment 340 may be constrained from rotating farther in the counterclockwise direction, for instance the configuration shown in FIG. 3F may be the limit of rotation of the distal segment 340 relative to the middle segment 330 about the joint 338.

As the middle segment 320 rotates clockwise, the proximal link 360 also rotates clockwise due to the connection of the middle segment 320 and the proximal link 360 at the second pivot 366. Further, the proximal link 360 is translationally constrained by the mount 350 at the rotatable connection 358. The proximal link 360 thus rotates clockwise about the connection 358. The joint 328 is offset from the second pivot 366 as shown. Thus a torque may be imposed on the middle segment 320 about the pivot 366. The axes of rotation of the joint 328 and second pivot 366 may be parallel.

As the proximal link 360 rotates clockwise about the connection 358, this also causes the distal link 370 to rotate clockwise due to the translational constraint between the proximal link 320 and the distal link 330 at the rotatable connection 368. As the distal link 330 rotates clockwise, the distal segment 340 is translationally constrained by the distal link 330 at the third pivot 376. The distal segment 340 also rotates relative to the middle segment 330 about the rotatable connection at the joint 338. The joint 338 is offset from the third pivot 376 as shown. Thus a torque may be imposed on the distal segment 340 about the pivot 376. The axes of rotation of the joint 338 and third pivot 376 may be parallel.

The distal segment 340 thus rotates farther clockwise about the third pivot 376 to provide the closed configuration shown in FIG. 3H.

The digit 300 may be rotated in the counterclockwise direction sequentially from the configurations shown in FIG. 3H to FIG. 3G to FIG. 3F. The counterclockwise rotation operates in reverse as described above with respect to the clockwise rotation. For example, proximal movement of the proximal end 321 of the proximal segment 320 pulls proximally at the joint 318 and causes the proximal segment 320 to rotate counterclockwise about the pivot 356, which causes the middle segment 330 and proximal link 360 to rotate counterclockwise respectively about the joint 328 and pivot 366, which causes the distal segment 340 and distal link 370 to rotate counterclockwise respectively about the joint 338 and pivot 376.

FIGS. 4A-4D are various views of another embodiment of a prosthetic digit 400. The digit 400 may be used with the system 100 or hand 200. The digit 400 includes a mount 410, a proximal segment 420, a middle segment 430, and a distal segment 440. The mount 410 and segments 420, 430, 440 may have the same or similar features and/or functions as the mount 350 and segments 320, 330, 340, and thus may articulate, for example rotate, relative to each other. The digit 400 includes mechanically-connected rigid links including an expandable proximal link 450, as further described herein, for example with respect to FIGS. 4D-7D.

The mount 410 and segments 420, 430, 440 may be rotatably attached at joints 418, 428, 438, which may have the same or similar features and/or functions as the joints 318, 328, 338, respectively. However, the mount 410 may not have a linearly translatable portion. The digit 400 may have an actuator 404, which may have the same or similar features and/or functions as the actuator 301, except as otherwise described.

Figure 4A:
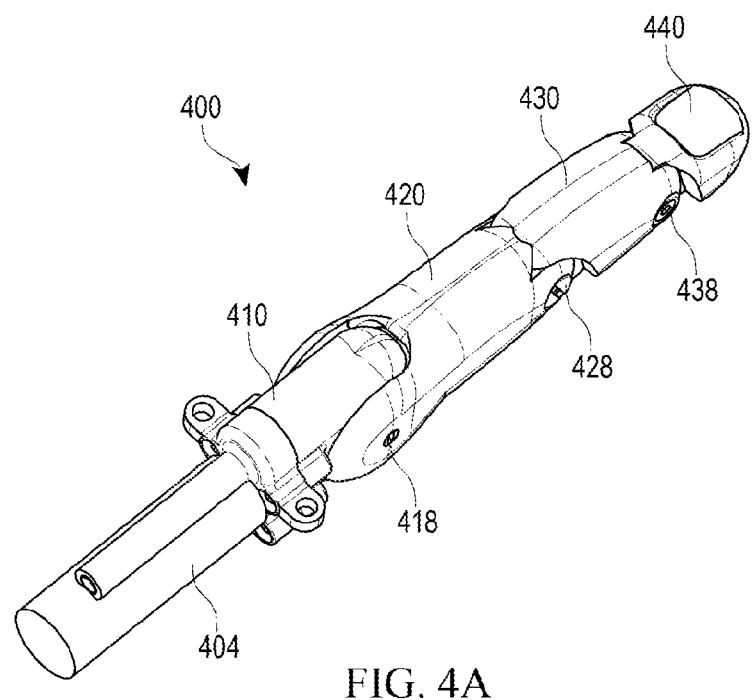
FIGS. 4A-4D are various views of another embodiment of a prosthetic digit, having articulating proximal, middle and distal segments and an expandable proximal link, that may be used with the lower arm stump of FIGS. 1A-1B or prosthetic hand of FIGS. 2A-2B.
Figure 4B:
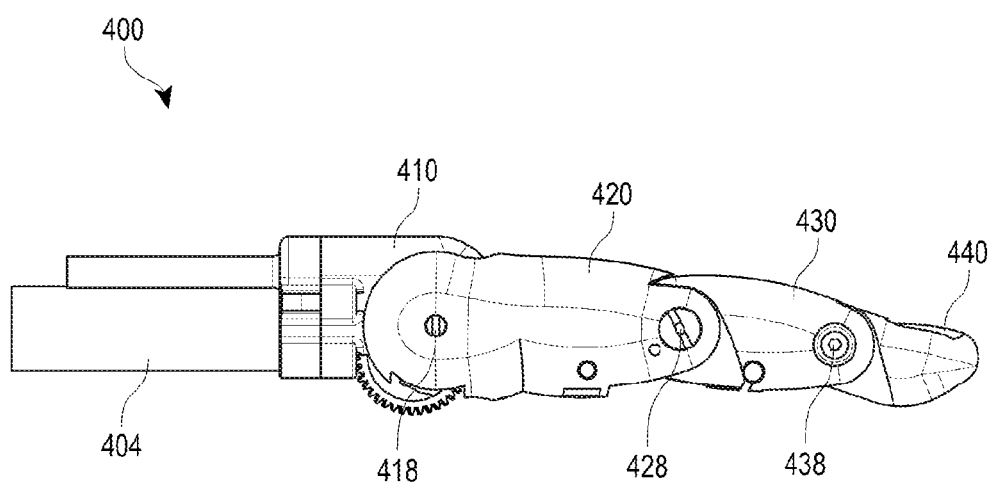
Figure 4C:
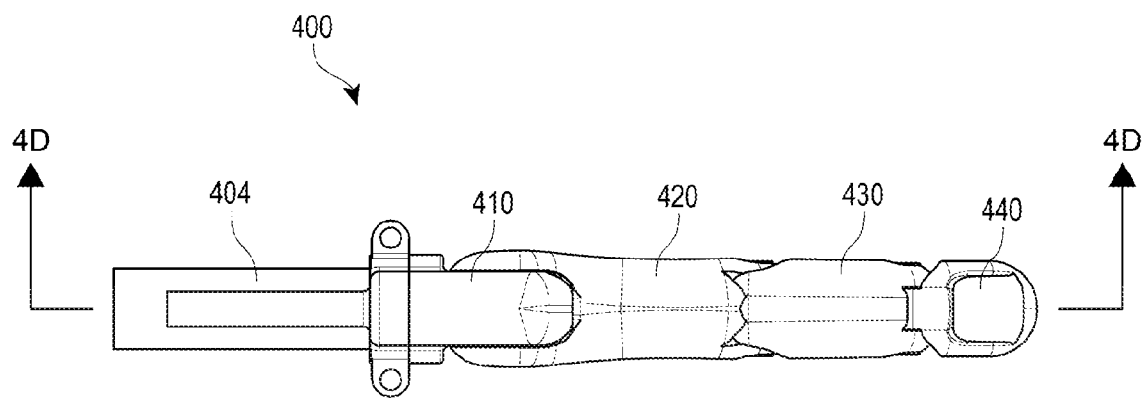
Figure 4D:
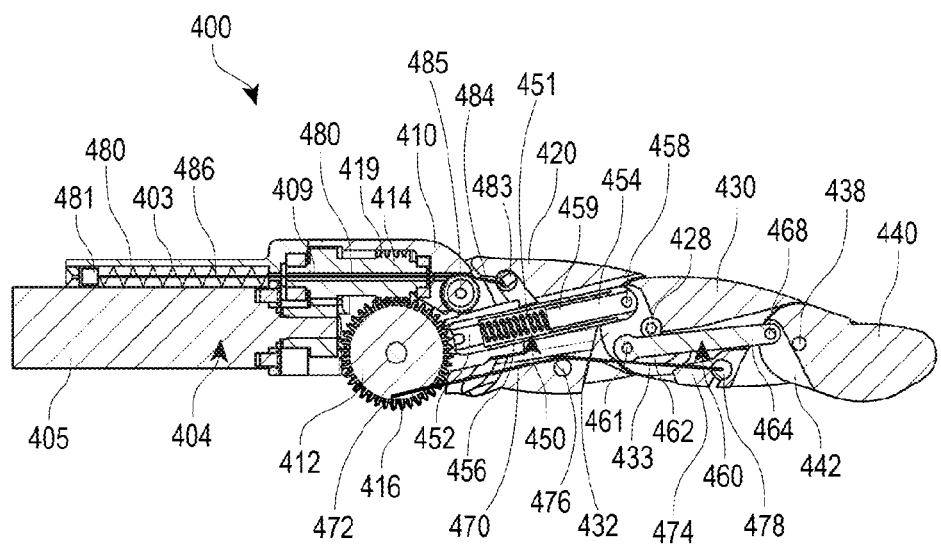

FIG. 4D is a cross-section view of the digit 400, as taken along the line 4D-4D indicated in FIG. 4C. As shown in FIG. 4D, the mount 410 may support the actuator 404. The actuator 404 may include a housing 403 extending proximally. The housing 403 may be used to house features for rotation of the segments 420, 430, 440, such as a spring 486 that provides a force in a proximal direction on a plunger 481 attached to a proximal end 482 of a return tendon 480, as further described herein. Some embodiments may not include the return tendon 480.

The actuator 404 may include a motor 405 supplied with power from a battery, which may be in the hand or other location. The motor 405 may be in mechanical communication with an output shaft 409 that extends, for example distally, therefrom. A worm gear 414 having external threads 419 thereon may be attached to the shaft 409. Actuation of the motor 405 causes motion to be transmitted via a gearbox to the shaft 409 to rotate the worm gear 414. The digit 400 may include a worm wheel 412 having external teeth 416 thereon. The threads 419 of the worm gear 414 contact the teeth 416 of the worm wheel 412 to cause rotational motion of the worm wheel 412 about a first axis. The worm wheel 412 may be rotated a first rotational direction about the first axis to cause a first rotation of the digit 400 in a first direction (e.g. to close the digit 400). The worm wheel may have pulley features that attach to and wrapingly receive therearound a proximal end of an actuation tendon 470, as further described. The worm wheel 412 may be rotated in a second rotational direction about the first axis that is opposite the first rotational direction to allow for a second rotation of the digit 400 in a second direction that is opposite the first direction (e.g. to open the digit), which movement may be caused by the return tendon 480, as further described. Some embodiments may not include the actuation tendon 470 or return tendon 480.

The digit 400 includes an expandable proximal link 450. The link 450 is attached to the worm wheel 412. Rotation of the worm wheel 412 in a first rotational direction for a first angular amount causes a corresponding rotation of the link 450 in the first rotational direction for the first angular amount. The link 450 may expand. The link 450 or a portion thereof may extend distally relative to the worm wheel 412. The link 450 includes a proximal end 452 and extends to a distal end 454. The proximal end 452 includes a fixed portion 451, such as a cylinder. The distal end 454 includes a housing 459, such as a piston. The link 450 may include a spring 456, such as an extension spring. Extension of the spring 456 beyond a neutral length may cause a restoring force that biases the spring back to a shorter length. The link 450 may expand as it is rotated to allow for multiple degrees of freedom rotation of the digit 40. The housing 459 may expand distally relative to the fixed portion 451. The spring 456 may bias the housing 459 in the proximal direction. The housing 459 may retract in the proximal direction relative to the fixed portion 451. Further details of the link 450 are described herein, for example with respect to FIGS. 5A-5E.

The link 450 is attached to the middle segment 430 of the digit 400. The distal end 454 of the link 450 may be rotatably attached to the middle segment 430 at the connection 458. The middle segment 430 may include an ear 432 that rotatably connects with the link 450. The connection 458 may include a pin or other feature that extends through the link 450 and ear 432 at the connection 458. The link 450 may extend between two of the ears 432, with one ear 432 on either lateral side of the distal end 454 of the link 450 at the connection 458.

The digit 400 may include a distal link 460. The distal link 460 extends from a proximal end 462 to a distal end 464. The proximal end 462 may be rotatably attached to the ear 432 at a connection 461. The ear 432 may include a rounded slot 433. The connection 461 may include a pin or other feature that extends through the link 460 and rounded slot 433 at the connection 461. The connection 461 allows the proximal end 462 of the distal link 460 to rotate within and move along the slot 433 as the digit 400 articulates, for example as the middle segment 430 rotates relative to the proximal segment 420 and/or as the distal segment 440 rotates relative to the middle segment 430.

The distal link 460 is attached to the distal segment 440. The distal end 464 of the distal link 460 may be rotatably attached to the distal segment 440 at the connection 468. The connection 468 may include a pin or other feature that extends through the distal link 460 and distal segment 440 at the connection 468. The distal segment 440 may include an ear 442 having an opening therethrough and with which the distal link 460 is attached. The distal end 464 of the link 460 may extend between two of the ears 442, with one ear 442 on either lateral side of the distal end 464 of the link 460 at the connection 468.

FIGS. 5A-5E are various views of the proximal expandable link 450. FIG. 5A is a perspective view of the link 450, FIG. 5B is a top view, FIG. 5C is a side view in an unexpanded configuration, FIG. 5D is a side view in an expanded configuration, and FIG. 5E is a cross-section view as taken along the line 5E-5E shown in FIG. 5B.

The proximal link 450 may include an extension 453. There may be two extensions 453 extending proximally, for example forming a clevis type connection. The extensions 453 may each include an opening 455 therethrough. The extensions 453 may define a space 457 therebetween. The extensions 453 may laterally surround the worm wheel 412 when installed with the worm wheel 412 located in the space 457, and a pin or other feature may extend through the openings 455 and a central opening of the worm wheel 412 to connect the link 450 with the worm wheel 412.

The housing 459 may move linearly with respect to the fixed portion 451. The fixed portion 451 may define a longitudinal axis along which the housing 459 may translate. A spring 456 may be located within the link 450. As shown in FIG. 5E, a proximal end of the spring 456 may be located within the fixed portion 451 and be attached to a proximal end of the link 450. A distal end of the spring 456 may attach to a proximal end of the housing 459. In some embodiments, the spring 456 may extend through and attach to the housing 459. FIG. 5D shows the link 450 expanded relative to the configuration in FIG. 5C. The expanded housing 459 will stretch the spring 456. The spring 456 will exert a restoring force on the housing 459 and bias the housing proximally. The link 450 may then return to the configuration shown in FIG. 5C. The link 450 may repeatedly extend and retract as the finger is rotated to close the digit 400 and then rotated back to open the digit 400. The link 450 may therefore expand during rotation of the digit 400, as further described herein, for example with respect to FIGS. 6A-6D. In some embodiments, the link 450 may not expand during rotation of the digit 400 for added degrees of freedom, as further described herein, for example with respect to FIGS. 7A-7D.

FIGS. 6A-6D are sequential views of the prosthetic digit 400 shown in various rotated configurations. The sequential views illustrate an embodiment of the middle and distal segments 430, 440 rotating as the proximal segment 420 also rotates. The rotation of the segments 420, 430, 440 may be due to the configuration and interaction of the mount 410, segments 420, 430, 440 and links 450, 460.

The proximal segment 420 may rotate relative to the mount 410 about the joint 418 (see FIGS. 4A-4B). To initiate rotation of the digit 400, the actuator 404 may cause the worm gear 414 to rotate and thereby rotate the worm wheel 412 about the first axis.

In some embodiments, the link 450 may rotate about the first axis with the rotating worm wheel 412. The link 450 may rotate the same or similar angular amount as the angular amount that the worm wheel 412 rotates. For example, rotation of the worm wheel 412 by fifteen degrees clockwise may cause a corresponding fifteen degree rotation of the link 450, etc.

In some embodiments, rotation of the link 450 may cause the proximal segment 420 to rotate. For example, the link 450 may be attached with the proximal segment 420, such that rotation of the link 450 in a first or second rotational direction may cause a corresponding rotation of the proximal segment 420 in the first or second rotational direction, respectively.

In some embodiments, rotation of the worm wheel 412 may not cause the link 450 or proximal segment 420 to rotate. For example, the link 450 may be rotatably connected to the worm wheel. The middle and distal segments 430, 440 may thus rotate while the proximal segment 420 does not rotate or rotates less as compared to a full rotation, as further described with respect to FIGS. 7A-7D. In some embodiments, actuation of the digit segments may be provided by the actuation tendon 470 attached to the worm wheel 412 and to the various segments 420, 430, 440, such that rotation of the worm wheel 412 will cause the tendon to pull in (shorten) to cause rotation of the segments 420, 430, 440. The return tendon 480 may rotate the digit 400 in the opposite direction, as described herein, and the worm wheel 412 may rotate in the opposite direction to allow the actuation tendon to pay out (lengthen). Thus, in some embodiments, the worm wheel 412 may rotate about the first axis while a proximal end of the link 450 does not rotate about the first axis.

The digit 400 may include the actuation tendon 470. The tendon 470 extends from a proximal end 472 attached to the worm wheel 412 to a distal end 474 attached to an attachment 478 of the middle segment 430. The tendon 470 extends distally from the worm wheel 412 and around an idler 476, such as a pulley, which may or may not rotate, and that is connected to the proximal segment 420. As the worm wheel 412 rotates clockwise as oriented from FIG. 6A to FIG. 6D (also shown in FIGS. 7A to 7D), the proximal end 472 of the tendon 470 wraps around the worm wheel 412. The tendon 470 effectively shortens in length and thus pulls on the attachment 478 and applies a force on the idler 476, causing the middle and proximal segments, to which the attachment 478 and idler 476 are respectively attached, to rotate in the clockwise direction as oriented.

The digit 400 may include the return tendon 480. The return tendon 480 extends from a proximal end 481 attached to the plunger 481. The plunger 481 is biased in the proximal direction by a compression spring 486 inside the housing 403. The tendon 480 extends from the housing 403 in a distal direction around an idler 485, such as a pulley, which may or may not rotate, to a distal end 484 of the tendon 480 attached to an attachment 483 of the proximal segment 420. As the proximal segment 420 rotates clockwise as oriented, due to the actuation tendon 470 as described, the attachment 483 pulls on the return tendon 480 causing the plunger 481 to move distally and compress or further compress the spring 486. The spring 486 compresses further as the digit 400 rotates further clockwise. The spring 486 thus applies a biasing force in the proximal direction to the plunger 481, biasing the tendon 480 in the proximal direction, and applying an opening or counterclockwise force to the proximal segment 420 via the attachment 483. In some embodiments, the spring 486 may be a constant force spring to apply a constant return force to the segment 420 in various rotational positions.

As the worm wheel 412 is rotated counterclockwise as oriented to effectively lengthen or pay out the actuation tendon 470, the biasing force on the return tendon 480 causes the proximal segment 420 to rotate open, or in the counterclockwise direction as oriented. Further, the spring-loaded expandable link 450, as described herein, then pulls proximally on the middle segment 430 at the connection 458 to rotate the middle segment 430 counterclockwise about the joint 428. The ear 432 may then rotate counterclockwise about the joint 428 to rotate the connection 461 of the distal link 460 counterclockwise about the joint 428 to rotate the distal segment 440 counterclockwise as well.

The tendons 470, 480 are just one example of how to effect articulation of the segments 420, 430, 440 in the prosthetic digit 400 having the expandable link 450. Some embodiments of the digit 400 having the expandable link 450 may not include the actuation tendon 470 and/or the return tendon 480. For example, features other than tendons may be used, such as other links, connections, joints, segments, etc. Therefore, the embodiments shown and described herein for articulation of the segments 420, 430, 440 are merely example embodiments of how the prosthetic digit 400 with the expandable link 450 may be implemented.

As the link 450 rotates, the rotatable connection 458 of the link 450 with the middle segment 430 translates or sweeps a rotational path. The middle segment 430 is translationally constrained with the distal end 459 of the link 450 at the connection 458. The middle segment 430 thus rotates relative to the link 450 about the connection 458 as the middle segment 430 is rotating to open or close the digit 400. The middle segment 430 also rotates relative to the proximal segment 420 about the joint 428 (see FIGS. 4A-4B).

As the middle segment 430 rotates, the connection 461 at the proximal end 462 of the distal link 460 moves along the slot 433. The connection 461 may include a pin sliding along the slot 433. This allows the ear 432 to rotate relative to the distal link 460. The distal link 460 thus rotates relative to the middle segment 430. As the distal link 460 rotates, the distal segment 440 also rotates due to the connection 468 between the distal link 460 and the distal segment 440. The distal segment 440 rotates relative to the middle segment 430 about the joint 438.

Figures 6A, 6B, 6C, 6D:
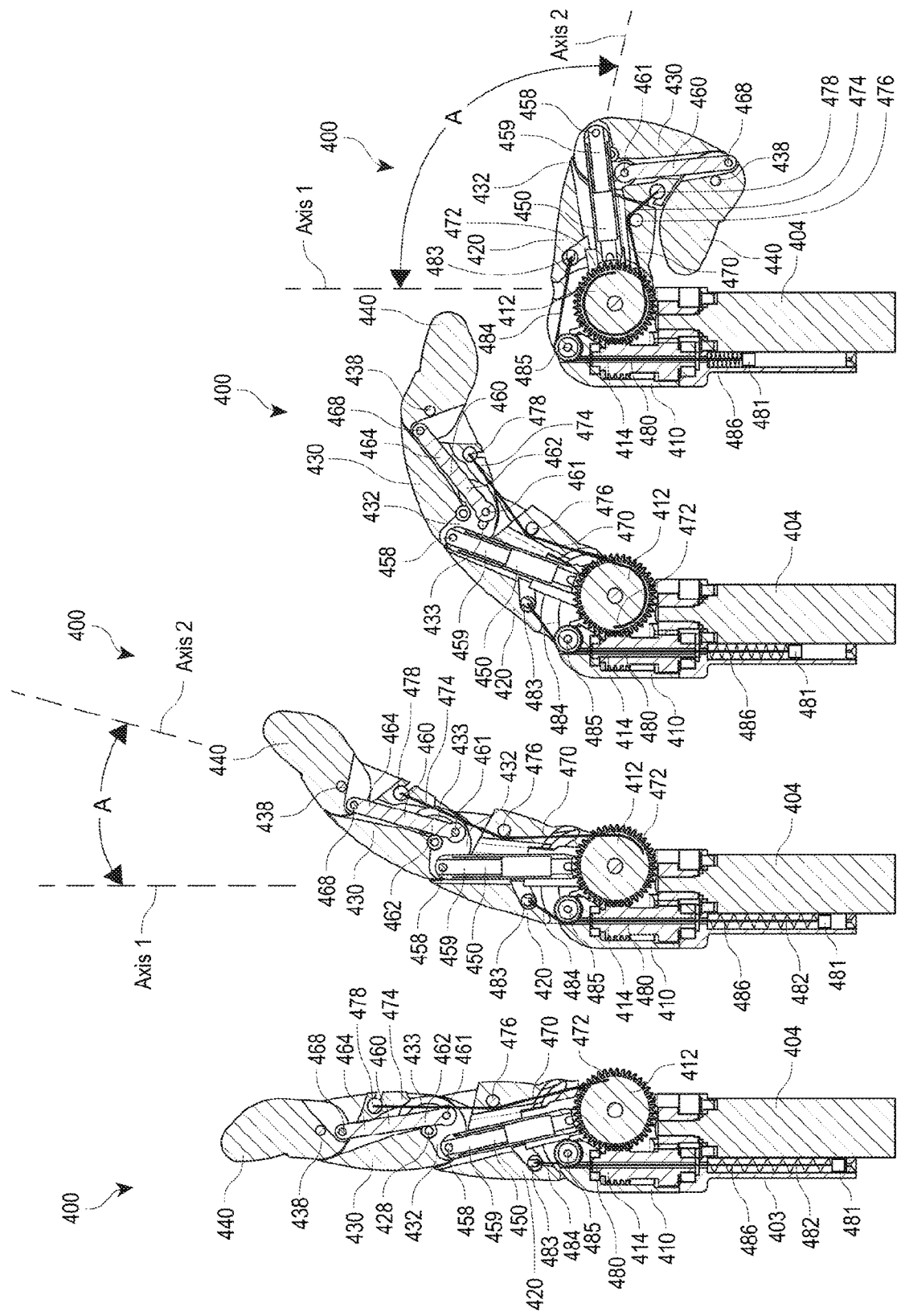
FIGS. 6A-6D are sequential views of the prosthetic digit of FIGS. 4A-4D shown in various rotated configurations where the middle and distal segments rotate as the proximal segment rotates due to interaction of the links.

As shown in FIGS. 6B and 6D, the mount 410 or a portion thereof may extend along an Axis 1. The proximal segment 420 may extend along an Axis 2. The Axes 1,2 may form an angle A between them. The angle A may be the angular configuration of the proximal segment 420 relative to the mount 410. The angle A may range from zero degrees (e.g., in FIG. 6A) to ninety degrees or more (e.g., in FIG. 6D). In some embodiments, the angle A may be negative fifteen, negative ten, negative five, zero, five, ten, fifteen, twenty, twenty-five, thirty, thirty-five, forty, forty-five, fifty, fifty-five, sixty, sixty-five, seventy, seventy-five, eighty, eighty-five, ninety, ninety-five, one hundred, one hundred five, one hundred ten, or one hundred fifteen degrees, or other lesser, greater or in between angular amounts. The various values for the angle A may apply to any of the articulated configurations of the prosthetic digit 400 shown in any of FIGS. 6A-6D and other configurations.

The angle A may change as the digit 400 rotates, for example as the middle and distal segments 430, 440 rotate. As shown, the angle A may increase from the relatively open configuration of FIG. 6B to the relatively closed configuration of FIG. 6D, and vice versa. The angle A may be dependent on the amount of rotation of the middle and distal segments 430, 440, or vice versa. In some embodiments, the angle A may not change as the digit 400 rotates, for example as the middle and distal segments 430, 440 rotate. For example, the angle A may not change from the relatively open configuration of FIG. 6B to the relatively closed configuration of FIG. 6D, and vice versa. In some embodiments, the angle A may change by a small amount from the relatively open configuration of FIG. 6B to the relatively closed configuration of FIG. 6D, and vice versa, for example by five degrees or less, ten degrees or less, fifteen degrees or less, or twenty degrees or less. The angle A therefore may not be dependent on the amount of rotation of the middle and distal segments 430, 440, or vice versa, as further described herein, for example with respect to FIGS. 7A-7D.

The digit 400 may rotate as described to have the closed configuration shown in FIG. 6D. The Axis 2 along which the proximal segment 420 extends may be at about ninety degrees to the Axis 1. The middle segment 420 may be rotated to about parallel with the Axis 1. In some embodiments, the middle segment 420 may not be parallel with the Axis 1 in the closed configuration. As also shown, the distal segment 440 is rotated clockwise to be adjacent to the proximal segment 420. The segments 420, 430, 440 may thus rotate to provide a small closed grip with the digit 400.

FIGS. 7A-7D are sequential views of the prosthetic digit 400 performing a rotation with added degrees of freedom. The digit 400 is shown in various rotated configurations where the middle and distal segments 430, 440 rotate independently of rotation of the proximal segment 420 due to interaction of the links 450, 460. The digit 400 may rotate similarly as described with respect to FIGS. 6A-6D, except as otherwise described.

In some embodiments, the digit 400 may rotate to grab or cover an object having an irregular outer surface or contour. The rotational path of the digit 400 shown in FIGS. 6A-6D may not adequately cover or grasp the object due to the irregular outer surface. Thus the proximal and/or middle segments 420, 430 may be prevented from rotating clockwise beyond an angular amount. In such case, the middle and/or distal segments 430, 440 may continue to rotate to provide the desired functionality. FIGS. 7A-7D shown an example embodiment of rotation of the digit 400 where the proximal segment 420 does not rotate or does not completely rotate clockwise, while the middle and distal segments 430, 440 rotate clockwise.

As the digit 400 rotates from FIG. 7A to FIG. 7D, the proximal segment 420 may be prevented from rotation. This may be due to a force exerted on the proximal segment 420 by an outside object that counteracts the closing direction, such as contact with a part of the object the digit 400 is grasping. The middle and distal segments 430, 440 may continue to rotate due to the link 450 expanding. The link 450 as shown may elongate as the digit 400 rotates. The housing 459 may extend distally away from or proximally toward the fixed portion 451 as the digit 400 is rotated clockwise or counterclockwise, respectively. As shown in FIG. 7D, the angle A between the Axes 1 and 2 may therefore not change, or may change by a small amount, as described herein, for example with respect to FIGS. 6A-6D.

The link 450 may have a first axial length in FIG. 7A for instance where the digit 400 is straightened out, a second axial length in FIG. 7B where the digit 400 has partially rotated, a third axial length in FIG. 7C where the digit 400 is rotated farther but not completely, and a fourth axial length in FIG. 7D where the digit 400 is fully rotated. The first length may be shorter than each of the second, third and fourth lengths. The second length may be shorter than each of the third and fourth lengths. The third length may be shorter than the fourth length.

The middle and distal segments 430, 440 rotate as described with respect to FIGS. 6A-6D. The expanding and retracting link 450 allows the middle and distal segments 430, 440 to rotate without rotation or full rotation of the proximal segment 420. In some embodiments, the link 450 may not rotate. In some embodiments, the link 450 may partially rotate. In some embodiments, a tendon may be used to cause rotation of the middle and distal segments 430, 440 when the proximal segment 420 does not rotate or does not fully rotate. A tendon may be attached to the worm wheel 412 to cause rotation, as described with respect to FIGS. 6A-6D.

Figure 8C:
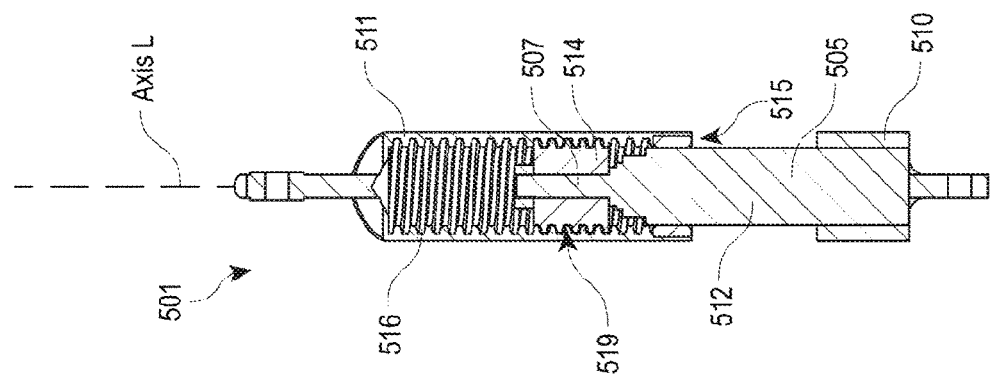
FIG. 8C is a cross-sectional view of the actuator of FIG. 8A as taken along the line 8C-8C indicated in FIG. 8A.
Figure 8B:
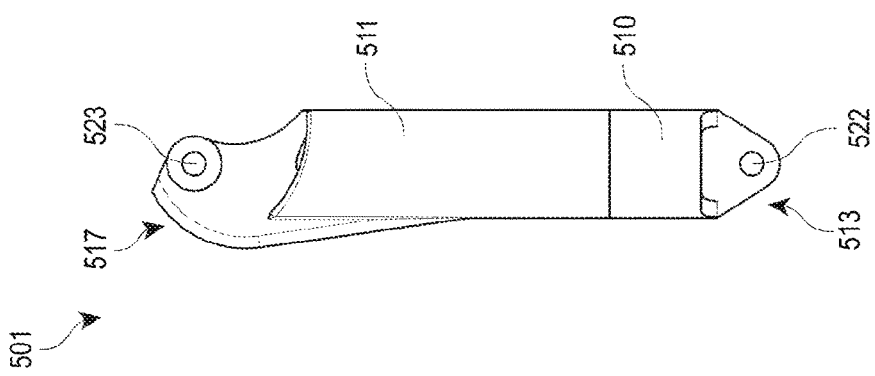
FIGS. 8A-8B are sequential views of an embodiment of an actuator that may be used in any of the prosthetic digits described herein, where the housing translates axially relative to the leadscrew.
Figure 8A:
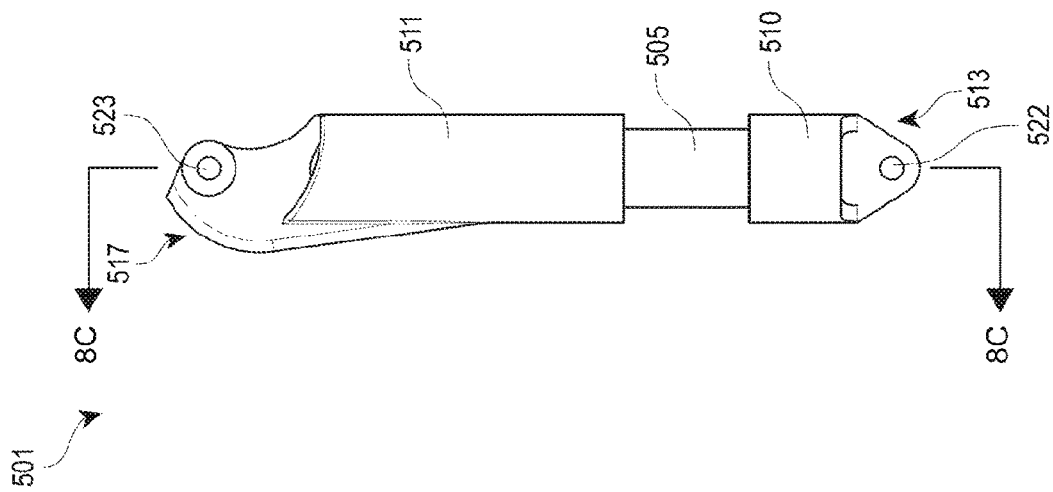

FIGS. 8A-8C are various views of an embodiment of an actuator 501 that may be used with the various prosthetic digits described herein. FIG. 8A is a side view of the actuator 501 in an extended configuration. FIG. 8B is a side view of the actuator 501 in a retracted configuration. FIG. 8C is a cross-section view of the actuator 501, as taken along the line 8C-8C indicated in FIG. 8A. The actuator 501 may be used in any of the prosthetic digits disclosed herein, such as the prosthetic digits of FIGS. 1A-3H. The actuator 501 may have the same or similar features and/or functions as the actuators 301, 404, and vice versa, except as otherwise described.

As shown in FIG. 8A, the actuator 501 includes a proximal end 513 and extends to a distal end 517. The proximal end 513 may attach to a hand, palm, etc. The distal end 517 may attach to a proximal end of a proximal segment of a prosthetic digit.

Advantageously, the actuator 501 is compact. The actuator 501 is small enough to fit at least partially within a prosthetic digit. The actuator 501 may be sized to fit in a proximal end of a prosthetic digit for a typical sized hand prosthetic. A prosthetic hand may include multiple actuators 501, for example one of the actuators 501 in each of its prosthetic digits. In some embodiments, in a closed or retracted configuration, the actuator 501 has an overall volume of no more than 11,550 mm$^2$ (square millimeters). In some embodiments, in a closed or retracted configuration, the actuator 501 has a maximum length of no more than 75 mm and a maximum width of no more than 14 mm. In a closed or retracted configuration, the actuator 501 may have an overall volume of no more than 11,550 mm$^2$, no more than 5,000 mm$^2$, no more than 7,500 mm$^2$, no more than 10,000 mm$^2$, no more than 12,500 mm$^2$, or no more than 15,000 mm$^2$. In a closed or retracted configuration the actuator 501 may have a maximum length of no more than 75 mm (millimeters), no more than 25 mm, no more than 50 mm, no more than 100 mm, or no more than 125 mm, and/or a maximum width of no more than 14 mm, no more than 8 mm, no more than 10 mm, no more than 12 mm, no more than 16 mm, no more than 18 mm, or no more than 20 mm. The actuator 501 may have an aspect ratio, defined as the ratio of a maximum length in a retracted state to a maximum width in a retracted state, of no less than 1.5, no less than 2, no less than 2.5, no less than 3, no less than 3.5, no less than 4, no less than 4.5, or no less than 5.

In an open or extended configuration, in some embodiments the actuator 501 may have an overall volume of no more than 14,164 mm$^2$. The actuator 501 may have a maximum length of 92 mm and/or a maximum width of 14 mm. In an open or extended configuration, the actuator 501 may have an overall volume of no more than 10,000 mm$^2$, no more than 12,000 mm$^2$, no more than 13,000 mm$^2$, no more than 13,500 mm$^2$, no more than 14,000 mm$^2$, no more than 14,500 mm$^2$, no more than 15,000 mm$^2$, or no more than 16,000 mm$^2$. In an open or extended configuration, the actuator 501 may have a maximum length of no more than 50 mm, no more than 60 mm, no more than 70 mm, no more than 80 mm, no more than 90 mm, no more than 95 mm, no more than 100 mm, or no more than 110 mm. In an open or extended configuration, the actuator 501 may have a maximum width of no more than 5 mm, no more than 8 mm, no more than 10 mm, no more than 12 mm, no more than 14 mm, no more than 16 mm, no more than 18 mm, no more than 20 mm, or no more than 25 mm.

The actuator 501 is a linear actuator that extends and retracts linearly. The actuator 501 produces or results in linear motion. As shown, the actuator 501 includes a motor 505 and a gearbox 512. The motor 505 is in mechanical communication with the gearbox 512. The motor 505 is supplied with power from a battery, which may be in the hand or other location. The actuator 501 includes a shaft 507 extending axially and distally from the gearbox 512 and/or motor 505. The actuator 501 may include a leadscrew 514 coupled to the motor 505 (e.g., coupled to the shaft 507). The leadscrew 514 may have an external thread 519 that is compatible with the threads of other components in the actuator 501. The leadscrew 514 may be or include a worm gear.

The actuator 501 includes a support 510. The support 510, such as a motor mount or other structure, may carry or otherwise support the actuator 501 and/or the motor 505. The support 510 may be configured to attach the actuator 501 to a hand. For example, the support 510 may be configured to receive a pin or other suitable feature in the proximal end thereof to secure, for example rotatably attach, the support 510 with a mount (e.g., a mount on a hand, palm, etc.). The support 510 may include a connector portion 522, such as an opening as illustrated in FIG. 8B, in the proximal end 513 which may receive the pin or other suitable feature. The actuator 501 may rotate about an axis defined by the connector portion 522 as the actuator 501 extends and retracts linearly, as described herein.

The actuator 501 includes a housing 511. The housing 511 extends and retracts axially. The housing 511 defines a cavity 515 therein. The cavity 515 may be a cylindrical opening extending axially inside or through the housing 511. The cavity 515 may have a maximum length and a maximum diameter. The ratio of the maximum length to the maximum diameter may be no less than 1.5, no less than 2, no less than 2.5, no less than 3, no less than 3.5, no less than 4, no less than 4.5, or no less than 5. The ratio of maximum length to maximum diameter may be from 3-6. The cavity 515 may be configured to receive therein the gearbox 512, shaft 507, leadscrew 514, and/or at least a portion of the motor 505. The housing 511 may have an internal thread 516. For example, as shown, the internal thread 516 may be located along the cavity 515 of the housing 511. A proximal end of the housing 511 may be open to the cavity 515. A distal end of the housing 511 may correspond to the distal end 517 of the actuator 501. The distal end of the housing 511 may connect with a proximal segment of a prosthetic digit at a joint. For example, as shown in FIG. 8A, the distal end of the housing 511 may include an opening 523 that is configured to engage a proximal portion of a prosthetic digit. The actuator 501 may rotate about an axis defined by the opening 523 as the actuator 501 extends and retracts linearly, as described herein.

The actuator 501 may include an axially fixed portion and an axially movable portion. The fixed and moveable portions may be respectively fixed and moveable with respect to a longitudinal axis of the actuator 501, such as the axis L shown in FIG. 8C. The axially movable portion of the actuator 501 may slidably engage an outer surface of the fixed portion. The axially movable portion may include the housing 511. The axially fixed portion may include the motor 505, the gearbox 512, the support 510, the leadscrew 514, and the shaft 507.

The actuator 501 may output linear motion to cause rotation of a prosthetic digit. For example, the housing 511 may translate axially to cause rotation of the proximal segment of the prosthetic digit. The motor 505 or other portions of the actuator 501 may use or provide rotary, linear, cyclic and/or other types of motion.

The motor 505 may rotate the leadscrew 514 about the longitudinal Axis L (shown in FIG. 8C). The shaft 507 may be configured to be rotated by the motor 505 and be configured to rotate the leadscrew 514 about the longitudinal Axis L in a first rotational direction and a second rotational direction opposite the first rotational direction. The internal thread 516 of the housing 511 may be configured to at least partially engage with the external thread 519 of the leadscrew 514 such that rotation of the leadscrew 514 causes the housing 511 to translate axially along the longitudinal Axis L relative to the leadscrew 514 and/or the support 510 while the leadscrew 514 remains axially stationary. For example, the external thread 519 of the leadscrew 514 may be in mechanical communication with the internal thread 516 of the housing 511. Rotation of the leadscrew 514 in the first rotational direction causes the housing 511 to translate distally relative to the leadscrew 514 and/or the support 510 and rotation of the leadscrew 514 in the second rotational direction causes the housing 511 to translate proximally relative to the leadscrew 514 and/or the support 510.

The actuator 501 may be used in a prosthetic digit having a base configured to attach to a hand, a proximal segment, a middle segment, and a distal segment, an expandable link, and a wheel, such as a worm wheel or other rotatable member. The wheel may be placed in mechanical communication with the actuator 501. The actuator 501 may be configured to cause the wheel to rotate. The prosthetic digit may include a tendon extending distally from the wheel, a pulley rotationally connected to the proximal segment, and a tendon attachment coupled to the middle segment, as described herein, for example with respect to FIGS. 6A-7D. When the actuator 501 is used in a prosthetic digit, translation of the housing 511 in a distal direction along the longitudinal Axis L of the actuator 501 relative to the leadscrew 514 may cause the proximal segment of the prosthetic digit to rotate about a joint, which may cause the middle and distal segments to rotate. Rotation of the wheel by the actuator 501 in a first rotational direction may pull the tendon proximally and cause the distal segment of the prosthetic digit to rotate relative to the middle segment, as described.

The actuator 501 may be used in a variety of other prosthetic digits. The examples provided herein are only some embodiments. The compactness of the actuator 501 allows it to be used in prosthetic hands for each of the prosthetic digits, for example one, two, three, four or five actuators 501 may be used for each of a corresponding prosthetic digit. The actuator 501 may be housed entirely or partially within the prosthetic digit. The actuator 501 may be housed entirely or partially within the hand.

Further, in some embodiments, the actuator 501 may be assembled in a flipped orientation as that described herein. For example, the actuator 501 may be flipped in a proximal to distal direction such that the moveable and fixed portions are reversed. The housing 511 may be axially stationary while the motor 505 and other parts may move axially. The housing 511 may be attached to the prosthetic hand and the motor 505 for instance the motor mount 510 may be attached to the prosthetic digit, for instance the proximal segment. Thus the general principles of the actuator 501 described herein may be used in a variety of contexts that are within the scope of the disclosure.

Figures 9A, 9B, 9C:
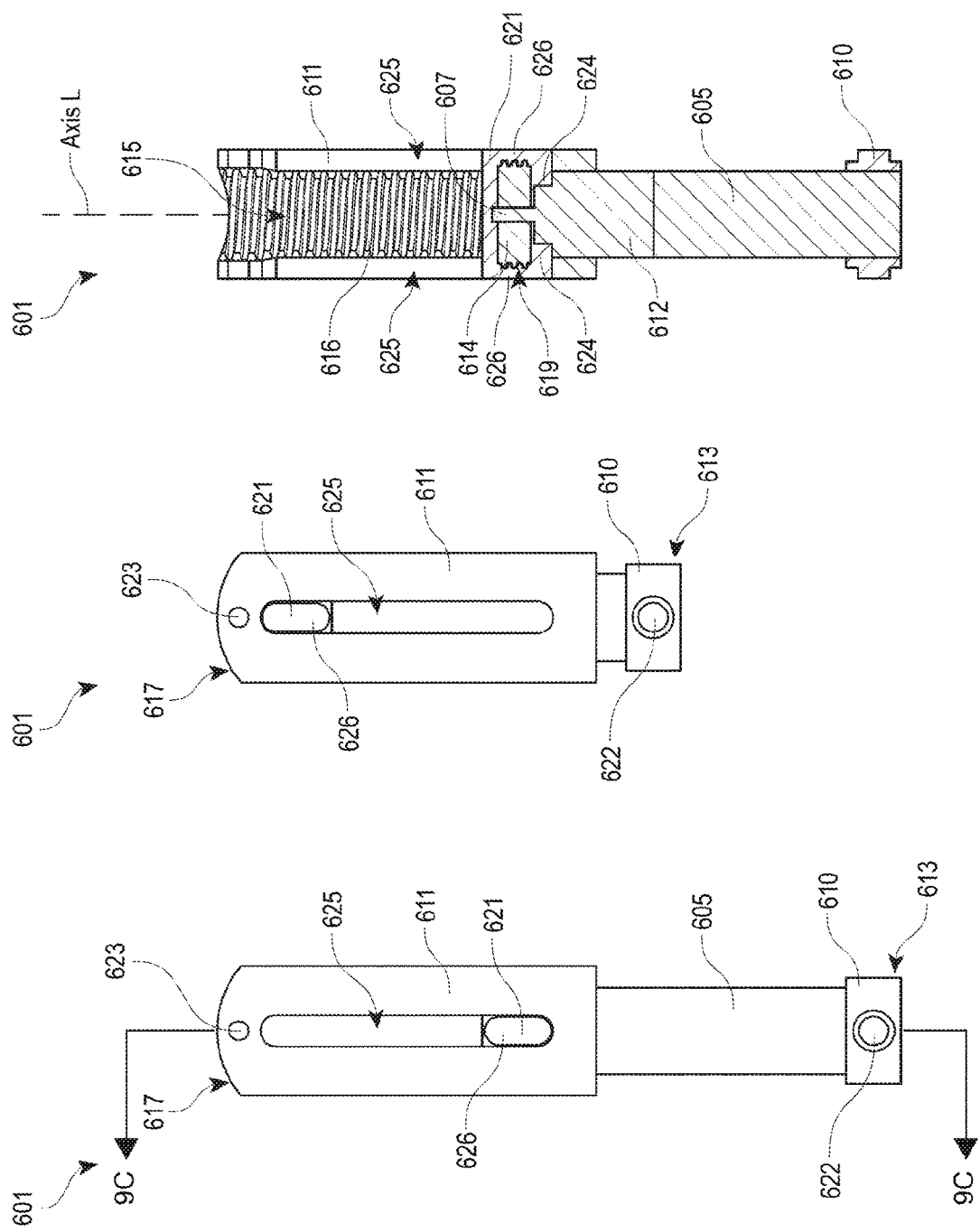
FIGS. 9A-9B are sequential views of another embodiment of an actuator that may be used in any of the prosthetic digits described herein, where the housing translates axially relative to the leadscrew.
FIGS. 9C and 9D are two cross-sectional views of the actuator of FIG. 9A as taken along the line 9C-9C indicated in FIG. 9A and rotated ninety degrees relative to each other.
Figure 9D:
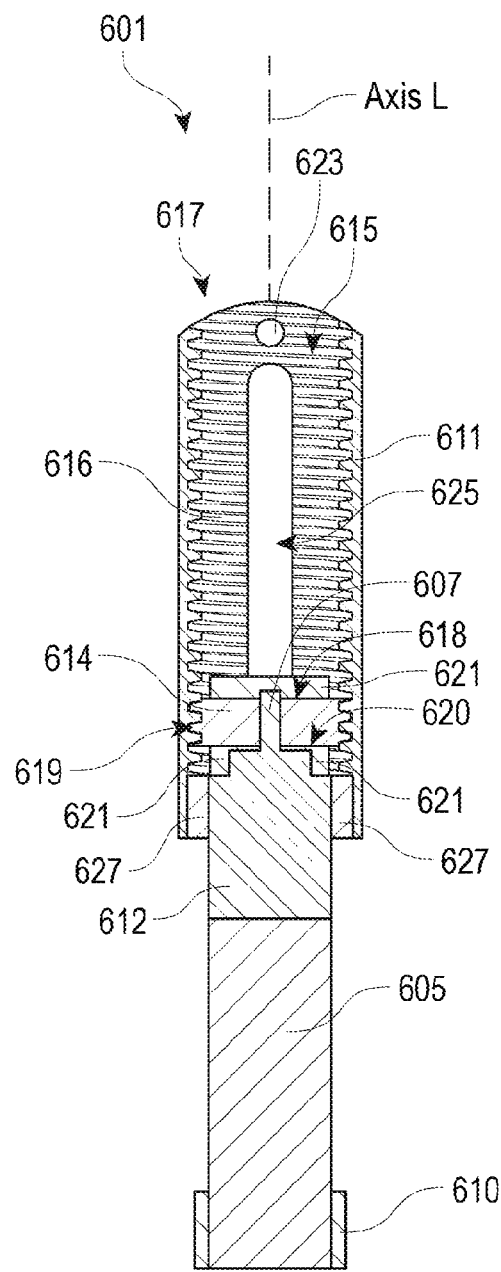

FIGS. 9A-9D are various views of another embodiment of a linear actuator 601 that may be used with the various prosthetic digits described herein. FIG. 9A is a side view of the actuator 601 in an expanded configuration. FIG. 9B is a side view of the actuator 601 in a retracted configuration. FIGS. 9C and 9D are cross-sectional views of the actuator 601, as taken along the line 9C-9C indicated in FIG. 9A. The actuator 601 may be used in any of the prosthetic digits disclosed herein, such as the prosthetic digits of FIGS. 1A-3H. The actuator 601 may have the same or similar features and/or functions as the actuators 301, 404, 501, and vice versa, except as otherwise described.

As shown in FIG. 9A, the actuator 601 includes a proximal end 613 and extends to a distal end 617. The proximal end 613 may attach to a hand, palm, etc. The distal end 617 may attach to a proximal end of a proximal segment of a prosthetic digit.

Advantageously, the actuator 601 is compact. The actuator 601 is small enough to fit at least partially within a prosthetic digit. The actuator 601 may be sized to fit in a proximal end of a prosthetic digit for a typical sized hand prosthetic. A prosthetic hand may include multiple actuators 601, for example one of the actuators 601 in each of its prosthetic digits. In a closed or retracted configuration, the actuator 601 may have an overall volume of no more than 6,222 mm$^2$. In a closed or retracted configuration, the actuator 601 may have a maximum length of 55 mm and/or a maximum width of 12 mm. In a closed or retracted configuration, the actuator 601 may have an overall volume of no more than 3,000 mm$^2$, no more than 4,000 mm$^2$, no more than 5,000 mm$^2$, no more than 5,500 mm$^2$, no more than 5,750 mm$^2$, no more than 6,000 mm$^2$, no more than 6,500 mm$^2$, no more than 6,750 mm$^2$, or no more than 7,000 mm$^2$. The actuator 601 may have an aspect ratio, defined as the maximum length in a retracted state to a maximum width in a retracted state, of no less than 1.5, no less than 2, no less than 2.5, no less than 3, no less than 3.5, no less than 4, no less than 4.5, or no less than 5.

In an open or extended configuration, in some embodiments the actuator 601 may have an overall volume of no more than 7,918 mm$^2$. In an open or extended configuration, in some embodiments the actuator 601 may have a maximum length of 70 mm and/or a maximum width of 12 mm. In an open or extended configuration, the actuator 601 may have an overall volume of no more than 5,000 mm$^2$, no more than 6,000 mm$^2$, no more than 7,000 mm$^2$, no more than 7,500 mm$^2$, no more than 7,750 mm$^2$, no more than 8,000 mm$^2$, no more than 8,250 mm$^2$, no more than 8,500 mm$^2$, no more than 8,750 mm$^2$, no more than 9,000 mm$^2$. In an open or extended configuration, the actuator 601 may have a maximum length of no more than 50 mm, no more than 60 mm, no more than 65 mm, no more than 70 mm, no more than 75 mm, no more than 80 mm, no more than 85 mm, or no more than 90 mm. In an open or extended configuration, the actuator 601 may have a maximum width of no more than 6 mm, no more than 8 mm, no more than 10 mm, no more than 11 mm, no more than 12 mm, no more than 13 mm, no more than 14 mm, no more than 16 mm, or no more than 18 mm.

The actuator 601 is a linear actuator that extends and retracts linearly. The actuator 601 produces or results in linear motion. As shown, the actuator 601 includes a motor 605 and a gearbox 612. The motor 605 is in mechanical communication with the gearbox 612. The gearbox 612 may be in direct mechanical communication with the motor 605. For example, the gearbox 612 is shown mounted on the motor 605. The gearbox 612 may be located remotely form the motor 605. For example, the gearbox 612 may be used within a gear train located remote from the motor 605. The gearbox 612 could thus be located somewhere else in the hand and/or have an auxiliary gearbox between the motor 605 and the gearbox 612. The motor 605 is supplied with power from a battery, which may be in the hand or other location. The actuator 601 includes a shaft 607 extending axially and distally from the gearbox 612 and/or motor 605. The actuator 601 may include a leadscrew 614 coupled to the motor 605 (e.g., coupled to the shaft 607). The leadscrew 614 may be or include a worm gear. The leadscrew 614 may have an external thread 619 that is compatible with the threads of other components in the actuator 601.

The actuator 601 may include a thrust bearing 621. FIG. 9C shows the actuator 601 having the thrust bearing 621 as taken along the line 9C-9C, and FIG. 9D shows the actuator 601 having the thrust bearing 621 as taken along a plane relative to the cross-sectional plane of FIG. 9C and rotated 90 degrees about the Axis L. The thrust bearing 621 may protrude through a window 626 of the channel 625 of the housing 611. The thrust bearing 621 may be configured to axially engage the leadscrew 614, such as by engaging the distal and/or proximal ends of the leadscrew 614. The thrust bearing 621 may connect to, for example threadingly connect with, a distal end of the gearbox 612. The thrust bearing 621 may be a housing that is positioned adjacent a distal end of the gearbox 612. The thrust bearing 621 may have threading that is compatible with threading of other components in the actuator 601, such as the distal end of the gearbox 612. The leadscrew 614 may be axially enclosed by the thrust bearing 621 on either side of the leadscrew 614. For example, the leadscrew 614 may be axially constrained by the thrust bearing 621. The thrust bearing 621 may be configured to contact a worm wheel. The thrust bearing 621 may be made of a different material than the worm wheel, thereby providing a bearing surface while the thrust bearing 621 and the worm wheel are in dynamic contact. The leadscrew 614 may be free to float axially on the motor shaft. The leadscrew 614 may be constrained during radial motion by corresponding "D" shaped profiles on the leadscrew bore and motor shaft.

The thrust bearing 621 may be configured to convert rotational motion of the shaft 607 into a linear or axial force. For example, rotation of the shaft 607 may cause the thrust bearing 621 (and the leadscrew 614 coupled to the thrust bearing 621) to move axially relative to the housing 611. When the actuator 601 is in motion, an axial force on the leadscrew 614, which results from linear actuation, may be transferred into the thrust bearing 621. As shown, the thrust bearing 621 has internal threads on a proximal end thereof that are mounting it to the distal end of the gearbox 612. The thrust bearing 621 supports the lead screw 614 in the axial direction. The line of action of force transfer when actuating the actuator 601 may be as follows, beginning with rotation of the gearbox shaft 607: from the shaft 607 to the lead screw 614, from outer threads of the lead screw 614 to inner threads 616 of the housing 611 as the lead screw 614 climbs or otherwise moves along the inner threads 616 of the housing 611, an axial force from the lead screw 614 to the thrust bearing 621 which axial force may be in the proximal or distal directions depending on the direction of movement of the housing 611, and from the thrust bearing 621 to the threaded connection with the distal end of the gearbox 612.

The actuator 601 includes a support 610. The support 610, such as a motor mount or other structure, may carry or otherwise support the actuator 601 and/or the motor 605. The support 610 may be configured to attach the actuator 601 to a hand. For example, the support 610 may include a connector portion 622, such as an opening or a protrusion (e.g., a post), that is compatible with a hand. For example, the support 610 may be configured to receive a pin or other suitable feature in the proximal end thereof to secure, for example rotatably attach, the support 610 with a mount (e.g., a mount on a hand, palm, etc.). As shown in FIG. 9C, the support 610 may include a connector portion 622 on the proximal end 613 which may be received in a portion of a mount on a hand, palm, etc., such as a recess or other opening, to secure, for example rotatably attach, the support 610 with said mount. The actuator 601 may rotate about an axis defined by the connector portion 622 as the actuator 601 extends and retracts linearly, as described herein.

The actuator 601 includes a housing 611. The housing 611 extends and retracts axially. The housing 611 defines a cavity 615 therein. The cavity 615 may be a cylindrical opening extending axially inside or through the housing 611. The cavity 615 may have a maximum length and a maximum diameter. The ratio of the maximum length to the maximum diameter may be no less than 1.5, no less than 2, no less than 2.5, no less than 3, no less than 3.5, no less than 4, no less than 4.5, or no less than 5. The ratio of maximum length to maximum diameter may be from 3-6. The cavity 615 may be configured to receive therein a gearbox 612, shaft 607, leadscrew 614, and/or at least a portion of the motor 605. The housing 611 may have an internal thread 616. For example, as shown, the internal thread 616 may be located along the cavity 615 of the housing 611. A proximal end of the housing 611 may be open to the cavity 615. A distal end of the housing 611 may correspond to the distal end 617 of the actuator 601. The distal end of the housing 611 may connect with a proximal segment of a prosthetic digit at a joint. For example, as shown in FIG. 9A, the distal end of the housing 611 may include an opening 623 that is configured to engage a proximal portion of a prosthetic digit. The actuator 601 may rotate about an axis defined by the opening 623 as the actuator 601 extends and retracts linearly, as described herein.

The housing 611 may include a channel 625 along an outer surface of the housing 611. The channel 625 may extend along a portion of the length of the housing 611. The shape of the channel 625 may be a rectangle, oval, or any other suitable shape. The channel 625 may be configured to slidably engage a portion of the thrust bearing 621 and/or leadscrew 614. The channel 625 may provide visibility of (e.g., a window to) components within the housing 611, such as the thrust bearing 621 and/or leadscrew 614.

The actuator 601 may include an axially fixed portion and an axially movable portion. The fixed and moveable portions may be respectively fixed and moveable with respect to a longitudinal axis of the actuator 601, such as the axis L shown in FIG. 9C. The axially movable portion of the actuator 601 may slidably engage an outer surface of the fixed portion. The axially movable portion may include the housing 611. The axially fixed portion may include the motor 605, the gearbox 612, the support 610, the leadscrew 614, and the shaft 607.

The actuator 601 may output linear motion to cause rotation of a prosthetic digit. For example, the housing 611 may translate axially to cause rotation of the proximal segment of the prosthetic digit. The motor 605 or other portions of the actuator 601 may use or provide rotary, linear, cyclic and/or other types of motion.

The motor 605 may rotate the leadscrew 614 about the longitudinal Axis L (shown in FIG. 9C). The shaft 607 may be configured to be rotated by the motor 605 and be configured to rotate the leadscrew 614 about the longitudinal Axis L in a first rotational direction and a second rotational direction opposite the first rotational direction. The internal thread 616 of the housing 611 may be configured to at least partially engage with the external thread 619 of the leadscrew 614 such that rotation of the leadscrew 614 causes the housing 611 to translate axially along the longitudinal Axis L relative to the leadscrew 614 and/or the support 610 while the leadscrew 614 remains axially stationary. For example, the external thread 619 of the leadscrew 614 may be in mechanical communication with the internal thread 616 of the housing 611. Rotation of the leadscrew 614 in the first rotational direction causes the housing 611 to translate distally relative to the leadscrew 614 and/or the support 610 and rotation of the leadscrew 614 in the second rotational direction causes the housing 611 to translate proximally relative to the leadscrew 614 and/or the support 610.

The actuator 601 may be used in a prosthetic digit having a base configured to attach to a hand, a proximal segment, a middle segment, and a distal segment, an expandable link, and a wheel, such as a worm wheel or other rotatable member. The wheel may be placed in mechanical communication with the actuator 601. The actuator 601 may be configured to cause the wheel to rotate. The prosthetic digit may include a tendon extending distally from the wheel, a pulley rotationally connected to the proximal segment, and a tendon attachment coupled to the middle segment, as described herein, for example with respect to FIGS. 6A-7D. When the actuator 601 is used in a prosthetic digit, translation of the housing 611 in a distal direction along the longitudinal Axis L of the actuator 601 relative to the leadscrew 614 may cause the proximal segment of the prosthetic digit to rotate about a joint, which may cause the middle and distal segments to rotate. Rotation of the wheel by the actuator 601 in a first rotational direction may pull the tendon proximally and cause the distal segment of the prosthetic digit to rotate relative to the middle segment, as described.

The actuator 601 may be used in a variety of other prosthetic digits. The examples provided herein are only some embodiments. The compactness of the actuator 601 allows it to be used in prosthetic hands for each of the prosthetic digits, for example one, two, three, four or five actuators 601 may be used for each of a corresponding prosthetic digit. The actuator 601 may be housed entirely or partially within the prosthetic digit. The actuator 601 may be housed entirely or partially within the hand.

Further, in some embodiments, the actuator 601 may be assembled in a flipped orientation as that described herein. For example, the actuator 601 may be flipped in a proximal to distal direction such that the moveable and fixed portions are reversed. The housing 611 may be axially stationary while the motor 605 and other parts may move axially. The housing 611 may be attached to the prosthetic hand and the motor 605 for instance the motor mount 610 may be attached to the prosthetic digit, for instance the proximal segment. Thus the general principles of the actuator 601 described herein may be used in a variety of contexts that are within the scope of the disclosure.

Figure 10C:
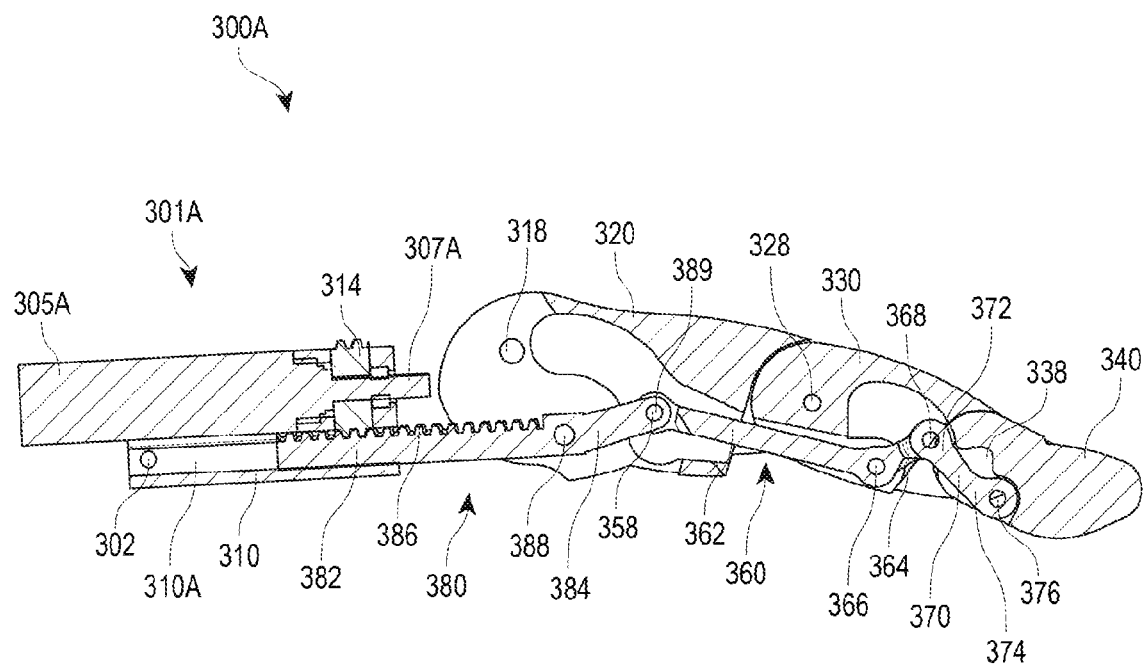

FIGS. 10A-10C are various views of an embodiment of a prosthetic digit 300A. The digit 300A. The digit 300A may be used with the system 100 or hand 200. The digit 300A may have the same or similar features and/or functions as the digit 300, and vice versa, except as otherwise described. FIG. 10A is a perspective view of the digit 300A, FIG. 10B is an exploded view of the digit 300A, and FIG. 10C is a side cross-section view of the digit 300A as taken along the line 10C-10C indicated in FIG. 10A.

The digit 300A includes the segments 320, 330, 340 and links 360, 370, as described herein, for example with respect to FIGS. 3A-3H. The digit 300A further includes an actuator 310A. The actuator 310A includes a motor 305A and shaft 307A, which may have the same or similar features and/or functions as the motor 305 and shaft 307 respectively. The motor 305A rotates the shaft 307A about a longitudinal axis of the motor 305A.

The actuator 301A includes a support 310. The motor 305A is supported by the support 310. The support 310 extends longitudinally and defines a cavity 310A therein.

The cavity and/or sidewall of the support 310 may carry the motor 305A. The shaft 307A extends through openings defined by first and second projections 310B, 310C of the support 310 that extend upwardly therefrom to define a space therebetween. A leadscrew 314 having external threads thereon, as described herein, is attached to the shaft 307A in between the first and second projections 310B, 310C such that rotation of the shaft 307A will rotate the leadscrew 314 in the space defined by the projections 310B, 310C. A nut or endcap may be attached to the distal end of the shaft on the distal side of the second projection 310C to axially secure the motor 305A with the support 310. The support 310 extends from a proximal end having a transverse opening 302 therethrough to a distal end having the projections 310B, 310C extending upwardly therefrom. The cavity 310A extends within the support 310 from the proximal end to the distal end.

The actuator 310A includes a rack 380. The rack 380 may be a worm rack. The rack 380 extends from a proximal end 382 to a distal end 384. The proximal end 382 includes an elongated section having threads 386. The threads 386 may be partial threads as shown. The threads 386 extend transversely and are located along the length of the rack 380. The distal end 384 includes an opening 389 that is configured to connect with the connection 358 at the proximal end 362 of the proximal link 360. The rack 380 may be a section of the inner threaded portion of the housing 311 described herein. The rack 380 may include a joint 388 that is attached rotationally to the proximal digit segment 320, and about which the proximal end 384 may rotate as the rack pushes and pulls at the joint 388 during axial movement. The joint 388 may be an opening having a pin extending therethrough to rotationally connect the distal end of the threaded section of the rack 380 and the proximal end of the distal end 384. The rack 380 by pushing or pulling at the joint 388 may cause the proximal segment 320 to rotate or pivot about the joint 318.

The rack 380 may be a portion of the housing 311, described herein. The rack 380 may be a lower proximal portion of the housing 311. The rack 380 may slide linearly within the cavity 310A of the support 310. The rack 380 may translate axially due to engagement of the threads 386 with the threads of the leadscrew 314. As the leadscrew 314 rotates, the threads of the leadscrew engage the threads 386 of the rack 380 to cause the rack 380 to move axially. The rack 380 may translate distally in response to rotation of the leadscrew in a first rotational direction, and the rack 380 may translate proximally in response to rotation of the leadscrew in a second rotational direction that is opposite to the first rotational direction.

Axial movement of the rack 380 will cause the proximal end 362 of the proximal link 360 to correspondingly move axially. Axial translation of the proximal link 360 will cause the digit 300A to rotate closed or open depending on the direction of axial movement of the link 360, as described herein, for example with respect to FIGS. 3F-3H. The proximal segment 320 may rotate about the joint 318 as the rack 380 pushes and pulls at the joint 388 to cause the distal end 384 to push or pull at the connection 358 via a pin through the opening 389.

The digit 300A may include a housing or cover over the actuator 301A and/or other portions of the digit 300A. In some embodiments, the actuator 301A and/or other features of the digit 300A may be located within a prosthetic hand, such as the palm region. In some embodiments, the actuator 301 may rotate slightly about a transverse axis to accommodate rotation of the digit 300A, for example at the opening 302 of the support 310, which may be located inside the hand or palm.

The digit 300A with the linearly translatable rack 380 may improve performance and extend the life of the digit 300A, for example by reducing the contact area and thus the friction between the threads of the lead screw 314 and the rack 380.

Figure 11A:
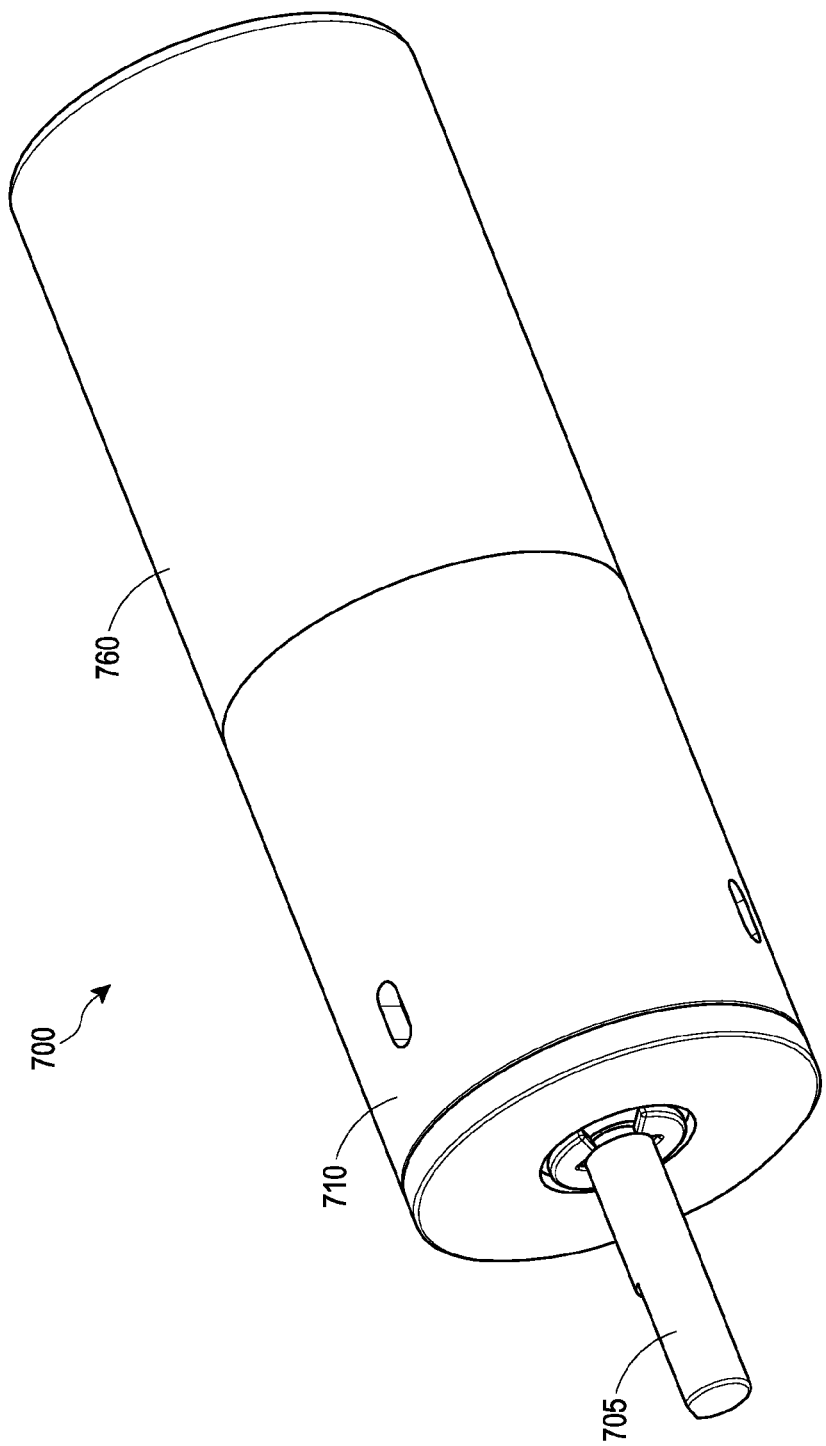
FIG. 11A is a perspective view of another embodiment of an actuator with three gear stages that may be used in any of the prosthetic digits described herein.
Figure 11B:
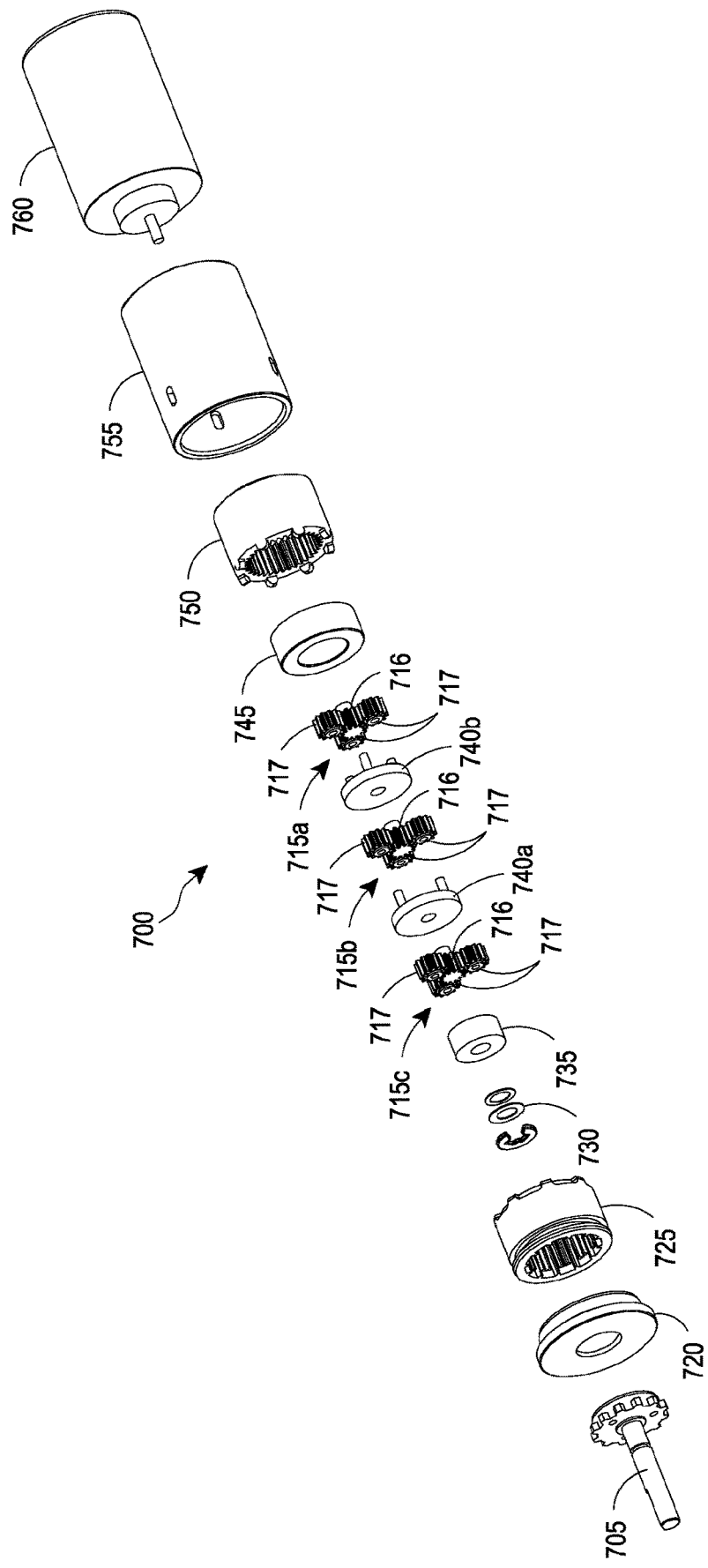
FIG. 11B is an exploded view of the actuator of FIG. 11A.
Figure 11C:
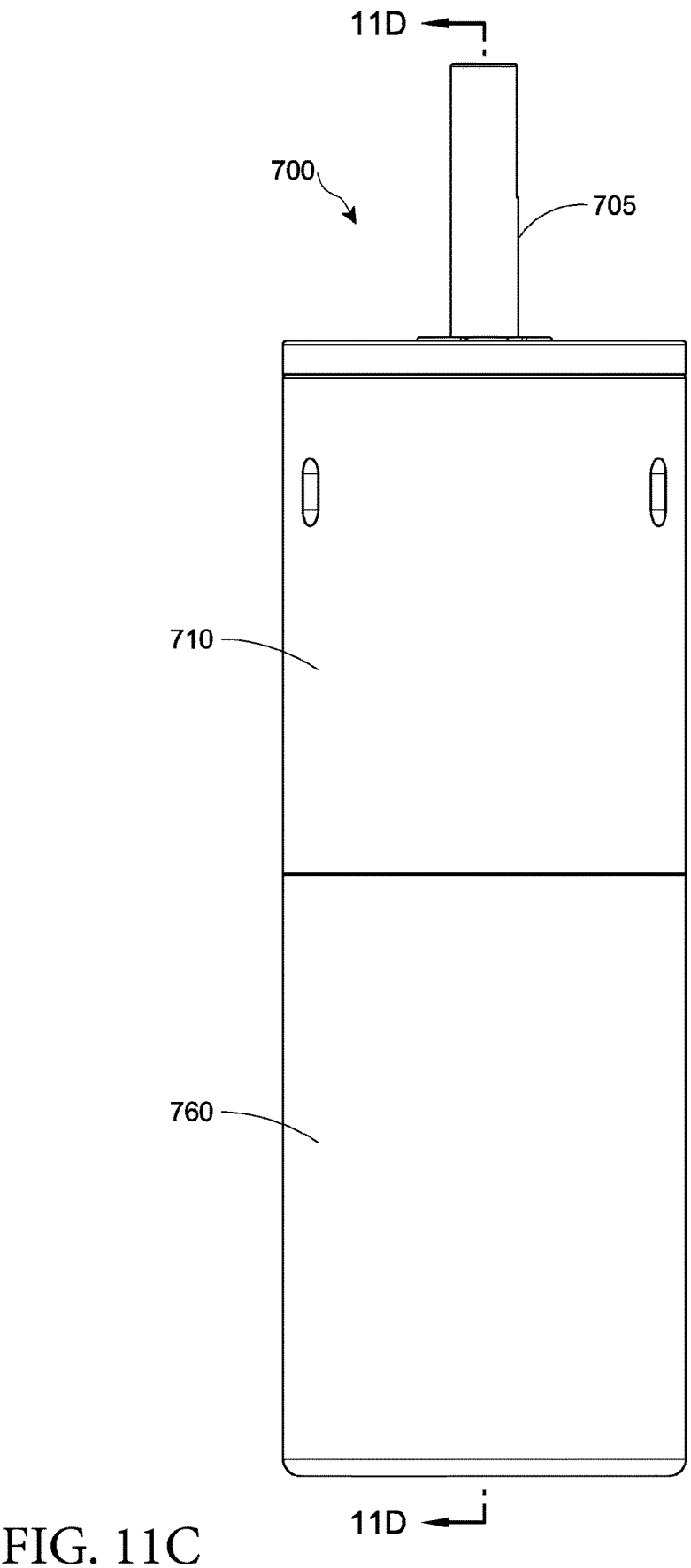
FIG. 11C is a side view of the actuator of FIG. 11A.

FIGS. 11A-11E are various views of an embodiment of an actuator 700 with three gear stages that may be used in any of the prosthetic digits described herein. As shown in FIGS. 11A and 11C, the actuator 700 includes an output shaft 705, a multi-ratio gearbox 710, and a motor 760. FIG. 11B is an exploded view of the actuator of FIG. 11A. In this embodiment, the actuator 700 comprises a first gear stage 715a, a second gear stage 715b, and a third gear stage 715c. Each of the three gear stages comprise three planet gears 717 and one sun gear 716. Between these gear stages are carriers 740a, 740b. The actuator 700 also comprises a drive end cap 720, a shift ring gear 725 for the planet gears 717, clips 730, a bearing 745, a mount 755 for the motor 760, and a ring gear 750 for the first gear stage 715a. In this embodiment, the shift ring 725 is configured to engage with two gear stages. When the second and third gear stages 715b, 715c are not engaged (FIG. 11D), the planet gears 717 and the sun gear 716 of the second and third stages 715b, 715c rotate together with the shift ring gear 725 such that the outer teeth of the planet gears 717 do not walk along or move relative to the inner teeth of the ring gear 725. When the second and third gear stages 715b, 715c are engaged (FIG. 11E), the ring gear 725 is rotationally fixed, and the planet gears 717 walk along the outer teeth of the sun gear 716 and the inner teeth of the ring gear 725. Some or all the components, except the motor 760, may be covered by the housing 755. The shift ring gear 725 may be actuated by a variety of suitable mechanisms, such as a separate linear actuator, a separate linear motor, a shape memory alloy, a bi-stable lever (see, e.g., FIG. 13), other suitable mechanisms, or combinations thereof.

The multi-ratio gearbox 710 may employ a method of synchronizing relative velocities of the first, second, and third gear stages 715a, 715b, 715c prior to engagement, as further described herein, for example with respect to FIGS. 28A-31C. This system is called synchromesh. Synchromesh significantly reduces wear and noise during a gear change while allowing a percentage of the output torque to remain even as gear shifting occurs. There are several ways to achieve synchronization of the gear elements. One way to synchronize the gear elements is to have spring loaded friction elements that contact and transfer torque prior to gear engagement. Another way is to have frictional contact of mechanical geometries (e.g., male/female conical elements) that engage prior to a mechanical mesh. A third way is to utilize shear thickening fluids that thicken in response to an increase in shear, which can occur when the unsynchronised rotating elements come into proximity. Alternatively, thickening could also be through the application of heat or magnetic/electric fields. The embodiment of gearbox 700, depicted in FIG. 11B, may employ the synchromesh features described herein.

Figure 11D:
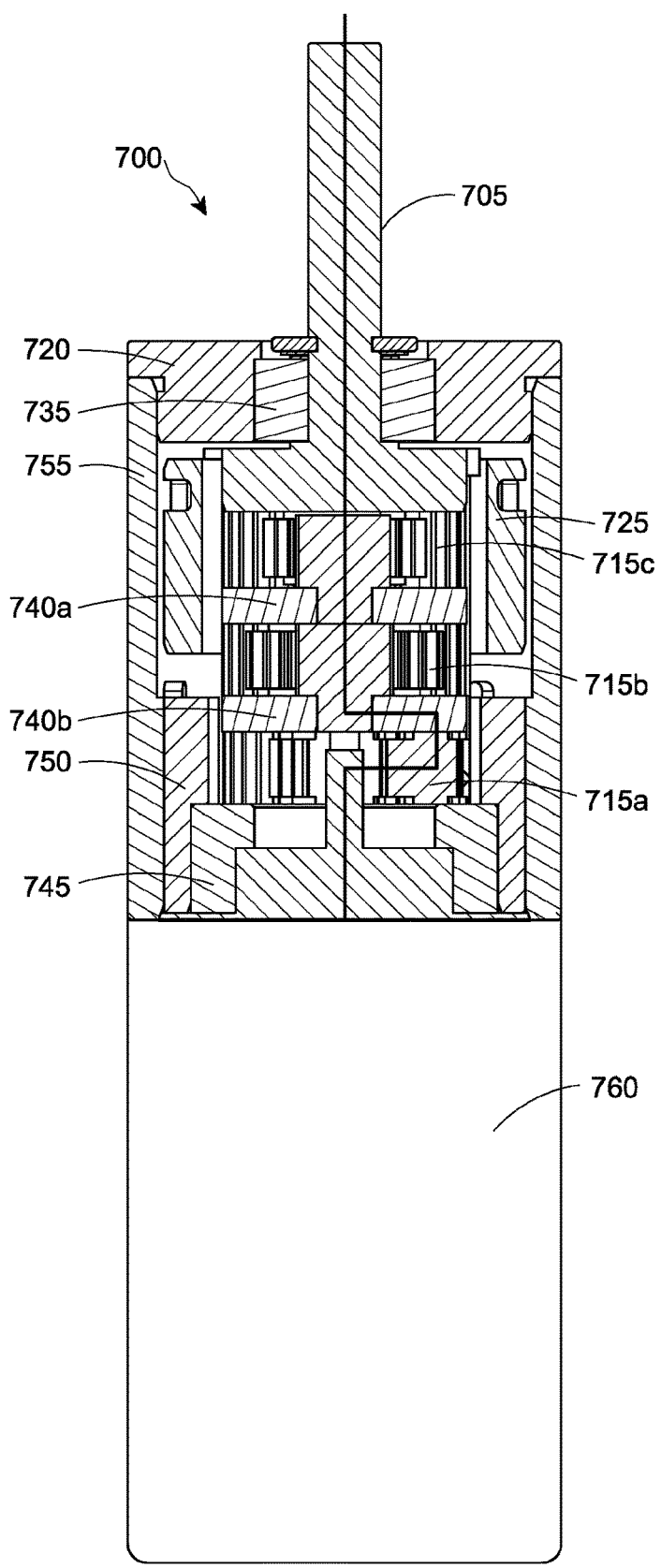
FIG. 11D is a partial cross-sectional view of the actuator of FIG. 11A as taken along the 11D-11D lines indicated in FIG. 11C with one gear stage engaged.
Figure 11E:
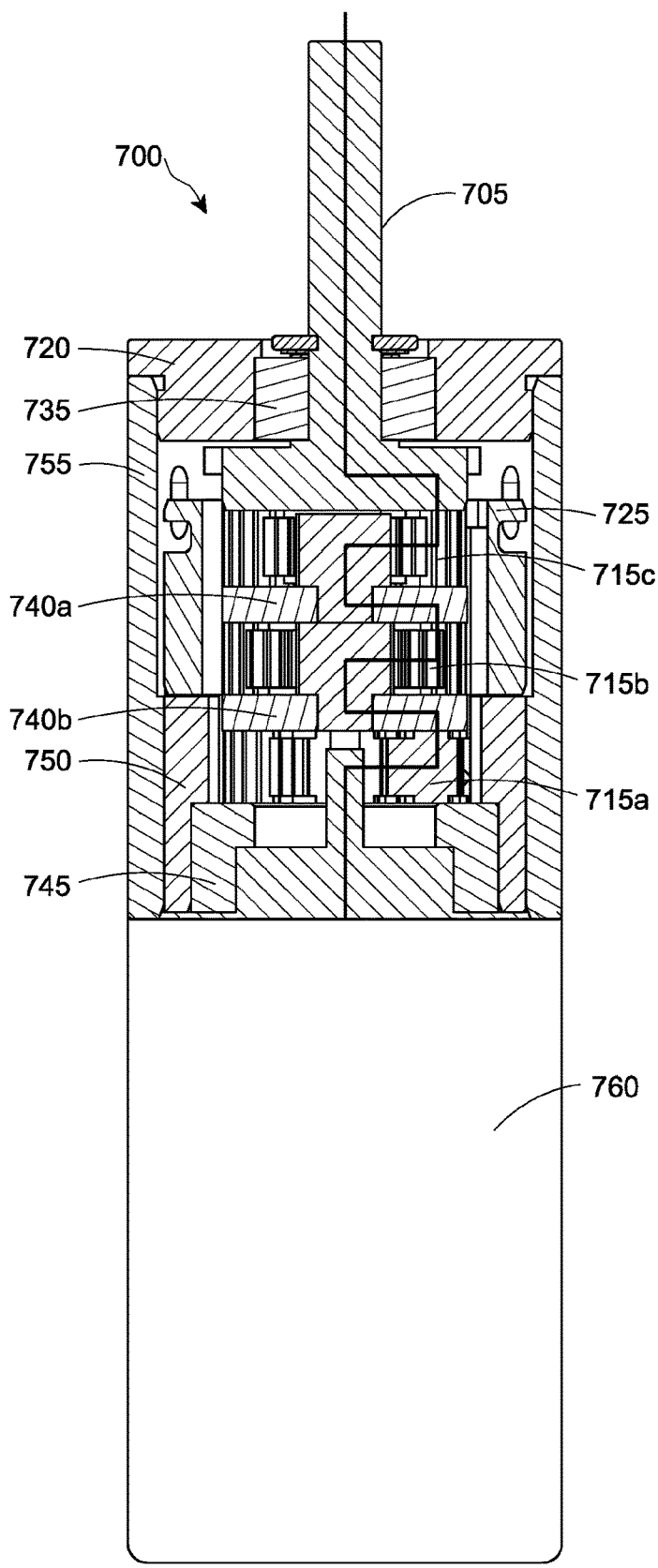
FIG. 11E is a partial cross-sectional view of the actuator of FIG. 11A as taken along the 11D-11D lines indicated in FIG. 11C with all three gear stages engaged.

FIGS. 11D-11E depict the actuator 700 in two different modes: high gear and low gear, respectively. FIG. 11D illustrates the actuator 700 in high gear with the first gear stage 715a engaged. When the actuator 700 is in high gear, the fewest number of gear stages are engaged. The shift ring 725 engages the second and third gear stages 715b, 715c and rotate with the second and third gear stages 715b, 715c. The shift ring 725 mechanically communicates with the output carrier, which is the proximal portion of the output shaft 705. In this state, the shift ring 725 is free to rotate. The output of the motor 760 passes through the first gear stage 715a into the second gear stage 715b. The output of the second gear stage 715b rotates the third gear stage 715c and therefore rotates the output shaft 705 directly. This high gear state allows the prosthetic digit to move quickly with low torque, causing the digit to move faster and apply lower gripping force.

FIG. 11E illustrates the actuator 700 in low gear with the first, second and third gear stages 715a, 715b, 715c engaged. When the actuator 700 is in low gear, the maximum number of gear stages may be engaged. The first, second and third gear stages 715a, 715b, 715c can rotate. The shift ring 725 does not mechanically communicate with the output planetary carrier. Instead, the proximal castellations of the shift ring 725 may mechanically communicate with the distal grooves of the ring gear 750. In this state, the shift ring 725 is rotationally fixed by the interaction with the ring gear 750 and thus does not rotate. The output of the motor 760 rotates the first, second and third gear stages 715a, 715b, 715c, which rotates the output shaft 705. This low gear state allows the actuator 700 to output more torque at a slower speed, causing the digit to move slower but apply greater force.

Figure 12:
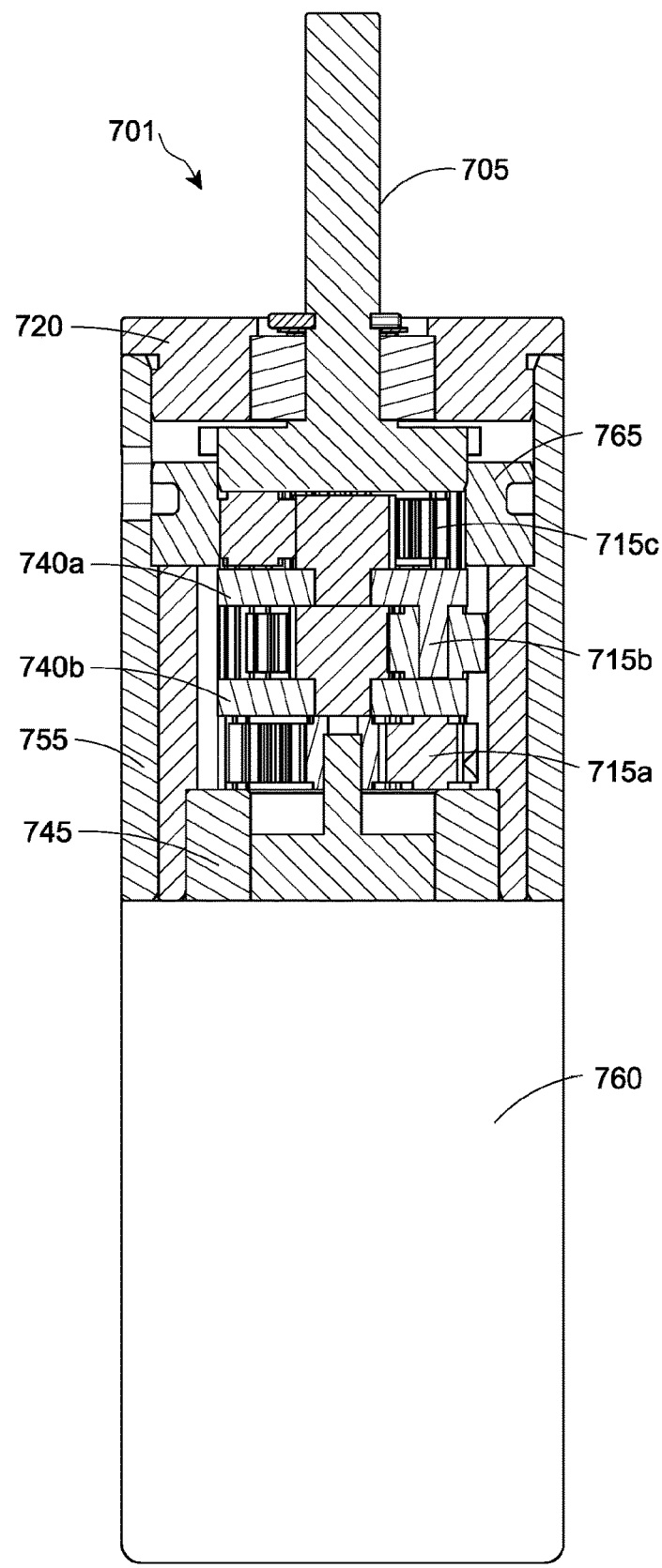
FIG. 12 is a partial cross-sectional view of another embodiment of an actuator with three gear stages that may be used in any of the prosthetic digits described herein, in which one gear stage is engaged.

FIG. 12 depicts a partial cross-sectional view of an embodiment of an actuator 701 with three gear stages that may be used in any of the prosthetic digits described herein. In this embodiment, the actuator 701 contains a shift ring 765 that is configured to engage with one gear stage. When the actuator 701 is in high gear, the first and second gear stages 715a, 715b are engaged. The shift ring 765 engages the third gear stage 715c and rotates with the third gear stage 715c. The shift ring 765 mechanically communicates with the output carrier. In this state, the shift ring 765 is free to rotate with the third gear stage 715c. The output of the motor 760 passes through the first and second gear stages 715a, 715b. The output of the first and second gear stages 715a, 715b rotates the third gear stage 715c. The third gear stage 715c then rotates the output shaft 705 directly. When the actuator 701 is in low gear, the actuator 701 acts similarly to the actuator 700 described in the previous paragraph with all three gear stages 715a, 715b, 715c engaged.

Figure 13:
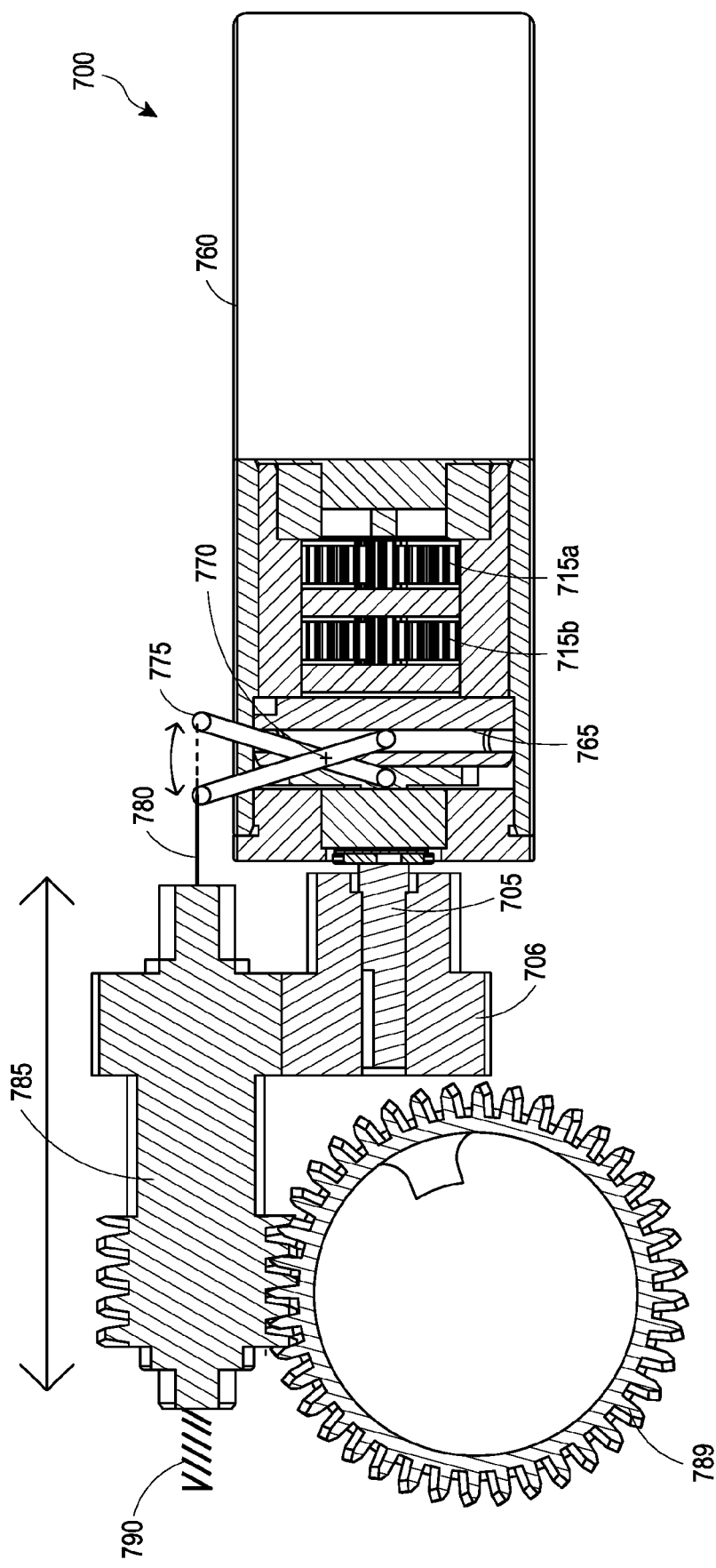
FIG. 13 is a partial cross-sectional view of another embodiment of an actuator that may be used in any of the prosthetic digits described herein, and which is operatively connected to an embodiment of a mechanical feedback mechanism comprising spring-loaded worm gear, a worm wheel, and a bi-stable spring lever.

FIG. 13 illustrates a partial cross-sectional view of an embodiment of the actuator 700, which is operatively connected to a force feedback mechanism that includes a spring-loaded worm gear 785, a worm wheel 789, and a bi-stable spring lever 775. As the torque on the worm wheel 789 increases, the worm gear 785 moves laterally on the worm wheel 789. The bi-stable lever 775 stores up energy until it reaches a certain threshold. When the torque reaches the threshold, the displacement of the worm gear 785 drives the bi-stable lever 775 to switch positions thereby changing ratio. The lever 775 may be connected to the worm gear 785 by a structural member 780 configured to transfer the force to cause the movement. In some embodiments, a separate linear actuator or other mechanism may be used to shift the gears, such as a linear motor or shape memory alloy.

Figure 14:
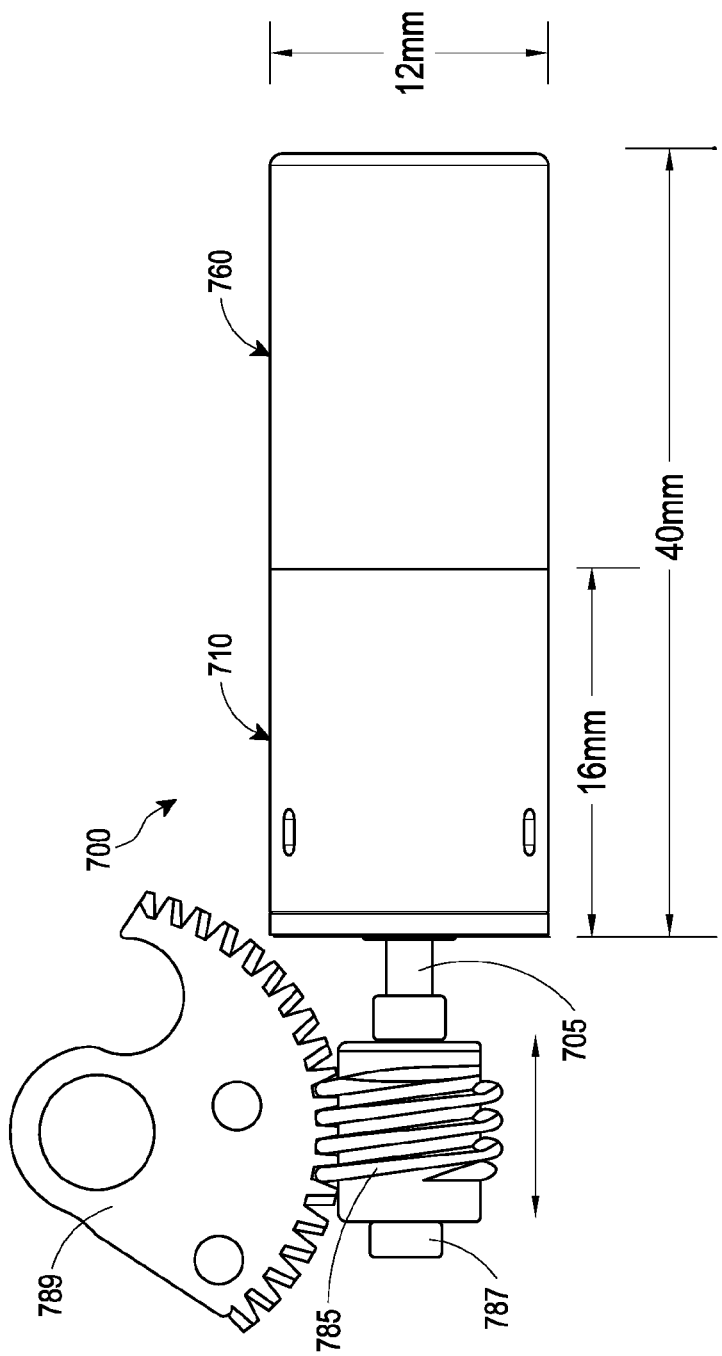
FIG. 14 is a side view of another embodiment of an actuator that may be used in any of the prosthetic digits described herein, and which is operatively connected to a worm gear with a detent for smooth shifting and a worm wheel.

FIG. 14 shows a side view of the actuator 700 and a detent 787 on the worm gear 785. In order to minimize the interruption of torque delivery to the gearbox 710 output, ratio shifting occurs as quickly as possible. Switching can be wholly mechanical, wholly electronic, or can be partially mechanical and partially electronic. In some embodiments, the ratio shifting occurs wholly mechanically, where the increase in torque is sensed by the mechanical system and the energy for gear change is taken from the mechanical action of the gearbox 710. For example, bi-stable switching can be generated using springs and detents. The springs and detents can, effectively, store up potential energy from an external force and, once it exceeds a force threshold, release the stored energy instantaneously to switch ratio. FIG. 14 illustrates a method of a gear change whereby the increase in force on the digit, drives an increase of torque on the worm gear 785. As the torque increases the worm gear 785 climbs higher up the worm wheel 789. The bi-stable lever 775, comprising a spring 790 and a detent 787, flexes and stores energy until the detent 787 threshold is overcome. When the detent 787 threshold is overcome, the displacement of the worm 785 drives the bi-stable lever 775 to snap between positions thereby changing ratios.

Figure 15:
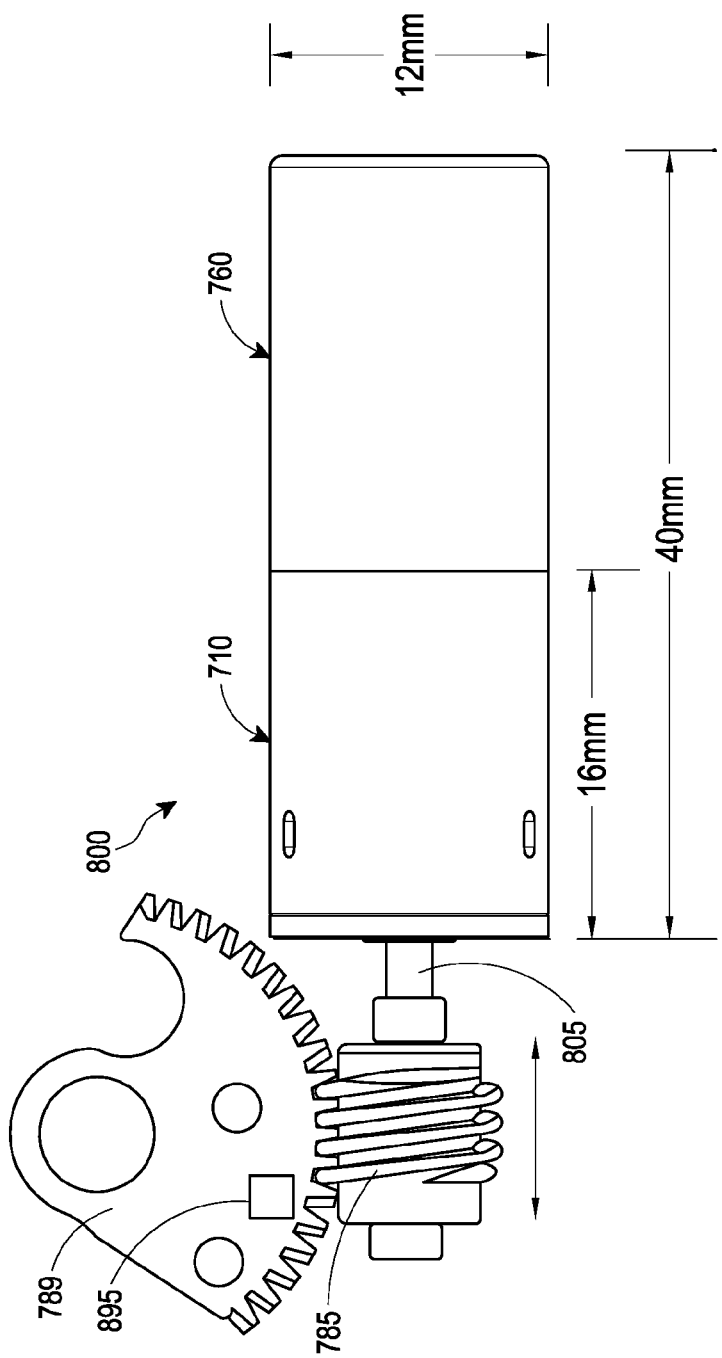
FIG. 15 is a side view of another embodiment of an actuator that may be used in any of the prosthetic digits described herein, which is operatively connected to a worm gear with a detent for smooth shifting and a worm wheel with a torque sensor.

In another embodiment of the actuator 800, as shown in FIG. 15, ratio shifting can be supported by electronics. FIG. 15 shows a side view of the actuator 800 with a torque sensor 895 on the worm wheel 789. The torque sensor 789 can sense a ratio change taking place or a ratio change is about to take place by measuring motor torque, worm displacement, output torque, or the force on a digit. The torque sensor 789 is configured to communicate with the motor or the processor controlling gear shifting. The torque sensor 789 can either send measurement data to the motor or the processor continually or when the torque has exceeded a certain threshold. The sensor 789 may be used in embodiments not having a worm wheel and worm gear.

FIGS. 16A-21C depict schematic representations of different embodiments of the single stage or multiple stage gearbox. The various gearboxes described herein may be modified to incorporate any of the functionality shown in FIGS. 16A-21C. FIG. 16A is a schematic representation of a switchable one stage gearbox 900A that is switchable between zero and one gear stage engaged. The switchable one stage gearbox 900A comprises a gear stage 901A, a single stage switch 905, a ring gear engagement 910, and a planetary gear engagement 915. When the gearbox is in high gear, as shown in FIG. 16B, the gear stage 901A is not engaged and the ring gear rotates freely. Therefore, the output 920 from the motor passes through the gear stage 901A and rotates the output shaft directly. When the gearbox is in low gear, as shown in FIG. 16C, the gear stage 901A is engaged and the ring gear is prevented from rotating. Thus, the output 921 of the motor rotates the gear stage 901A, which rotates the output shaft of the actuator with relatively higher torque and slower speed.

FIG. 17A is a schematic representation of a switchable two stage gearbox 900B that is switchable between one and two gear stages engaged. The switchable two stage gearbox 900B comprises a first gear stage 901B, a second gear stage 902B, a single stage switch 905, a ring gear engagement 910, and a planetary gear engagement 915. When the gearbox is in high gear, as shown in FIG. 17B, the first gear stage 901B and the ring gear are engaged but the second gear stage 902B is not engaged. Therefore, the output 921 from the motor rotates the first gear stage 901A, which rotates the output shaft directly. When the gearbox is in low gear, both the first and second gear stages 901B, 902B are engaged and the ring gear is disengaged. The output 922 of the motor rotates the first and second gear stages 901B, 902B. The first and second gear stages 901B, 902B then rotate the output shaft of the actuator with relatively higher torque and slower speed.

FIG. 18A is a schematic representation of a switchable three stage gearbox 900C that is switchable between one and three gear stages engaged. The switchable three stage gearbox 900C comprises a first gear stage 901C, a second gear stage 902C, a third gear stage 903C, a two stage switch 905, a ring gear engagement 910, and a planetary gear engagement 915. When the gearbox is in high gear with relatively high speed and low torque, as shown in FIG. 18B, the first gear stage 901C is engaged but the second and third gear stages 902C, 903C are not engaged. The output 921 from the motor rotates the first gear stage 901C, which rotates the output shaft directly. When the gearbox is in low gear with relatively low speed and high torque, the first, second and third gear stages 901C, 902C, 903C are engaged. The output 923 of the motor rotates the first, second, and third gear stages 901C, 902C, 903C. The first, second and third gear stages 901C, 902C, 903C then rotate the output shaft of the actuator.

Figures 19A, 19B, 19C, 19D, 19E:
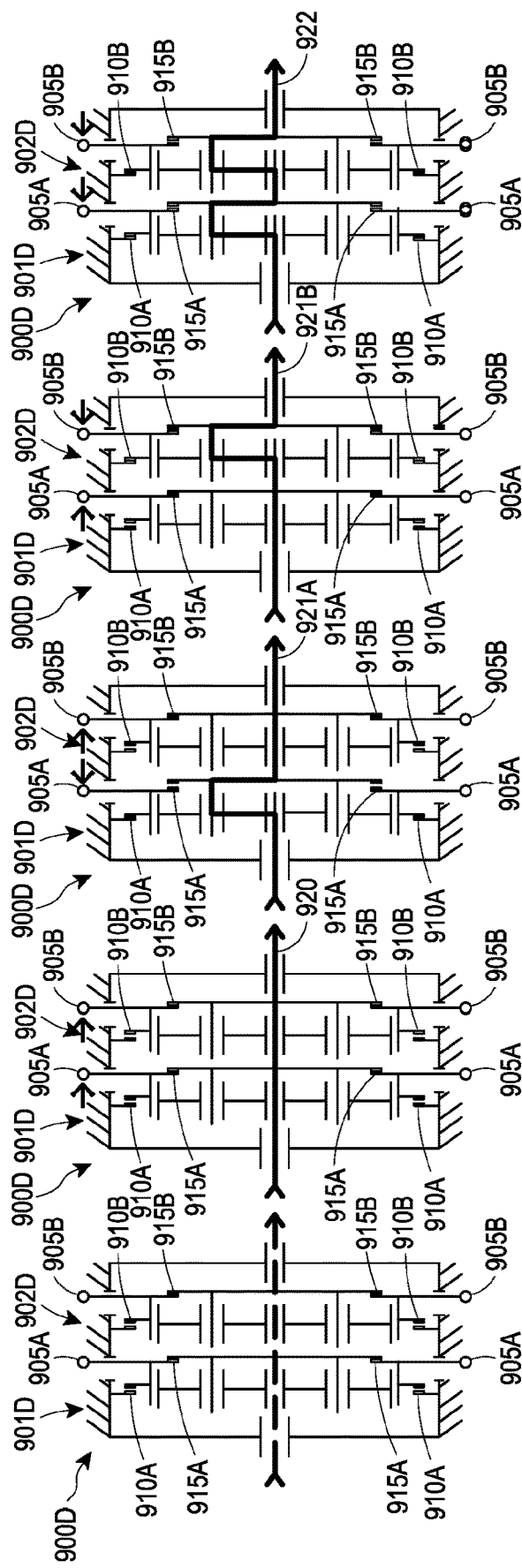
FIGS. 19A-E are schematics of a switchable two stage gearbox with multiple selectable gears.

As shown in FIGS. 16A-18C, there may be only two selectable outcomes: high gear and low gear. In other embodiments, as shown in FIG. 19A, there may be high gear, two middle gears, and low gear. FIG. 19A illustrates a switchable two stage gearbox 900D that comprises a first gear stage 901D, a second gear stage 902D, a first one stage switch 905A, a second one stage switch 905B, a first ring gear engagement 910A, a second ring gear engagement 910B, a first planetary gear engagement 915A and a second planetary gear engagement 915B. The gearbox 900D is switchable between zero, first, second, or first and second, gear stage engagement. When the gearbox is in the highest gear, as shown in FIG. 19B, the first and second ring gears 910A, 910B are disengaged. The output 920 from the motor passes through the first and second gear stages 901D, 902D and rotates the output shaft directly. When the first one stage switch 905A is flipped, as shown in FIG. 19C, the first gear stage 901D is engaged and the output 921A from the motor rotates the first gear stage 901D, which rotates the output shaft of the actuator. Alternatively, when the second one stage switch 905B is flipped, as shown in FIG. 19D, the second gear stage 902D is engaged and the output 921B from the motor rotates the second gear stage 902D, which rotates the output shaft. When the gearbox is in the lowest gear, as shown in FIG. 19E, the first and second gear stages 901D, 902D are engaged. Thus, the output 922 of the motor rotates the first and second gear stages 901D, 902D, which rotates the output shaft of the actuator with the highest torque and slowest speed.

Figures 20A, 20B, 20C:
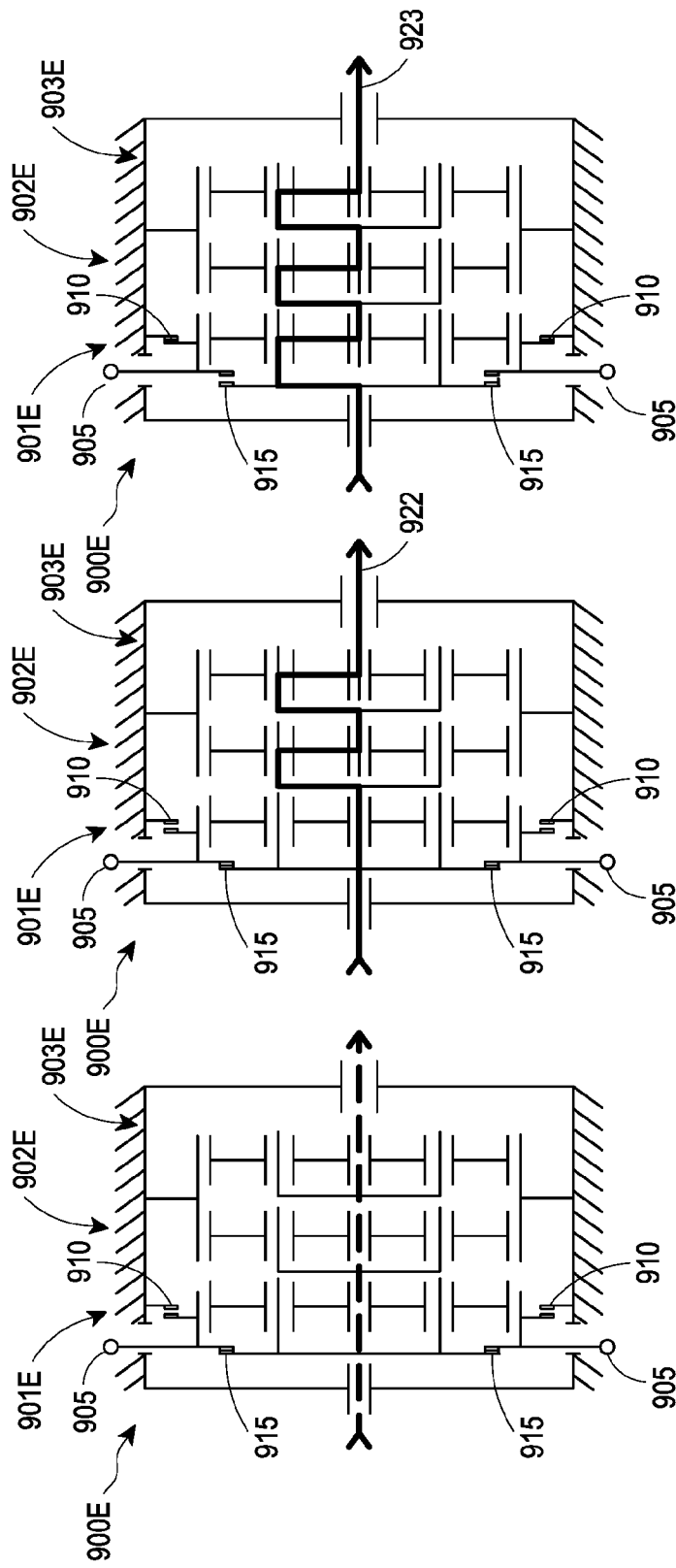
FIGS. 20A-C are schematics of a switchable multi-ratio three stage gearbox with first stage switching.

FIG. 20A is a schematic representation of another embodiment of a switchable three stage gearbox 900E that is switchable between two and three gear stages engaged. The switchable three stage gearbox 900E comprises a first gear stage 901E, a second gear stage 902E, a third gear stage 903E, a one stage switch 905, a ring gear engagement 910, and a planetary gear engagement 915. When the gearbox is in high gear, as shown in FIG. 20B, the second and third gear stages 902E, 903E are engaged. The output 922 from the motor rotates the second and third gear stages 902E, 903E, which rotates the output shaft directly. When the gearbox is in low gear, the first, second and third gear stages 901E, 902E, 903E are engaged. The output 923 of the motor rotates the first, second, and third gear stages 901E, 902E, 903E. The first, second and third gear stages 901E, 902E, 903E then rotate the output shaft of the actuator with higher torque and slower speed.

FIGS. 16A-20C illustrate embodiments of the gearbox that are planetary type gearboxes. In other embodiments, the gearbox can comprise other epicyclic gear sets (e.g., a strain wave), compound planetary gear sets, or non-epicyclic gear sets (e.g., spur gear sets). These gear sets could be used explicitly or in conjunction with one another.

Figures 21A, 21B, 21C:
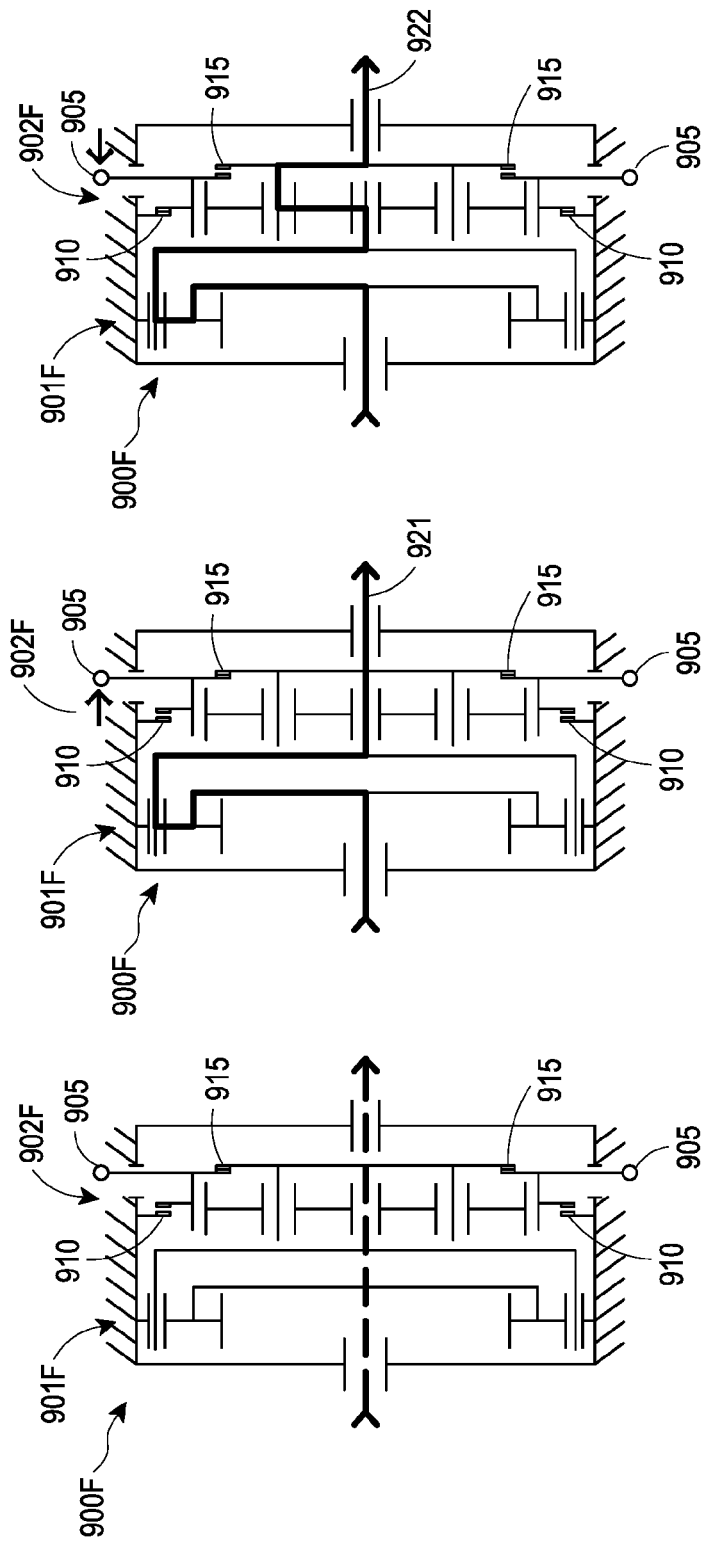
FIGS. 21A-C are schematics of a multi-ratio gearbox consisting of a strain wave stage and a switchable planetary stage.

FIG. 21A illustrates a switchable two stage gearbox 900F that comprises a first gear stage 901F, a second gear stage 902F, a one stage switch 905, a ring gear engagement 910, and a planetary gear engagement 915. In this embodiment, the first gear stage 901F comprises a strain wave stage and the second gear stage 902F, which comprises a switchable planetary stage, can be engaged and disengaged from the strain wave stage 901F. When the gearbox is in high gear, the first gear stage 901F is engaged. The output 921 from the motor rotates the first gear stage 901F, which rotates the output shaft directly. When the gearbox is in low gear, both the first and second gear stages 901F, 902F are engaged. The output 922 from the motor rotates the first and second gear stages 901F, 902F, which rotate the output shaft of the actuator with relatively higher torque and lower speed.

FIG. 22 is a schematic of an embodiment of a control system 1000. The control system 1000 may be used to control the various prosthetic digits described herein. For example, the control system 1000 may be used to control any of the digits shown in and described with respect to FIGS. 1-21C and 28A-31. The control system 1000 may be used to control an actuator for the digit, such as the actuator 700, the actuator 701, the actuator 800, the actuator 1600, or any other actuators or components thereof, such as the motor, gear shifting mechanism, gearbox, etc., described herein.

The control system 1000 may be used to prevent or mitigate the impact of wear characteristics of the gearbox switching mechanism. The effect of control differs from asynchronous to synchronous gear box switching solutions. In some embodiments, switching takes place while the gearbox is transferring low torque. This may reduce the impact of wear as compared to switching gears while transmitting low or no torque. The control system 1000 is one example for a gearbox switching control system.

The control system 1000 includes a first controller 1005, which may be a hand microcontroller. The controller 1005 is in communication with and commands the motor controller 1010, which communicates with and controls the motor 1015. The motor speed may be controlled. Initiation or termination of motor movement may be controlled. The motor 1010 may provide feedback 1017 to the controller 1010 related to electrical current or voltage, position, movement, non-movement, speed, acceleration, etc. of the motor 1015. The motor controller 1010 may provide feedback to the first controller 1005.

The motor 1015 communicates with and controls a first gear set 1020 and a direct drive 1025. The first gear set 1020 may be any of the gear sets described herein, such as the first gear stage 715a, 1615a, etc. The direct drive 10225 may directly control an output shaft, for example where no gear sets are engaged.

The control system 1030 may include a transmission 1030 having a dog clutch and a second gear set 1034. The clutch 1032, such as a dog clutch, may be any of the shifting gears or components thereof as described herein, such as the shift ring gear 725, shift ring 1625, etc. The clutch 1032 may be off/disengaged to engage a second gear set 1034. The clutch 1032 may be on/engaged to bypass engagement of the second gear set 1034.

The control system 1000 includes first data 1035 related to digit dynamics, such as position, movement, non-movement, velocity, acceleration, force, etc. These and other characteristics of the digit, such as the present gripping force of the digit as shown, may be supplied as the first data 1035. This data may be sent to and/or used in second data 1045 related to the torque being applied by and/or to the actuator. Such torque may be applied to or by the motor 760, 1660, etc. The first and second data 1035, 1045 may be analysed to adjust or continues the torque applied by the actuator. The detected torque data in the data 1045 may be communicated to a transmission controller 1050, which may control the transmission 1030 and also provide feedback to the motor controller 1010.

The control system 1000 may include only some of the components shown and described in FIG. 22. The control system 100 may include additional components, such as a third gear set, other types of data, other controllers, etc.

FIG. 23 is a flow chart showing one example method that may be preformed using the control system 1000. In some embodiments, after a gear change is initiated or detected through sensors, the power to the motor is interrupted for a fraction of a second, allowing the transmitted torque to drop before pulse width modulation (PWM) duty cycle acceleration is applied over the following tens of milliseconds. The acceleration allows the clutch to fully engage before full torque is reapplied to the drive. For example, as shown in FIG. 23, the method 1100 begins with step 1105 where a gear ratio change signal is generated, for example by the any of the controllers in the control system 1000. The signal 1105 is communicated to the motor controller to cause the motor output to turn off in step 1110. The method 1100 then moves to step 1115 where a delay to actuation of the motor is applied on the order of milliseconds, where "X" milliseconds may be five, ten, twenty, thirty, fifty, one hundred milliseconds, or other delay times. During this time the gear change is initiated and completed. The method 1100 then moves to step 1120 where the motor is again actuated, for example accelerated over "Y" milliseconds. The motor may be accelerated back to the speed prior to turning off the output in step 1110, or to lower or higher speeds. The motor may be accelerated in step 1120 for fifty milliseconds, one hundred milliseconds, five hundred milliseconds, one second, or other time periods.

Figure 24:
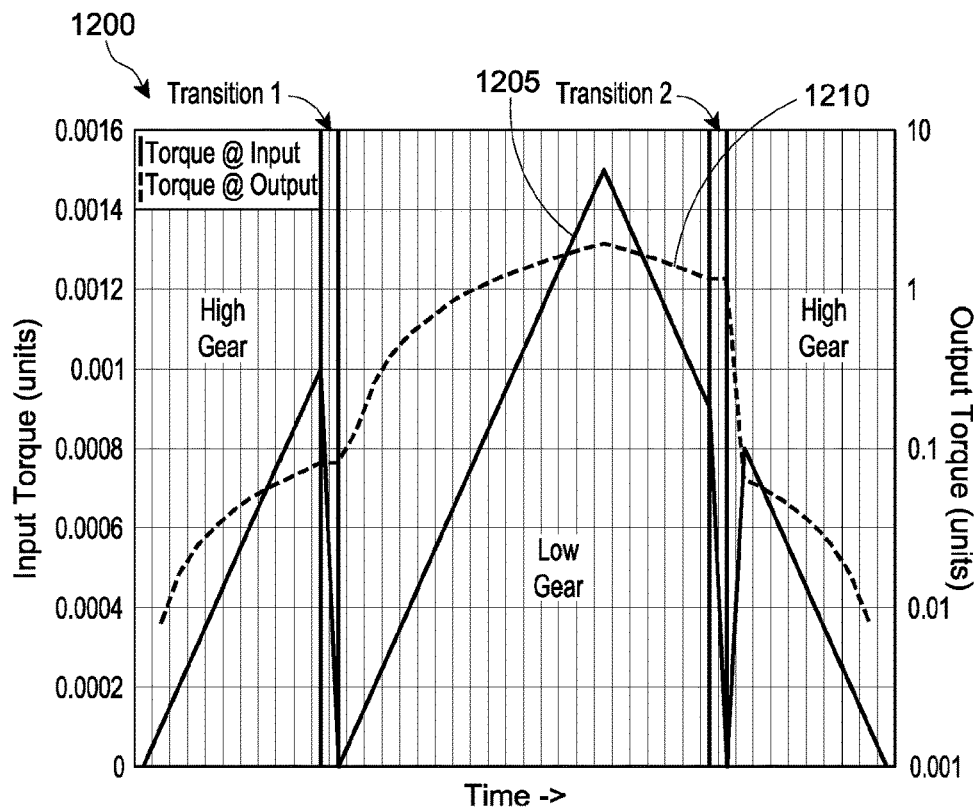
FIG. 24 is a data plot that depicts an embodiment of the input torque and output torque responses of a dual speed gearbox.

FIG. 24 is a data plot 1200 that shows the input torque 1205 and resulting output torque 1210 response of a dual speed gearbox as the dual speed gearbox switches from high gear to low gear back to high gear. As mentioned, the control system 100 may used to reduce the input torque during gear change, for example to reduce wear on the mechanical components. The data plot 1200 shows one embodiment of resulting data from a drop in input torque during ratio change. When the gearbox is in high gear and the input torque is increasing, the gearbox switches to low gear after the input torque satisfies a certain threshold. During the ratio change transition, the input torque 1205 drops, as shown in FIG. 24. When the gearbox is in low gear and the input torque is decreasing, the gearbox switches back to high gear. At this point of transition, the input torque 1205 drops again. The particular values for the torques are examples only, and other values may result.

Figure 25:
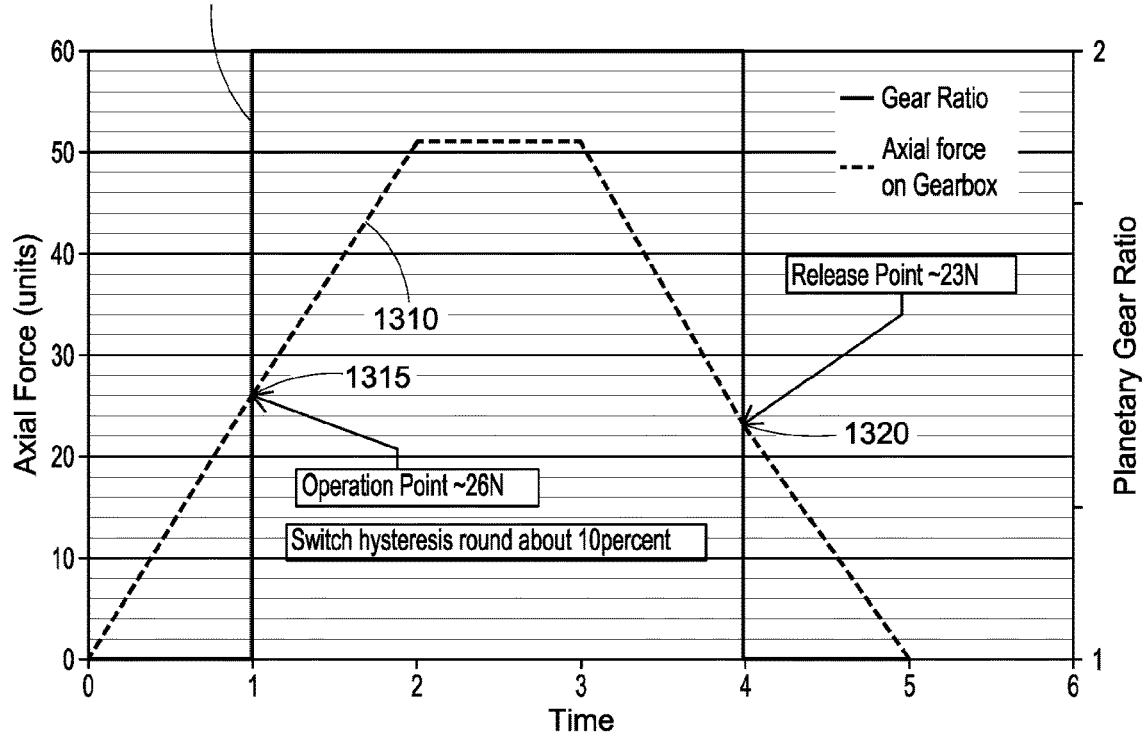
FIG. 25 is a data plot that illustrates the hysteresis in gear-change force, which is designed to inhibit a ratio searching phenomenon.

In order to prevent the gearbox from searching between ratios, the gearbox may comprise a built-in hysteresis. The hysteresis ensures there is a difference in energy between changing from one ratio to another ratio. FIG. 25 is a graphical depiction 1300 of the hysteresis that shows a difference in shifting force between two ratios. As shown in FIG. 25, a first threshold force is required to overcome the preset gear change detent in order to shift gear from high to low, i.e. to shift from high speed, low torque drive to high torque, low speed drive. The amount of this force may be a function of the torque generated in the digit drive assembly. As shown, the example force is about 26 Newtons (N) of force. Once this gear change has occurred, as long as the force remains above a second threshold, shown in this example as 23 N, the gearbox will remain in low gear. If the force in the gearbox drops below this second threshold, e.g. due to a drop in force on the digit, the gearbox will change from low gear back to high gear. The hysteresis is the difference between the first and second thresholds, which in this example is 3 N. The hysteresis eliminates the possibility that the gearbox is in a state where it is nether in high nor low gear, which may happen if there is no intrinsic hysteresis, and therefore the force to change up is the same as the force to change down.

Figure 26:
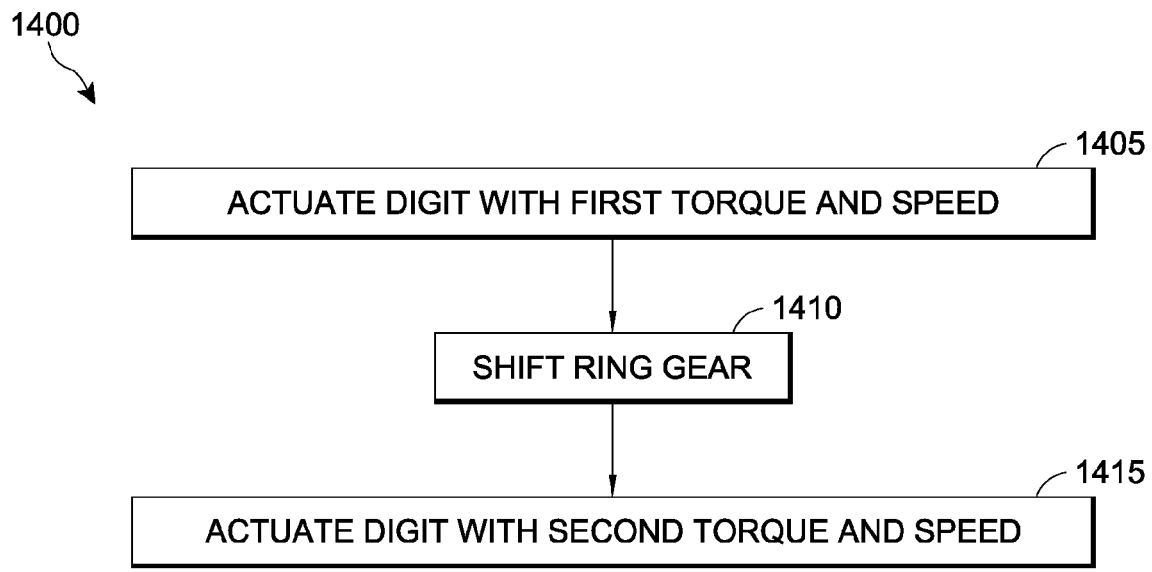
FIG. 26 is a flowchart showing an embodiment of a method of shifting gears with a prosthetic digit actuator.

FIG. 26 depicts a process 1400 in which the shift ring gear within the gearbox shifts from a first torque and a first speed in order to produce a second torque and a second speed. For convenience, the shift ring gear shifting process 1400 is described as being performed by the embodiment of the gearbox 700 described in FIGS. 11A-11E, but the shift ring gear shifting process 1400 can be performed in other embodiments of the gearbox described herein. At block 1405, a digit is actuated with a first torque and a first speed while the gearbox is in high gear. The shift ring 725 mechanically communicates with the output planetary carrier 705 to lock out the third gear stage 715c. The shift ring gear 725 is free to rotate and the output of the motor 760 passes through the first gear stage 715a into the second gear stage 715b. The output of the second gear stage 715b rotates the locked third gear stage 715c and, therefore, rotates the output shaft 705 directly. The gearbox 700 may remain in high gear until the input torque reaches a certain threshold.

At block 1410, for example, after the shift ring 725 shifts away from the output shaft 705, the input torque has reached the threshold. The frictional element of the shift ring gear 725 may engage with the spring-loaded frictional element of the ring gear 750 of the third gear stage 715c as described in further detail herein, for example with respect to FIGS. 28A-31C. The transfer of torque to the frictional elements of the ring gear 750 increases proportionally as the shift ring gear 725 moves proximally. The shift ring gear 725 disengages mechanical communication with the output planetary carrier 705 and may maintain frictional communication between the frictional element of the shift ring gear 725 and the spring-loaded frictional element of the output planetary carrier 705. The transfer of the torque from the output planetary carrier 705 to the shift ring gear 725 may reduce proportionally as the shift ring gear 725 moves proximally Once the shift ring gear 725 has been sufficiently displaced to have the majority of frictional contact with the frictional element of the third gear stage 715c over that of the frictional element of the output planetary carrier 705. At this point, the relative velocity of the shift ring gear 725 and the ring gear 750 tends to be zero. After the elements are synchronized, the shift ring gear 725 is displaced further as to mechanically communicate with the ring gear 750 and impedes the relative movement between the shift ring gear 725 and the ring gear 750. There is no contact between the friction elements of the shift ring gear 725 and the output planetary carrier 705. The shift ring gear 725 then becomes part of the ring gear for the third gear stage 715c.

At block 1415, all three gear stages 715a, 715b, 715c are engaged and the digit is actuated with a second torque and a second speed. The second torque is greater than the first torque and the second speed is less than the first speed. The shift ring gear shifting process 1400 has been described as being performed in response to a need for increased torque. If, however, there is a need for decreased torque (i.e., the second torque is less than the first torque), then the process would occur in reverse of what has been described. Generally, the shift ring gear 725 shifts distally toward the output shaft 705 such that the first and second gear stages 715a, 715b are disengaged and only the third gear stage 715c is engaged. In some embodiments, the process 1400 may not use synchronization.

Figure 27:
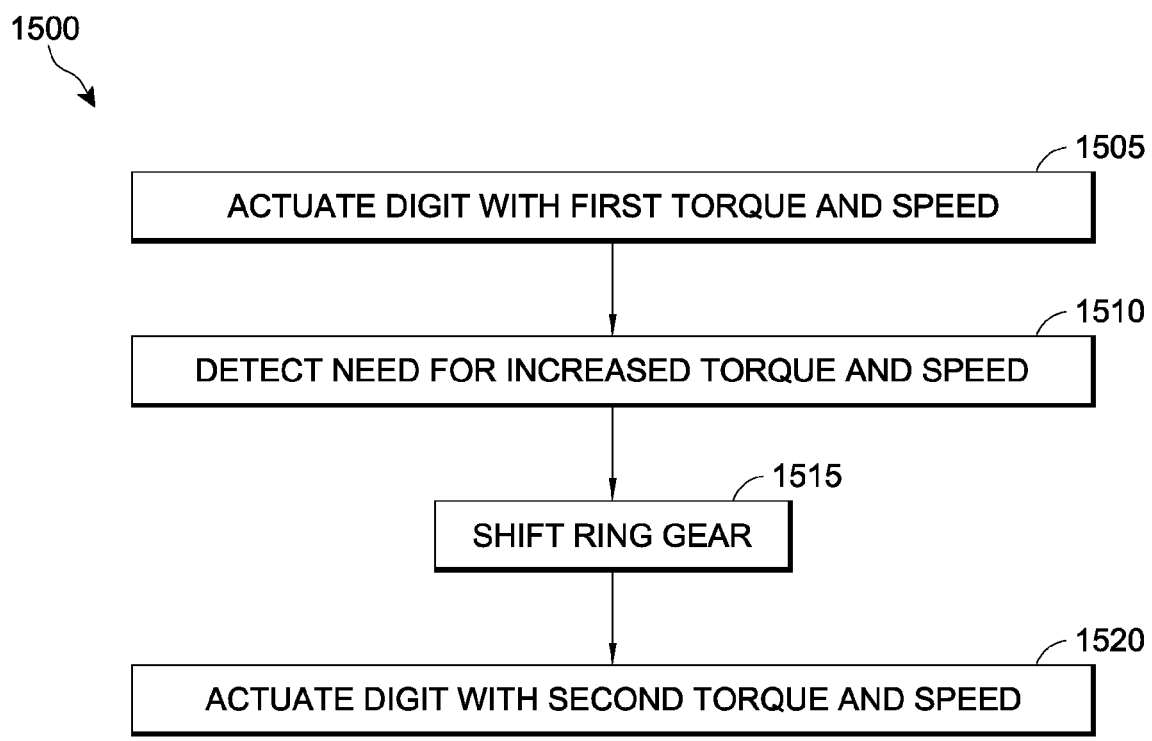
FIG. 27 is a flowchart showing another embodiment of a method of changing gears with a prosthetic digit actuator.

FIG. 27 depicts a process 1500 in which the shift ring gear within the gearbox shifts in response to a first torque and/or a first speed in order to produce a second torque and a second speed. This shift ring gear shifting process 1500 occurs in embodiments of the gearbox that include a feedback sensor, such as mechanisms described in FIGS. 13-15 and 28A-31C. At block 1505, a digit is actuated similar to block 1405 in FIG. 26. At block 1510, the feedback sensor detects a need for increased torque or speed. The sensor communicates this information to the motor 760 or the processor that controls gear shifting. At block 1515, if the sensor detects a need for increased torque, the shift ring gear 825 shifts, for example as described above for block 1410. If the sensor detects a need for increased speed, the process is reversed. Generally, the shift ring gear 725 shifts distally to output shaft 805 such that the first and second gear stages 715a, 715b are disengaged and only the third gear stage 715c is engaged. The various mechanical and/or electronic force/torque feedback mechanisms described herein may be used in the process 1500.

Figure 28A:
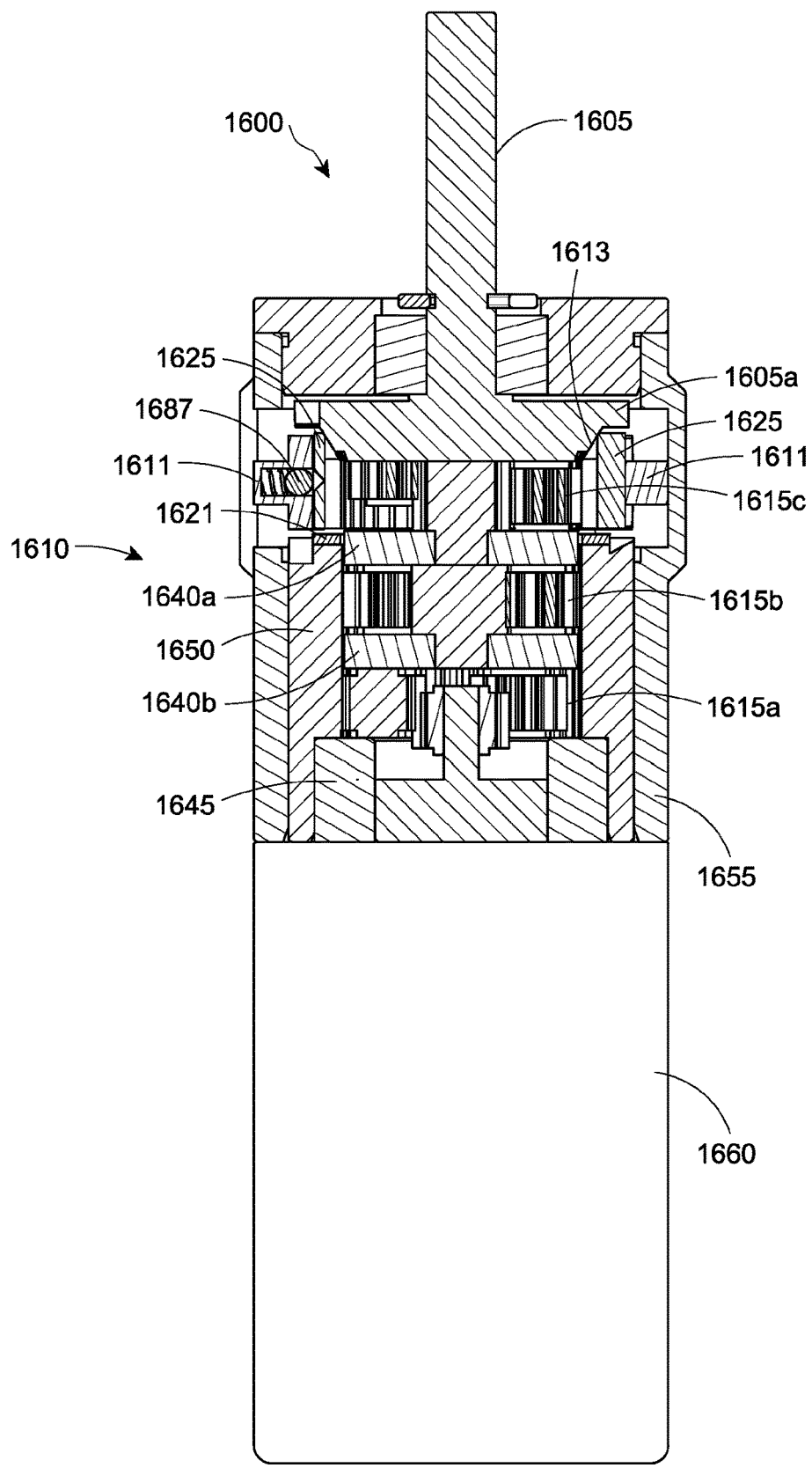
FIGS. 28A-B depict a cross-section and expanded views respectively, of another embodiment of a prosthetic digit actuator that includes gear synchronization.
Figure 28B:
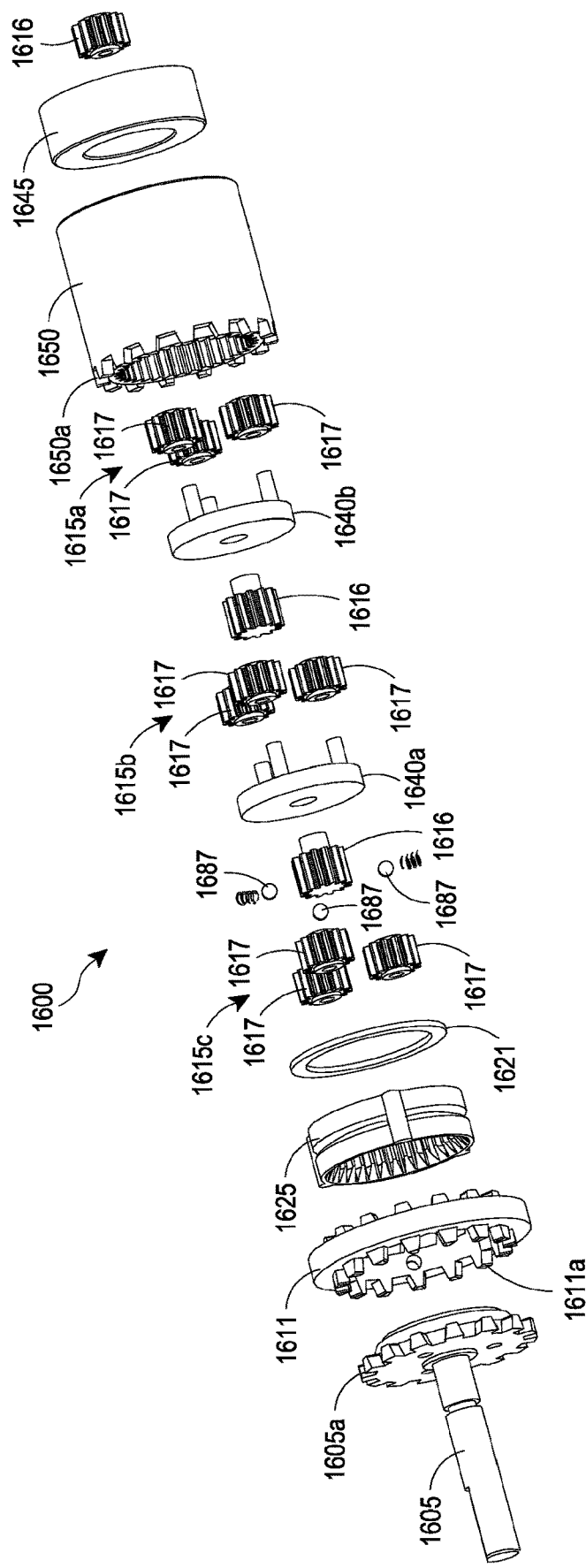

FIGS. 28A-B depict various views of another embodiment of an actuator 1600 with three gear stages and synchronization that may be used in any of the prosthetic digits described herein. As shown in FIGS. 28A-B, the actuator 1600 includes an output shaft 1605, a multi-ratio gearbox 1610, and a motor 1660. The multi-ratio synchromesh gearbox 1610 comprises a clutch ring 1611, conical surface 1613, a first gear stage 1615a, a second gear stage 1615b, a third gear stage 1615c, a fixed ring gear 1650, a friction ring 1621, a shift ring 1625 (also referred to as a "synchromesh gate"), three sets of ball detents 1687, a mount 1645 for the motor 1660, and a housing 1655. Each of the three gear stages comprise three planet gears 1617 surrounding one sun gear 1616. Between the gear stages are carriers 1640a, 1640b. In this embodiment, the shift ring 1625 is configured to engage with the second and third gear stages 1615b, 1615c and the fixed ring gear 1650 is configured to engage with the first gear stage 1615a.

As described previously, synchromesh gearboxes are advantageous as they allow gear sets to synchronize their relative velocities prior to engaging. The synchromesh design disclosed herein demonstrates two friction-based synchronisation methods, namely a friction disc and conical interference. For the purposes of demonstration, the conical interference synchronisation method is used to change from a 'high' gear ratio (16:1) to a 'low' gear ratio (64:1), and the friction disk synchronisation method is used to change from a 64:1 to 16:1.

Both methods would benefit from non-Newtonian (shear thickening) lubrication with advantages seen in the conical interference method, where, as the taper of the conical elements approach engagement the shear rate between the nip of the two elements increases exponentially. This increase in shear allows for increased force transfer through the lubricant and so synchronisation occurs with minimal wear to the conical synchronisation elements. The following will describe the operation of the two synchronisation methodologies independently with the understanding that either or a combination of both methods could be implemented in the dual speed synchromesh gearbox 1610.

The conical interference mechanism relies on the interaction between a male conical surface and a female conical surface. As the conical surface 1613b of the shift ring 1625 is brought into contact with a corresponding conical surface 1613a of the head of the output shaft 1605, the frictional force provides the torque necessary to synchronise the output shaft 1605 to the same speed as the second gear stage 1615b set prior to the teeth 1611a engaging with the output splines 1605a.

In describing the stages of operation for the conical interference synchronization, the shift ring 1625 and clutch ring 1611 may be fixed radially so that there can be no relative rotational motion. The clutch ring 1611 may be translated back and forth along the axis of the gearbox and may be actuated by an external force. When the gear described is not engaged it is assumed for the purposes of this description that the other gear is engaged.

Figure 29A:
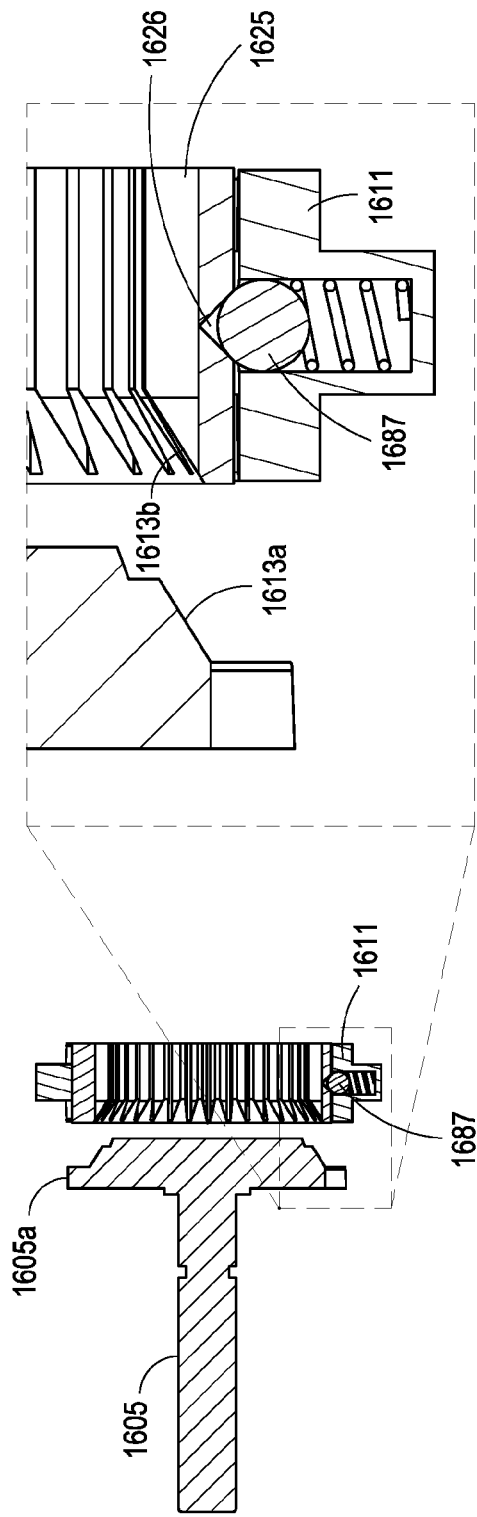
FIG. 29A illustrates a cross-sectional close up view of a mechanism for synchronizing gears.
Figures 29B, 29C, 29D:
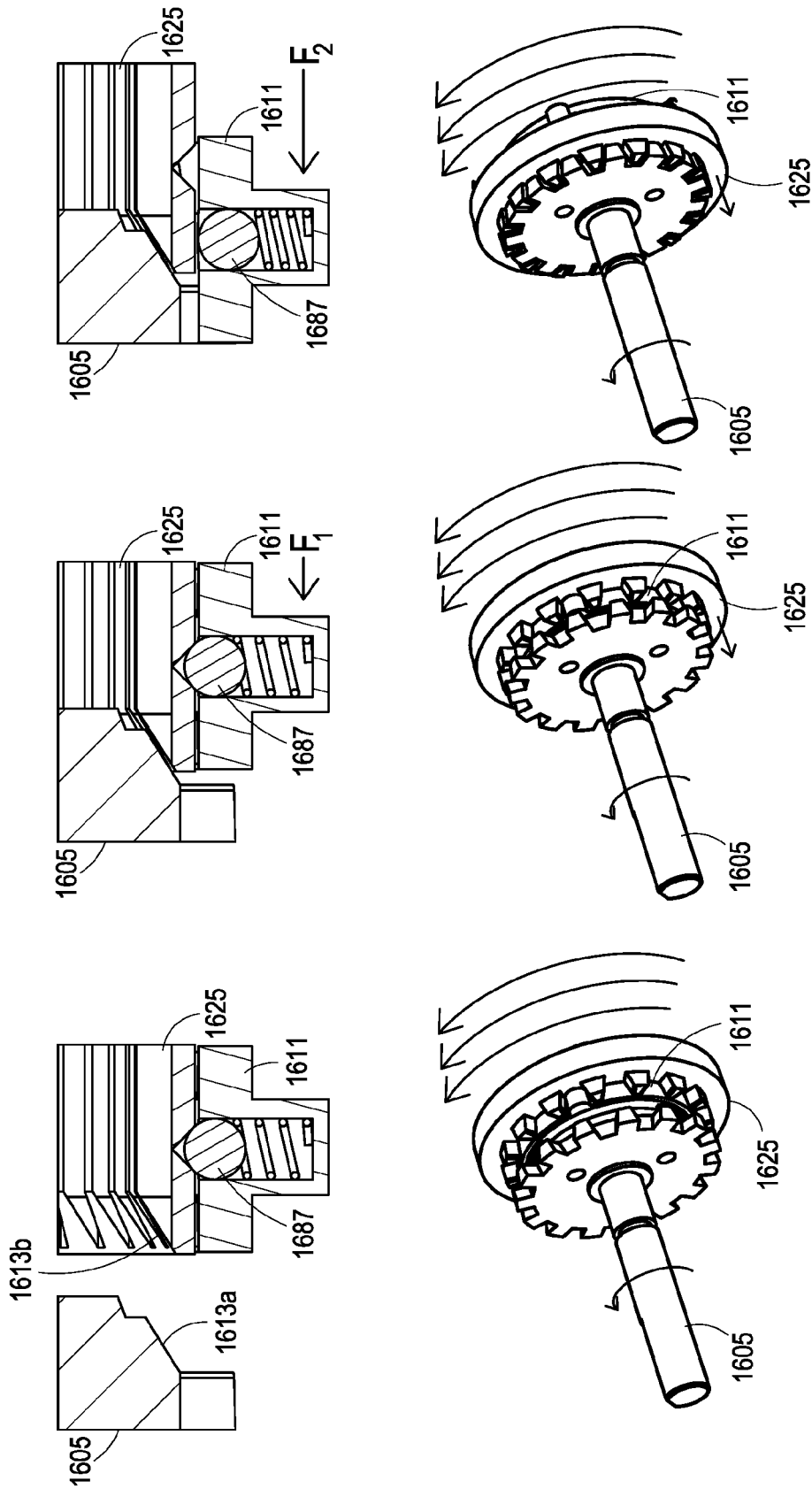
FIGS. 29B-29D illustrate sequential steps in which the actuator in FIG. 28A achieves synchronization between the shift ring and the output shaft.

FIG. 29A depicts a partial cross-sectional view of the output shaft 1605, the output shaft spline 1605a, the clutch ring 1611, the detent 1687, the shift ring 1625, and the conical surfaces 1613a, 1613b. The stages of operation of the conical interference synchronization are illustrated in FIGS. 29B-D with force $F_1$, $F_2$ and movement indicated by the arrows. The conical interference synchronization, as shown in FIGS. 29B-D, begins with the output shaft 1605 freely rotating independently of the clutch ring 1611 and the shift ring 1625, as shown in FIG. 29B. Additionally, all three gear stages 1615a, 1615b, 1615c (not shown) are engaged.

At the second stage of conical interference synchronization depicted in FIG. 29C, a force $F_1$ is applied to the clutch ring 1611, which translates the clutch ring 1611 along the gearbox central axis. The force $F_1$ may be applied by an actuator or other mechanism as described herein, such as a linear motor or shape memory alloy. One or more ball detents 1687 carries the shift ring 1625 along the same axis as the clutch ring 1611. The axial movement of the clutch ring 1611 and shift ring 1625 disengages the third gear stage 1615c. The female cone 1613b of the shift ring 1625 comes into frictional contact with the male cone 1613a of the output shaft 1605. The force $F_1$ transfers from the clutch ring 1611, through the ball detent 1687, and pushes the shift ring 1625 into the output shaft 1605 with sufficient force that the friction between the two cones inhibits relative motion, thus synchronizing the output shaft 1605 with the shift ring 1625 and clutch ring 1611.

At the third stage of the conical interference synchronization depicted in FIG. 29D, a further force $F_2$ is applied to the clutch ring 1611, thereby overcoming the counter force from the ball detent 1687. The force $F_2$ may be applied by an actuator or other mechanism as described herein. The release of the ball detent 1687 results in the further axial translation of the clutch ring 1611 independently of the shift ring 1625. Due to the increased axial displacement, the splines 1611a of the clutch ring 1611 engage with the splines 1605a of the output shaft 1605, rotationally locking the two components together. The shift ring 1625, the clutch ring 1611 and the output shaft 1605 now rotate as one, resulting in a 'high gear' where only the first and second gear stages 1615a, 1615b are engaged. If, however, the force applied to the clutch ring 1611 decreases then the process would occur in reverse of what has been described. Generally, the clutch ring 1611 moves proximally and the ball detent 1687 engages with the shift ring 1625. The clutch ring 1611 with the shift ring 1625 continues to move distally such that the conical surfaces 1613a, 1613b move apart, which allows the output shaft 1650 to rotate independently of the clutch ring 1611 and shift ring 1625.

Figure 30A:
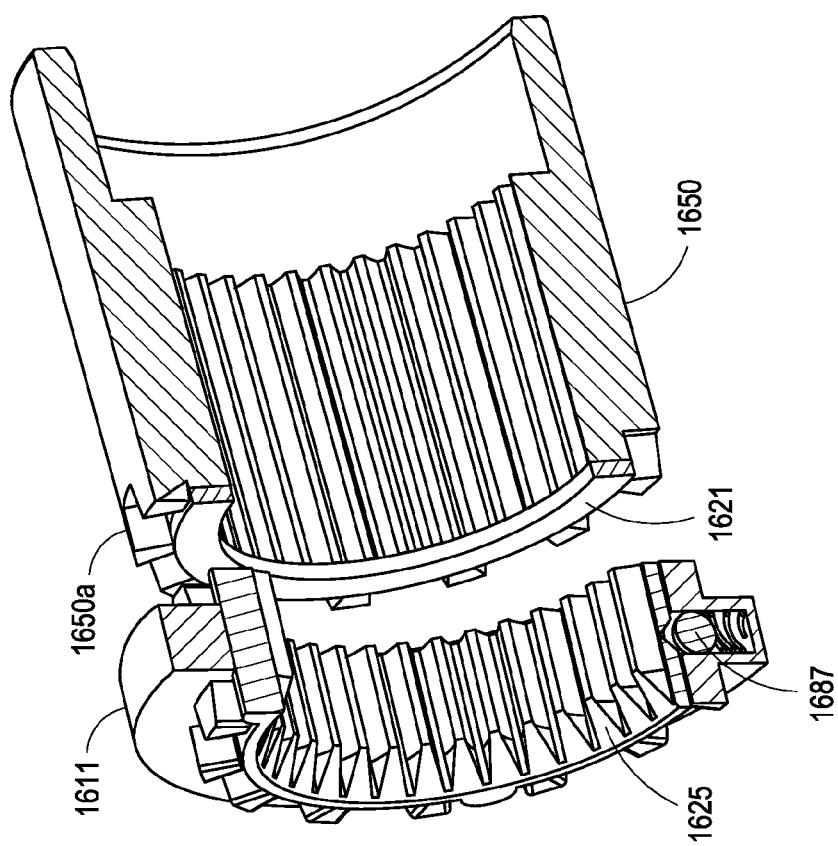
FIG. 30A depicts a cross-sectional view of part of the actuator of FIG. 28A showing friction synchronization components.

FIG. 30A depicts a partial cross-sectional view of the clutch ring 1611, the detent 1687, the shift 1625, the friction ring 1621, the ring gear splines 1650a, and the fixed ring gear 1650. The stages of operation of the friction disc synchronization are illustrated in FIGS. 30B-D with force $F_3$, $F_4$ and movement indicated by the arrows. The friction disc mechanism relies on the frictional contact of the shift ring 1625 and a friction ring 1621 mounted on the fixed ring gear 1650. As the shift ring 1625 is brought into contact with the friction ring 1621 a frictional force provides the torque necessary to synchronize the shift ring 1625 and fixed ring gear's 1650 relative velocity, before engaging the ring gear splines 1650a.

In describing the stages of operation for the friction disc synchronization, the shift ring 1625 and clutch ring 1611 may be fixed radially so that there can be no relative rotational motion. The clutch ring 1611 may be translated back and forth along the axis of the gearbox and may be actuated by an external force. When the gear described is not engaged it is assumed for the purposes of this description that the other gear is engaged.

The friction disc synchronization, as shown in FIGS. 30B-D, begins with the shift ring 1625 and clutch ring 1611 being locked to the output shaft 1605, as shown in FIG. 30B. In this position, the shift ring 1625 and the clutch ring 1611 are free to rotate together independently of the fixed ring gear 1650. The first and second gear stages 715a, 715b are engaged.

At the second stage of the friction disc synchronization, as shown in FIG. 30C, a force $F_3$ is applied to the clutch ring 1611 that translates the clutch ring 1611 along the gearbox central axis. The set of ball detents 1687 carries the shift ring 1625 along the same axis as the clutch ring 1611. The leading edge of the shift ring 1625 comes into frictional contact with the friction ring 1621 mounted on the fixed ring gear 1650. The force $F_3$ transferred from the clutch ring 1611, through the ball detent 1687, pushes the shift ring 1625 into the friction ring 1621 with sufficient force that the friction between the two surfaces inhibits relative motion, thus synchronizing the rotational velocity of the shift ring 1625 and clutch ring 1611 with the fixed ring gear 1650.

At the third stage of the friction disc synchronization, as shown in FIG. 30D, a further force $F_4$, which may be larger than the force $F_3$, is applied to the clutch ring 1611, thereby overcoming the ball detent 1687. The release of the ball detent 1687 results in the further axial translation of the clutch ring 1611 independently of the shift ring 1625. Due to the increased axial displacement, the splines 1611a of the clutch ring 1611 engage with the splines 1650a of the fixed ring gear 1650 (shown in FIG. 30A), rotationally locking the two components together. The shift ring 1625 and the clutch ring 1611 are locked to the fixed ring gear 1650, resulting in a 'low gear' where all three gear stages 1615a, 1615b, 1615c are engaged.

FIGS. 31A-C depict three different detent configurations 1705, 1715, 1725 and resulting corresponding force versus displacement plots 1700, 1710, 1720. The detent configuration affects the amount of force and the transfer of force to the frictional elements prior to spline engagement. The various designs depict embodiments of a 'V' groove, which may be 90°, or more or less than 90°, with a ball detent 1687. The different embodiments result in different force profiles. The detent 1687 may be other suitable features, such as a pin. The detent 1687 sits in an embodiment of the indentation in each configuration 1705, 1715, 1725.

The force profile is important for controlling the dynamics of the gear change. A constant force is useful to maintain friction during engagement and disengagement but results in a gearbox which requires constant force to 'hold' it in gear. Conversely, a momentary profile allows a gearbox to stay in gear without constant force on the gear shift, but if not applied correctly the friction force in the synchronization elements can drop, allowing desynchronization, before the clutch ring splines have been engaged. The embodiments described herein include the action of increasing force transfer to a threshold at which the force drops to zero.

As shown in FIG. 31A, for the configuration 1705, the detent 1687 sits in an indentation 1626A. The indentation 1626A may be a groove or recess. The indentation 1626A may be angled like a deep "V" relative to a cross-sectional width of the detent 1687. The resulting corresponding force plot 1700 for the detent configuration 1705 includes a relatively steeper force-displacement slope, where a larger force is needed to overcome the resistance of the indentation 1626A acting on the detent 1687 and over a shorter displacement distance, as compared to a relatively shallower 'V' or indentation such as that of FIG. 31B.

FIGS. 31B-C depict two alternative detent profiles 1715, 1720. As shown in FIG. 31B, the detent 1687 sits in an indentation 1626B. The indentation 1626B may be a groove or recess. The indentation 1626B may be angled like a shallow "V" relative to a cross-sectional width of the detent 1687. As shown in FIG. 31B, the corresponding force plot 1710 for the detent configuration 1715 includes a relatively less steep force-displacement slope, where a more gradual force over a relatively longer displacement is applied to overcome the resistance of the indentation 1626A acting on the detent 1687, as compared to a deeper 'V' or indentation such as that of FIG. 31A.

As shown in FIG. 31C, the detent 1687 sits in an indentation 1626C. The indentation 1626C may be a dual stage, such as dual depths for a groove or recess. The indentation 1626C may have a shallow crater with a narrower 'V' therein, relative to a cross-sectional width of the detent 1687. As shown in FIG. 31C, the corresponding force plot 1720 for the detent configuration 1725 has two stages. At the first stage (on the left of the force plot 1720), the force rises rapidly to overcome resistance of the "V" acting on the detent 1687, and then at a later displacement the force rises again to overcome resistance of the edge of the crater acting on the detent 1687.

FIGS. 32A-32B are various views of another embodiment of a prosthetic digit 1800. The digit 1800 may be used with the system 100 or hand 200. The digit 1800 includes a mount 1810, a proximal segment 1820, a middle segment 1830, and a distal segment 1840. The mount 1810 and segments 1820, 1830, 1840 may have the same or similar features and/or functions as respectively the mounts 350, 410, 510, 610, and segments 320, 330, 340, 420, 430, 440, and thus may articulate, for example rotate, relative to each other, etc.

The digit 1800 includes mechanically-connected rigid links, including a proximal link 1860 and a distal link 1870. The links 1860, 1870 may have the same or similar features and/or functions as the links 360, 370. For example, the mount 1810 may be rotatably attached to the proximal end of the proximal link 1860 about a connection 1858. The proximal link 1860 is rotatably attached to the middle segment 1830 of the digit 1800 about a pivot 1866. The proximal link 1860 may include a dogleg, where the proximal end of the proximal link 1860 extends along a first axis and the distal end of the proximal link extends along a second axis that is at an angle relative to the first axis. The pivot 1866 may be located at or near the vertex of the dogleg of the proximal link 1860. The distal end of the proximal link 1860 is rotatably attached to the proximal end of the distal link 1870 about a connection 1868. The distal end of the distal link 1870 is rotatably attached to the distal segment 1840 of the digit 1800 about a pivot 1876.

The digit 1800 includes an actuator 1804, which may have the same or similar features and/or functions as the actuators 301, 404, 501, 601, 700, 701, 800, 1600, except as otherwise described. For example, the actuator 1804 may include a motor 1815 supplied with power from a battery, which may be in the hand or other location. The motor 1815 may have an output shaft that extends, for example distally, therefrom, and that mechanically communicates with an off-axis shaft 1809.

The actuator 1804 includes a worm wheel 1812 and a worm gear 1814, which may have the same or similar features and/or functions as respectively the worm wheel and worm gear 412, 414, except as otherwise described. For example, the worm gear 1814 having external threads 1819 thereon may be in mechanical communication with the shaft 1809. Actuation of the motor 1815 causes motion to be transmitted via a pinion gear 1813 (see FIGS. 33B and 33C) to the shaft 1809 to rotate the worm gear 1814. The worm wheel 1812 may have external teeth 1816 thereon. In some embodiments, only a portion of the outer circumference of the worm wheel 1812 includes external teeth 1816 (e.g., the portion of the outer circumference of the worm wheel 1812 positioned adjacent to the worm gear 1814). The remainder of the outer circumference of the worm wheel 1812 may be smooth or otherwise not have teeth. This configuration can advantageously allow for a compact worm wheel 1812 and worm gear 1814 system. The threads 1819 (see FIGS. 33B and 33C) of the worm gear 1814 contact the teeth 1816 of the worm wheel 1812 to cause rotational motion of the worm wheel 1812. The worm wheel 1812 may be rotated a first rotational direction to cause a first rotation of the digit 1800 in a first direction (e.g. to close the digit 1800). The worm wheel 1812 may be rotated in a second rotational direction that is opposite the first rotational direction to allow for a second rotation of the digit 1800 in a second direction that is opposite the first direction (e.g. to open the digit).

Figure 33A:
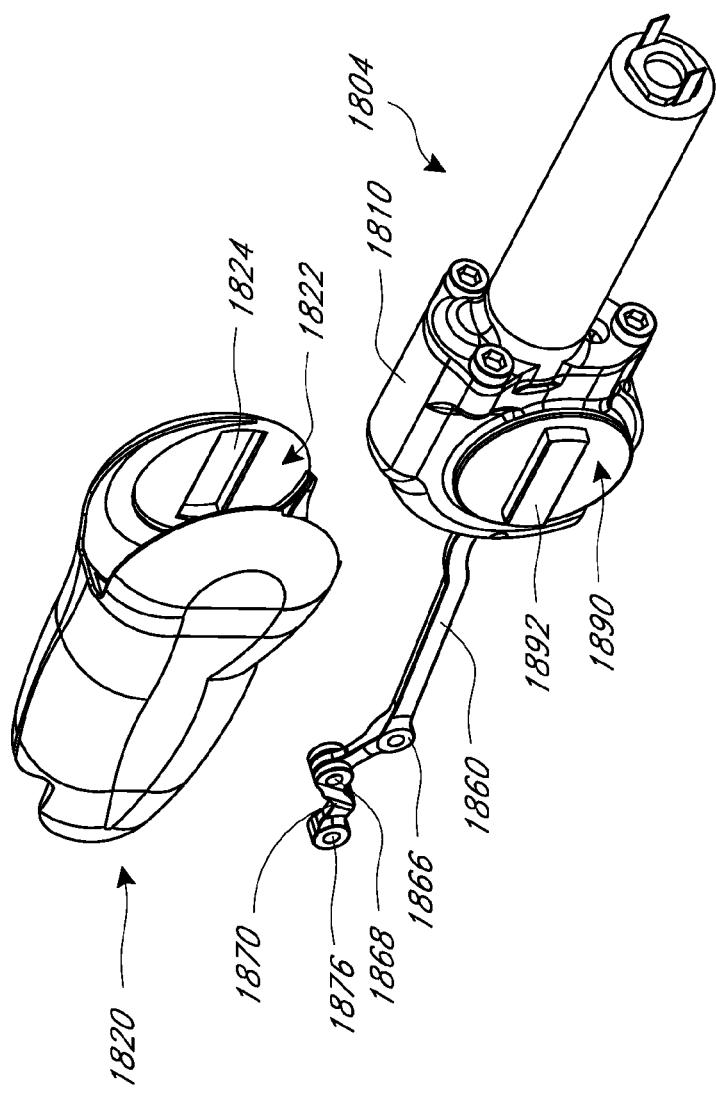
FIGS. 33A-33C are various views of the actuator of the prosthetic digit of FIGS. 32A-32B.
Figure 33C:
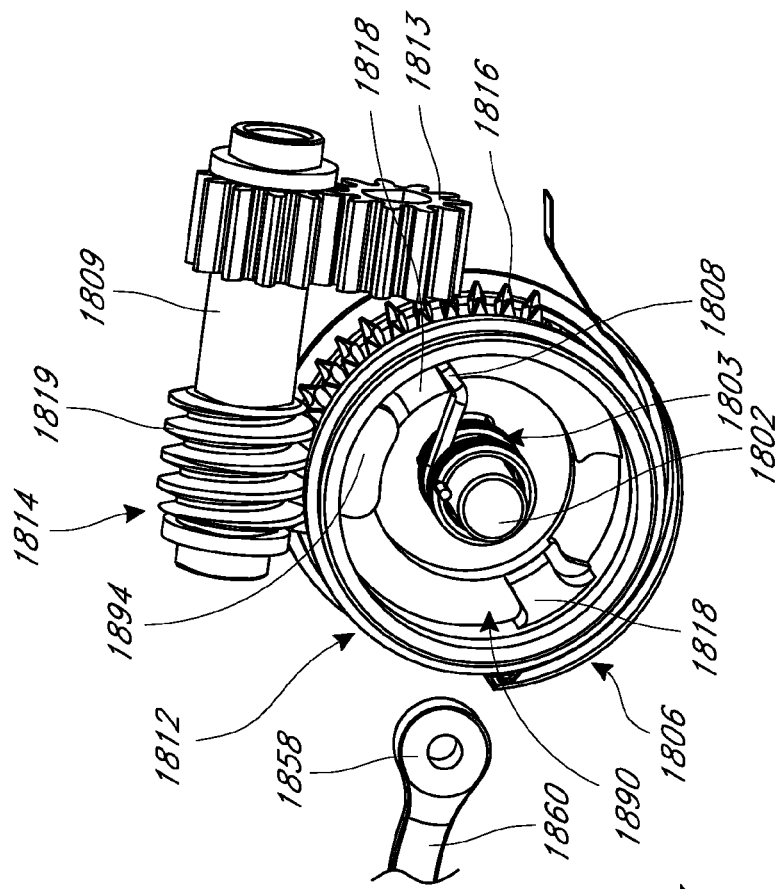
Figure 33B:
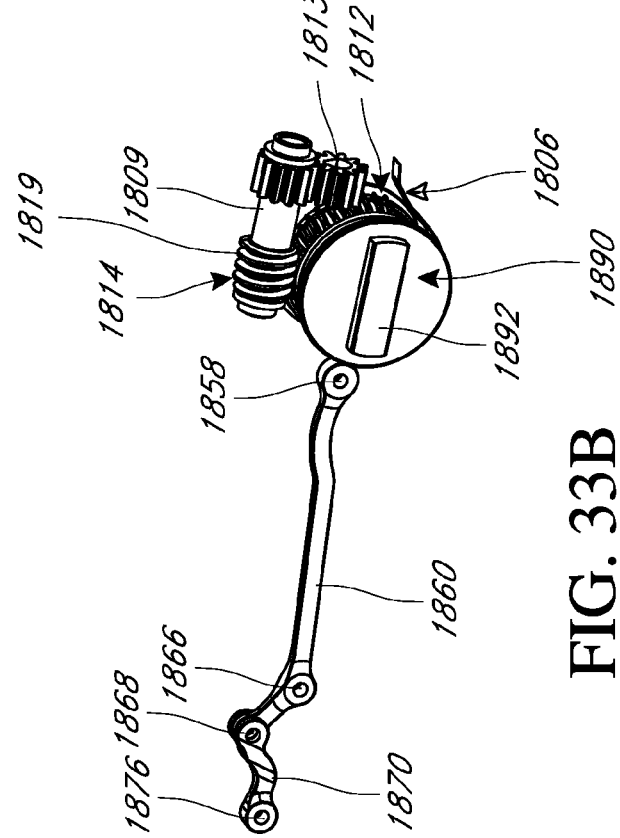

FIGS. 33A-33C are various views of the actuator 1804 of the digit 1800. FIG. 33A is a partial exploded view of the actuator 1804, and FIGS. 33B and 33C show the actuator 1804 with various features removed or hidden for clarity. The actuator 1804 of the digit 1800 may comprise a central axle 1890 having a drive key 1892 configured to engage a portion of the proximal segment 1820 of the digit 1800. For example, in some embodiments, the drive key 1892 is positioned on an outer surface of the central axle 1890 and has an extended length and width protruding outwardly from the outer surface of the central axle 1890. An inner surface 1822 of the proximal segment 1820 of the digit 1800 may comprise a mating feature 1824, such as a recess, opening, and/or groove, with a shape that corresponds with the shape of the drive key 1892 of the central axle 1890. The mating feature 1824 of the proximal segment 1820 may receive the drive key 1892 of the central axle 1890 therein to transmit a rotational force from the central axle 1890 to the proximal segment 1820. In some embodiments, the ratio of the rotational angle of the drive key 1892 to the rotational angle of the proximal segment 1820 is 1:1.

In some embodiments, the central axle 1890 includes a first drive key 1892 protruding outwardly in a first direction from a first outer surface of the central axle 1890 and a second drive key 1892 protruding outwardly from a second outer surface of the central axle 1890 in a second direction that is opposite the first direction. The proximal segment 1820 may include a first inner surface 1822 with a first mating feature 1824 for receiving the first drive key 1892 and a second inner surface 1822 with a second mating feature 1824 for receiving the second drive key 1892.

In some embodiments, the central axle 1890 may include one or more drive tabs 1894. The drive tabs 1894 may each have an extended, arcuate length and width protruding axially from an inner surface of the central axle 1890. In some embodiments, the central axle 1890 includes a first drive tab 1894 and a second drive tab 1894 positioned radially opposite the first drive tab 1894.

In some embodiments, the worm wheel 1812 may include one or more corresponding drive tabs 1818. For example, the worm wheel 1812 may include a first drive tab 1818 and a second drive tab 1818 positioned radially opposite the first drive tab 1818. The drive tabs 1818 of the worm wheel 1812 may extend radially inward from an inner surface of the worm wheel 1812 toward a central axis of the worm wheel 1812. The drive tabs 1818 of the worm wheel 1812 may be positioned between the first and second drive tabs 1894 of the central axle 1890. In some embodiments, one or more of the drive tabs 1894 of the central axle 1890 engages one or more of the drive tabs 1818 of the worm wheel 1812 (e.g., contacts, abuts, connects to, etc.) to transmit a rotational force of the worm wheel 1812 to the central axle 1890.

The drive mechanism of the digit 1800 may include a spring 1803 (e.g., a torsion spring). The spring 1803 may be coupled to (e.g., circumferentially surround) an axially extending member 1802 that extends axially along the central axis of the worm wheel 1812 and/or central axle 1890. The spring 1803 may be configured to rotationally bias the worm wheel 1812 in an angular direction to maintain the relative positions of the central axle 1890 and the worm wheel 1812. For example, the spring 1803 may include a flange 1808 that extends further radially outward than the rest of the spring 1803. The flange 1808 may engage one of the drive tabs 1818 of the worm wheel 1812. For example, in some embodiments, the worm wheel 1812 and the central axle 1890 are positioned such that one of the drive tabs 1894 of the central axle 1890 abuts a first surface of one of the drive tabs 1818 of the worm wheel 1812 and the flange 1808 abuts a second surface of the drive tab 1818 opposite the first surface of the drive tab 1818. This configuration enables the rotational force of the worm wheel 1812 to be transmitted to the central axle 1890 while maintaining the relative positions of the worm wheel 1812 and the central axle 1890. This configuration also allows the digit 1800 to be closed independent of the drive mechanism of the digit 1800, as further described below.

In some embodiments, the digit 1800 may be opened and/or closed with or without utilizing the actuator 1804. For example, the digit 1800 can have a worm wheel driven movement mode (e.g., driven by the actuator 1804) and a manual movement mode (e.g., driven by an external force). When the digit 1800 is in an open position, application of an external force on the digit 1800 in a closing direction may cause the digit 1800 to fold to a closed position. In some embodiments, in the manual movement mode, unlike in the worm wheel driven movement mode, the actuator 1804 does not drive the worm wheel 1812. For example, in the manual movement mode, the actuator 1804 and the worm wheel 1812 remain stationary. In the manual movement mode, the central axle 1890 rotates in response to the application of an external force to the digit 1800 while the worm wheel 1812 remains stationary because the spring flange 1808 allows for rotational movement when its spring biasing force is overcome. The rotation of the central axle 1890 may cause the segments 1820, 1830, 1840 of the digit 1800 to rotate to a closed position. In the manual movement mode, the projections 1818 of the worm wheel 1812 may limit the range of rotation of one or more of the drive tabs 1894 of the central axle 1890 and therefore the range of rotation of the central axle 1890. The spring 1803 may rotate and store energy due to the manual movement of the digit 1800 to the closed position due to the application of an external force to the digit 1800. In some embodiments, when the external force is removed from the digit 1800, the spring 1803 may use the stored potential energy to rotate and cause the digit 1800 to return to the open position.

The manual movement mode of the digit 1800 can advantageously serve as a mechanical protection system when external forces act on the digit 1800, such as when a user falls on the digit 1800 or applies pressure to the digit 1800 to get up from a chair, etc. The manual closure of the digit 1800 may allow the external load to be supported by components of the digit 1800 other than the drive mechanism (e.g., gearbox). This can prevent damage that may otherwise have been caused to the drive mechanism of the digit 1800.

Figure 34:
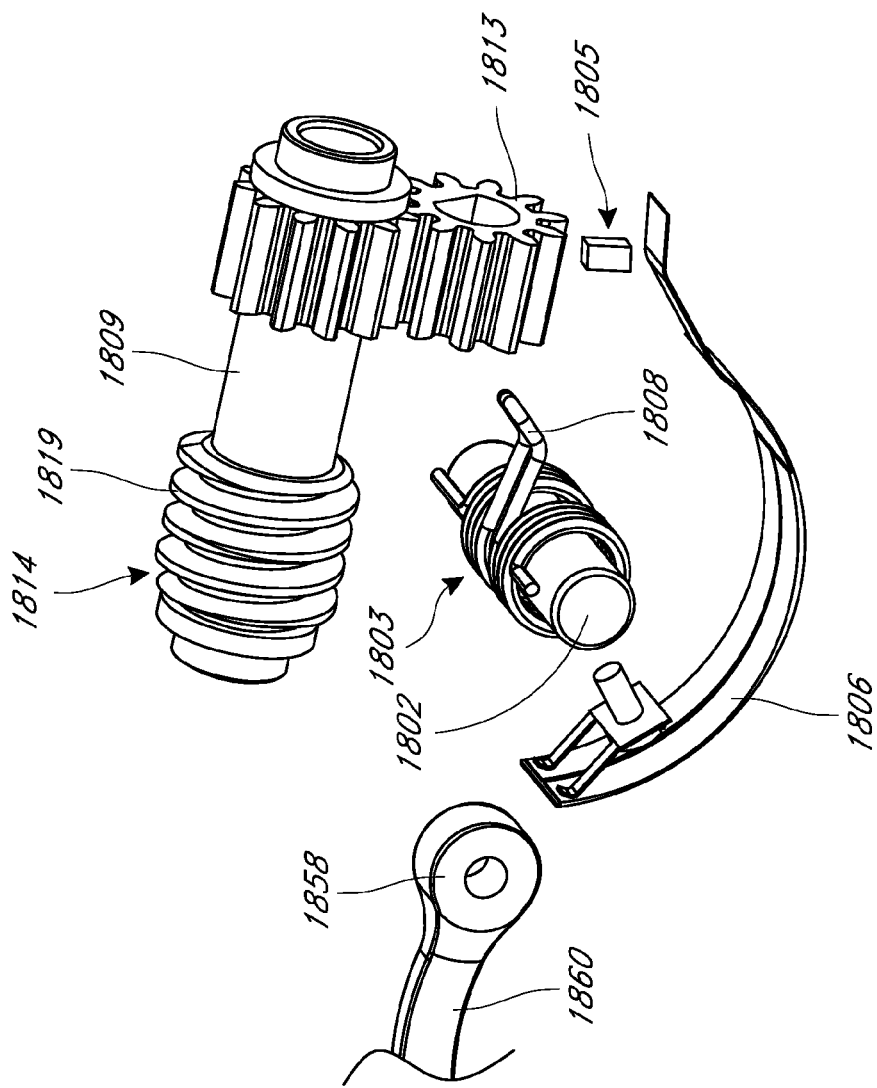
FIG. 34 is a perspective view of the actuator of FIGS. 33A-33C with some components removed for clarity.

FIG. 34 illustrates the positions of encoders 1805, 1806 within the digit 1800. In some embodiments, the digit 1800 includes a plurality of encoders 1805, 1806 mounted to the gearbox. For example, in some embodiments, the digit 1800 includes a first type of encoder for the worm wheel driven movement mode and a second type of encoder for the manual movement mode. As shown, the digit 1800 may include a potentiometer strip encoder 1806 and a magnetometer encoder 1805. The potentiometer strip encoder 1806 may be coupled to the worm wheel 1812. The magnetometer encoder 1805 may be positioned between the potentiometer strip encoder 1806 and the pinion gear 1813. The potentiometer strip encoder 1806 may measure the position of the digit 1800 by measuring the absolute position of the motor drive. The magnetometer encoder 1805 may be an absolute magnetic hall effect encoder. The magnetometer encoder 1805 may measure the position of the digit 1800 by measuring the degree of rotation of a diametrically magnetized axial magnet disposed within the axially extending member 1802 at the center of the central axle 1890.

Figure 35:
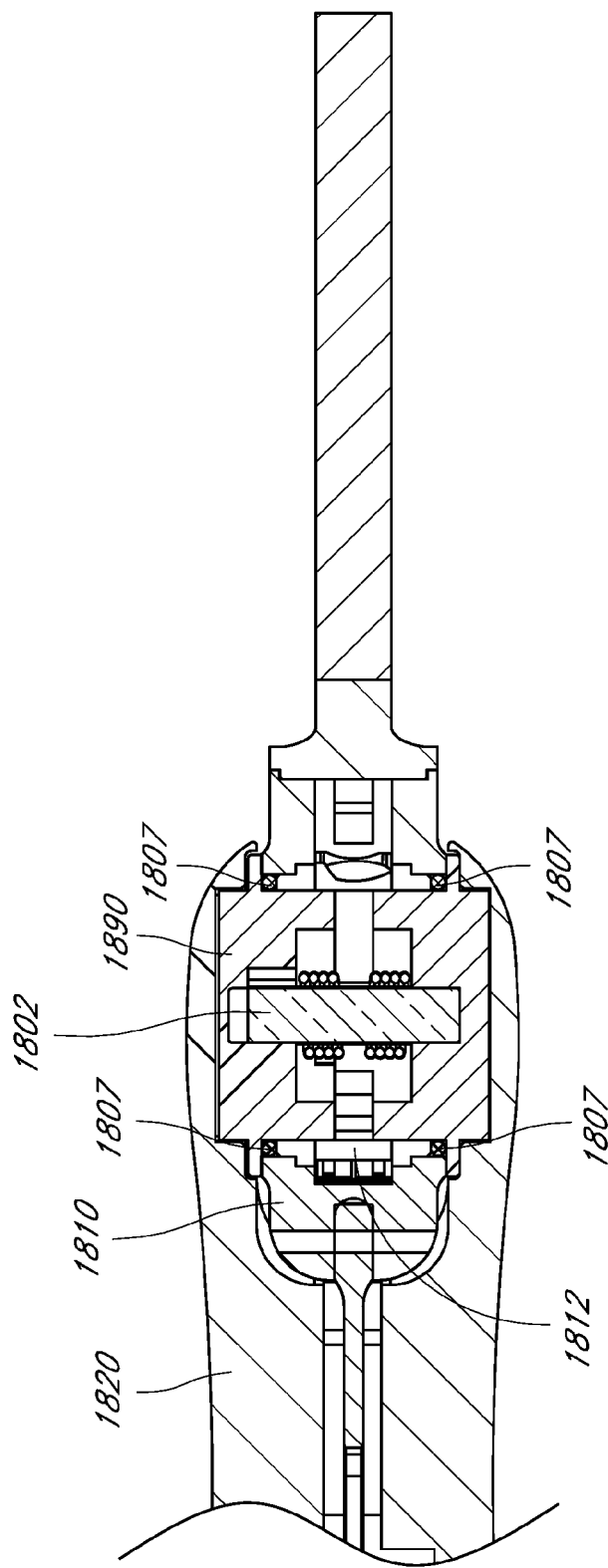
FIG. 35 is a cross-sectional view of a portion of the prosthetic digit of FIGS. 32A-32B.

FIG. 35 is a cross-sectional view of a portion of the digit 1800 illustrating waterproof seals 1807 within the digit 1800. In some embodiments, the digit 1800 may be waterproof (e.g., rated IP68). The digit 1800 may include seals 1807, such as O-ring seals, lip seals, and/or other dynamic seals, to seal the components within the central axle 1890 from water ingress. For example, the seals 1807 may be positioned in gaps between the central axle 1890 and the mount 1810.

In some embodiments, the digit 1800 may include any of the various embodiments of the digits and actuators described herein, or features thereof. The digit 1800 may include the actuator 301, 404, 501, 601, 700, 701, 800, or 1600, or features thereof. For example, the digit 1800 may be modified to include the motor 305, 405, 505, 605, 760, or 1660 in place of the motor 1815. Other suitable substitutions or modifications to the digit 1800 using any of the prosthetic features described herein may be implemented in a variety of embodiments.

Figure 36A:
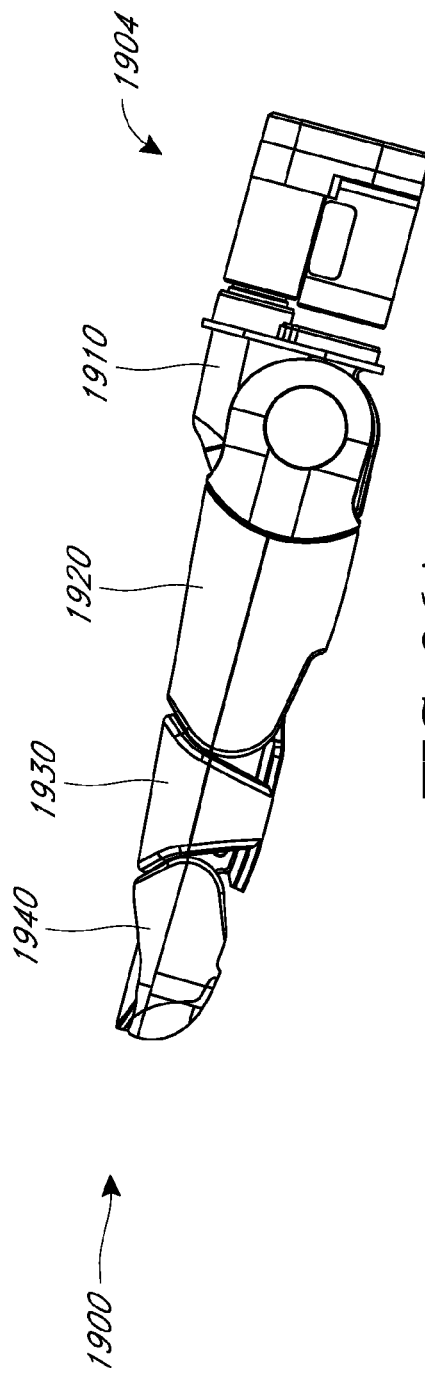
FIGS. 36A-36B are side and cross-section views respectively of another embodiment of a prosthetic digit, having articulating proximal, middle, and distal segments.
Figure 36B:
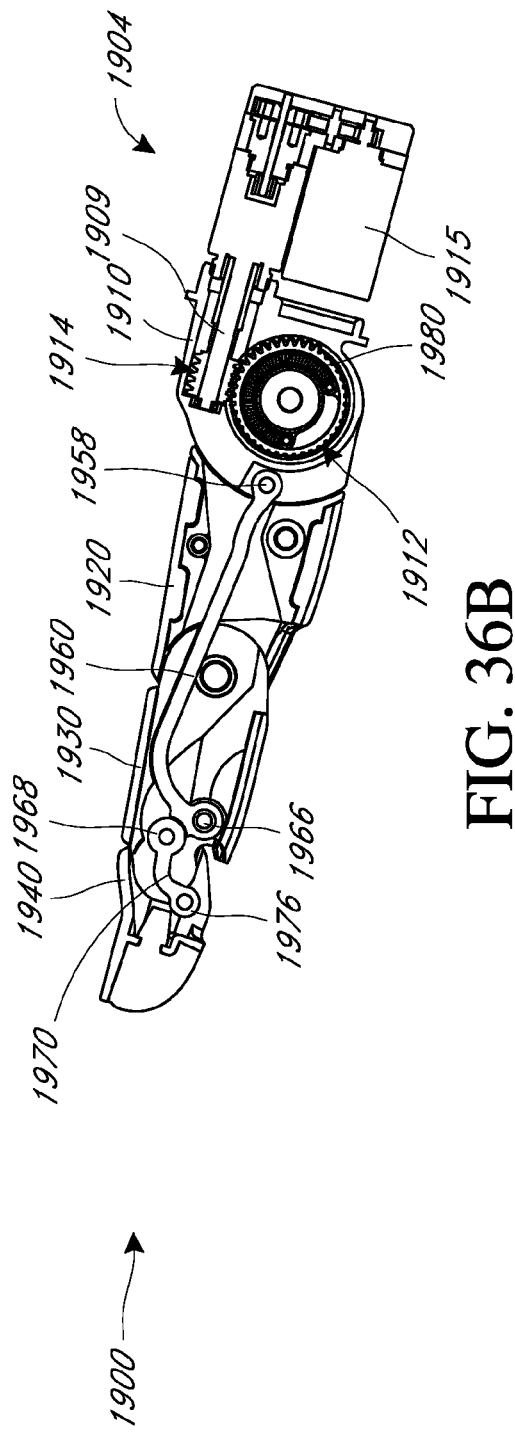

FIGS. 36A-36B are various views of another embodiment of a prosthetic digit 1900. The digit 1900 may be used with the system 100 or hand 200. The digit 1900 includes a mount 1910, a proximal segment 1920, a middle segment 1930, and a distal segment 1940. The mount 1910 and segments 1920, 1930, 1940 may have the same or similar features and/or functions as respectively the mounts 350, 410, 510, 610, 1810 and segments 320, 330, 340, 420, 430, 440, 1820, 1830, 1840 and thus may articulate, for example rotate, relative to each other, etc.

The digit 1900 includes mechanically-connected links, including a proximal link 1960 and a distal link 1970. In some embodiments, the links 1960, 1970 may be a single, continuous link. The links 1960, 1970 may have the same or similar features and/or functions as the links 360, 370, 1860,

1870. For example, the mount 1910 may be rotatably attached to the proximal end of the proximal link 1960 about a connection 1958, such as a pin. The connection 1958 may comprise a rotational joint such that the link 1960 can rotate relative to the mount 1910 about the connection 1958.

The proximal link 1960 is rotatably attached to the middle segment 1930 of the digit 1900 about a pivot 1966. The proximal link 1960 may include a dogleg, where the proximal end of the proximal link 1960 extends along a first axis and the distal end of the proximal link extends along a second axis that is at an angle relative to the first axis. The pivot 1966 may be located at or near the vertex of the dogleg of the proximal link 1960. The distal end of the proximal link 1960 is attached to the proximal end of the distal link 1970 about a connection 1968. The connection 1968 may comprise a bearing and a pin, where the pin is configured to act as a constrained pin (e.g., where the pin is welded in place). The distal end of the distal link 1970 is rotatably attached to the distal segment 1940 of the digit 1900 about a pivot 1976. The distal link 1970 may flex under rotational loads applied to the digit 1900 beyond a threshold load. The bend in the link may have elasticity to absorb such loads, as further described.

The digit 1900 includes an actuator 1904, which may have the same or similar features and/or functions as the actuators 301, 404, 501, 601, 700, 701, 800, 1600, 1804 except as otherwise described. For example, the actuator 1904 may include a motor 1915 supplied with power from a battery, which may be in the hand or other location.

The actuator 1904 includes a worm wheel 1912 and a worm gear 1914, which may have the same or similar features and/or functions as respectively the worm wheel 412, 1812 and worm gear 414, 1814 except as otherwise described. For example, the worm gear 1914 having external threads 1919 thereon may be in mechanical communication with the shaft 1909. Actuation of the motor 1915 causes motion to be transmitted via one or more transfer gears 1992A, 1992B, 1992C (see FIG. 41B) and/or one or more other gears (e.g., in the planetary gearbox 1903) to the shaft 1909 to rotate the worm gear 1914. The worm wheel 1912 may have external teeth 1916 thereon. In some embodiments, only a portion of the outer circumference of the worm wheel 1912 includes external teeth 1916 (e.g., the portion of the outer circumference of the worm wheel 1912 positioned adjacent to the worm gear 1914). The remainder of the outer circumference of the worm wheel 1912 may be smooth or otherwise not have teeth. This configuration can advantageously allow for a compact worm wheel 1912 and worm gear 1914 system. The threads 1919 (see FIGS. 37A, 37C, 41A, 41B) of the worm gear 1914 contact the teeth 1916 of the worm wheel 1912 to cause rotational motion of the worm wheel 1912. The worm wheel 1912 may be rotated a first rotational direction to cause a first rotation of the digit 1900 in a first direction (e.g. to close the digit 1900). The worm wheel 1912 may be rotated in a second rotational direction that is opposite the first rotational direction to allow for a second rotation of the digit 1900 in a second direction that is opposite the first direction (e.g. to open the digit).

Figures 37A, 37B, 37C:
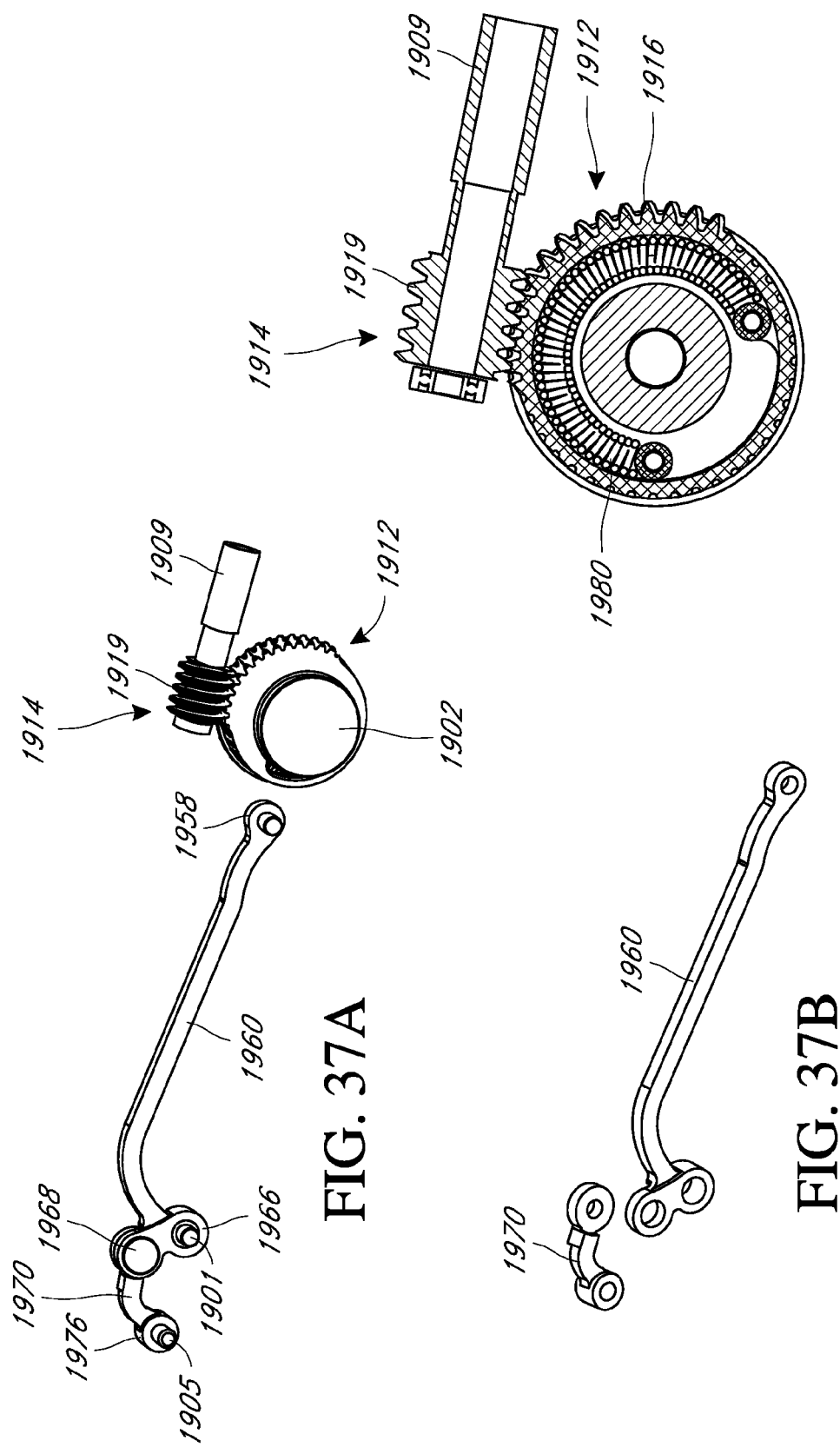
FIGS. 37A-37C are, respectively, a perspective view of the links and actuator, an exploded view of the links, and a cross-sectional view of the actuator of the digit of FIGS. 36A-36B with some components removed for clarity.
Figures 38A, 38B, 38C:
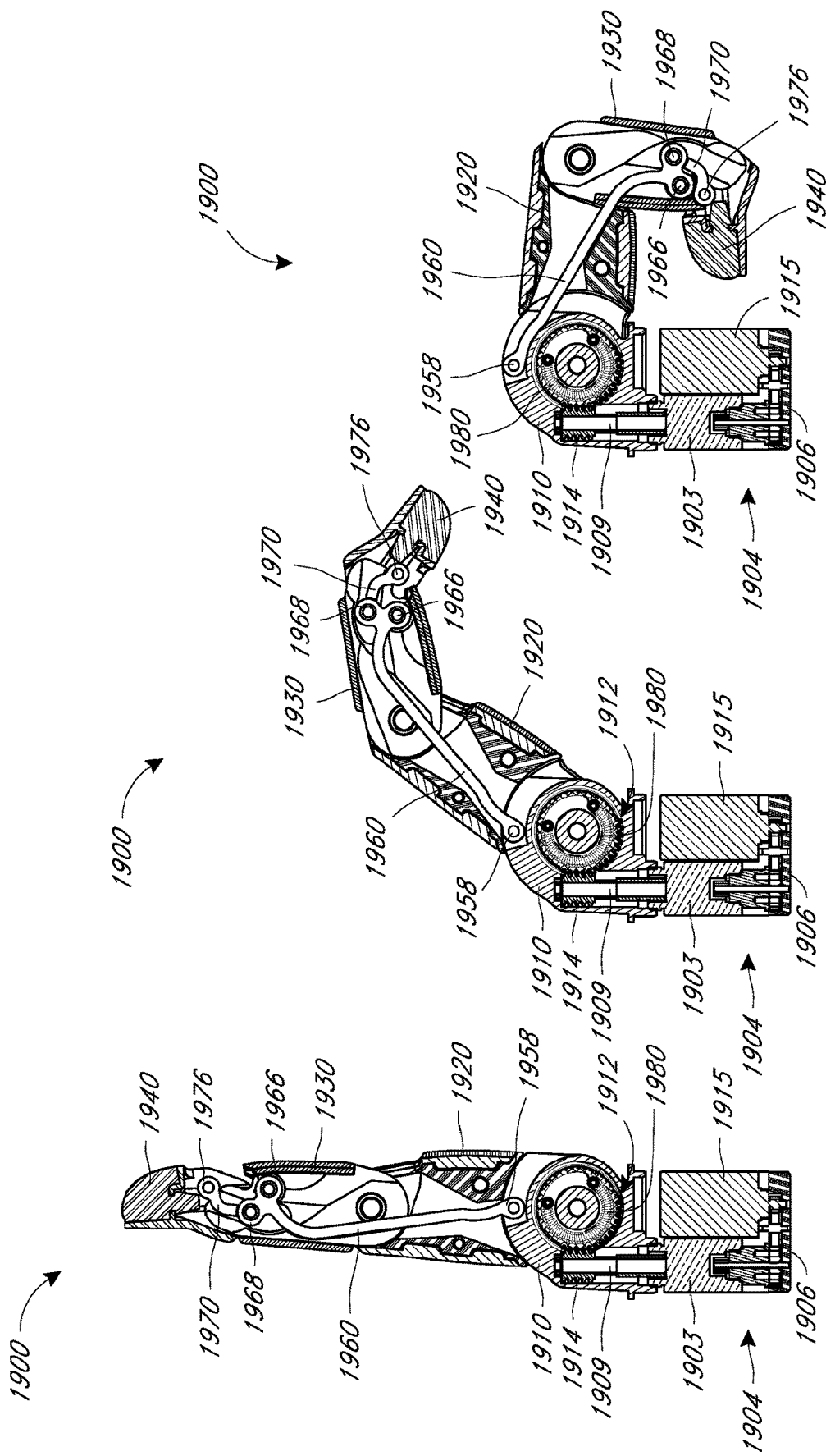
FIGS. 38A-38C are sequential views of the prosthetic digit of FIGS. 36A-36B shown in various rotated configurations where the middle and distal segments rotate as the proximal segment rotates due to interaction of the links.

FIGS. 37A-37B illustrate the shapes of the proximal link 1960 and the distal link 1970 and the relationship between the proximal link 1960 and the distal link 1970. The distal link 1970 may be curved and/or bent (see FIGS. 37A-37B). This can advantageously reduce the visibility of the distal link 1970 and/or proximal link 1960 during rotation of the prosthetic digit 1900. For example, as illustrated in FIGS. 38A-38C, the distal link 1970 and/or proximal link 1960 may be hidden within the internal volumes of the segments 1920, 1930, 1940 as the segments 1920, 1930, 1940 rotate (e.g., the links 1960, 1970 may not protrude from the digit 1900 during flexions). The distal link 1970 may include additional undulations to increase the springiness of the digit 1900.

The distal link 1970 may be flexible and/or configured to flex in response to a threshold rotational force applied to the digit 1900. The curved geometry of distal link 1970 and/or the elasticity of the material used to form the distal link 1970 (e.g., titanium) may generate an additional elasticity and/or springiness in the prosthetic digit 1900. For example, the distal link 1970 may generate additional springiness in the digit 1900 as a pin 1901 extending through the pivot 1966 moves closer to (or further from) a pin 1905 extending through the pivot 1976 during rotation of the digit 1900 (see FIGS. 37A and 38A-38C). This can advantageously facilitate the return of the digit 1900 from a rotated position and/or provide additional protection from shock loads to components of the actuator 1904 (e.g., the gearbox 1903). For example, the curved distal link 1970 can allow for manual movement of the digit 1900 as a mechanical protection system when external forces act on the digit 1900 (e.g., when a user closes the digit 1900 by hand, falls on the digit 1900, or applies pressure to the digit 1900 to get up from a chair, etc.). The manual closure of the digit 1900 may allow the external load to be supported by components of the digit 1900 other than the gearbox 1903. This can prevent damage that may otherwise have been caused to the actuator 1904 of the digit 1900.

FIG. 37C illustrates the actuator 1904 of the digit 1900, with some components removed for clarity. The actuator 1904 may include a spring 1980 (e.g., an extension spring). The spring 1980 may provide similar functions as the spring 1803, described for example with respect to FIG. 33C, but with an elongated spring instead of a torsional spring. The spring 1980 may be coupled to an inner surface of the worm wheel 1912. The spring 1980 may extend circumferentially around a central axis of the worm wheel 1912 (e.g., along at least a portion of an inner surface of the worm wheel 1912). The spring 1980 may be configured to rotationally bias the worm wheel 1912 in an angular direction. The spring 1980 may bias the worm wheel 1912 in an opening rotational direction. The spring 1980 may bias the worm wheel 1912 in a closing rotational direction. The spring 1980 may only move when an external force is applied to the digit 1900 in the closing rotational direction. This configuration may allow the digit 1900 to be closed independent of the drive mechanism of the digit 1900 (e.g., to be closed manually), thereby allowing the digit 1900 to utilize the mechanical protection system described above. Use of an extension spring 1980 in the digit 1900 can advantageously reduce the likelihood of failure fatigue of the spring 1980 due to rotation of the digit 1900 and/or increase the number of flexions of the digit 1900 prior to failure fatigue, thereby increasing the lifetime of the mechanical protection system of the digit 1900.

Figure 39A:
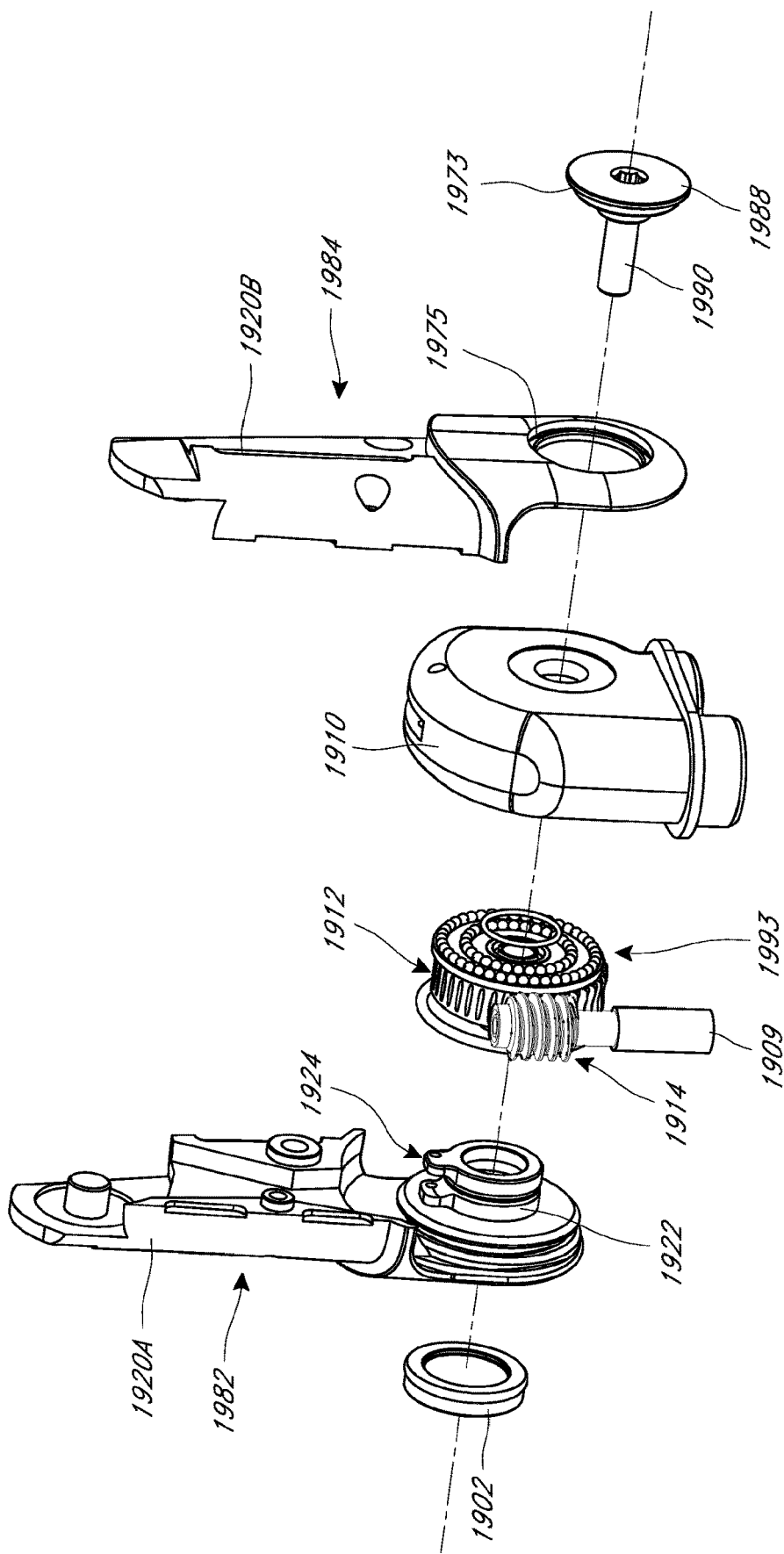

FIGS. 39A-39B illustrate the relationship between the actuator 1904, proximal segment 1920, and mount 1910. Portions of the actuator 1904, such as the worm wheel 1912, may be configured to couple to the proximal segment 1920 and/or the mount 1910. The proximal segment 1920 may include a first side 1920A (e.g., on a drive side 1982 of the digit 1900) and a second side 1920B (e.g., on a support side 1984 of the digit 1900). As shown in FIG. 39A, the worm wheel 1912 may be configured to be disposed between the first side 1920A of the proximal segment 1920 and the mount 1910. A cover 1902 may be coupled to the first side 1920A of the proximal segment 1920 (e.g., to an outer portion of the first side 1920A). The cover 1902 may be configured to protect components disposed within the digit 1900. A bearing pin 1988 having an axle 1990 may be configured to extend inward from the second side 1920B of the proximal segment 1920 through the mount 1910 and at least a portion of the actuator 1904 (e.g., through at least a portion of the worm wheel 1912). The bearing pin 1988 may aid in securing components of the digit 1900 and/or seal an opening in the support side 1984 of the digit 1900 (e.g., an opening in the second side 1920B of the proximal segment 1920). The axle 1990 may have a first portion having a first diameter and a second portion have a second diameter that is larger than the first diameter. This can advantageously reduce the likelihood that the second side 1920B of the proximal segment 1920 will separate from the bearing pin 1988 when a load is applied to the digit 1900. The outer surface of the bearing pin 1988 may be made of titanium and the axle 1990 may be made of steel.

As shown in FIG. 39A, the actuator 1904 can include a thrust bearing 1993 configured to face an inner surface of the mount 1910. The thrust bearing 1993 can include a plurality of ball bearings. The thrust bearing 1993 may be configured to provide rotational motion while taking predominantly an axial force. The thrust bearing 1993 may be a thrust ball bearing having bearing balls supported in a ring. The bearing may be a ball, cylindrical roller, tapered roller, spherical roller, fluid, magnetic, or other type of thrust bearing.

FIG. 39B illustrates the mating portions of the proximal segment 1920, actuator 1904, and mount 1910. The actuator 1904 may be configured to couple to the mount 1910 via a mating feature 1911 of the mount 1910. For example, the mating feature 1911 may include a recess in the mount 1910 that is sized and/or shaped to receive at least a portion of the worm wheel 1912. The first side 1920A of the proximal segment 1920 may include a mating feature 1922, such as a protrusion or recess, that corresponds with a mating feature 1913 of the actuator 1904, such as a corresponding recess or protrusion. The mating feature 1922 of the first side 1920A of the proximal segment 1920 may include a protrusion extending axially inward. The mating feature 1922 may include a tab 1924 extending radially away from the protrusion and having an aperture 1926. The mating feature 1913 of the actuator 1904 may include a recess that is sized and/or shaped to receive at least a portion of the mating feature 1922 of the proximal segment 1920. The mating feature 1913 of the actuator 1904 may include a projection 1917 configured to extends towards, and be received in, the aperture 1926 of the tab 1924 of the proximal segment 1920. This arrangement can advantageously enable rotational motion of the worm wheel 1912 to be transferred to the first side 1920A of the proximal segment 1920 (e.g., on the drive side 1982 of the digit 1900).

Figure 40A:
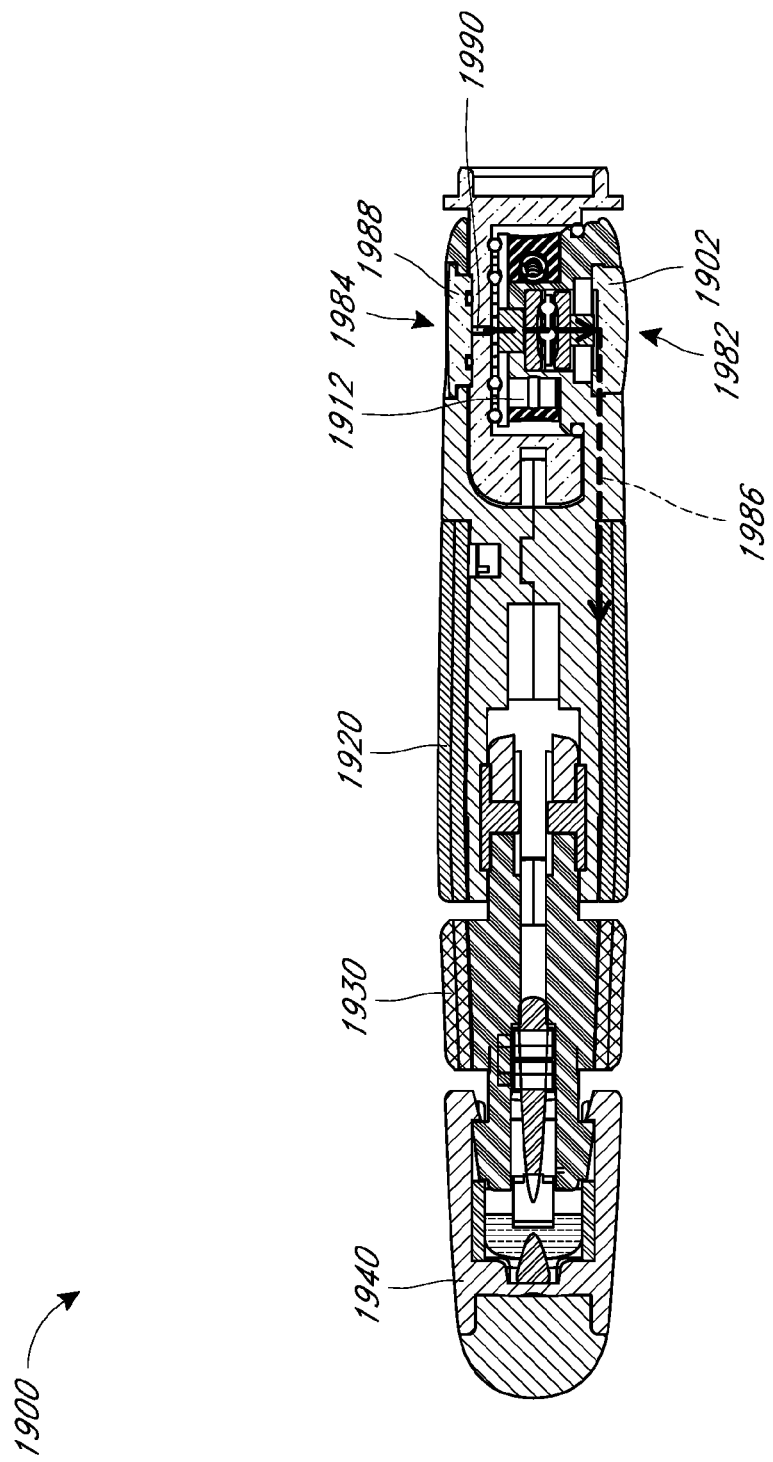
FIG. 40A is a cross-sectional top view of the prosthetic digit of FIGS. 36A-36B illustrating a line of action of the actuation force along the drive side of the prosthetic digit.
Figure 40F:
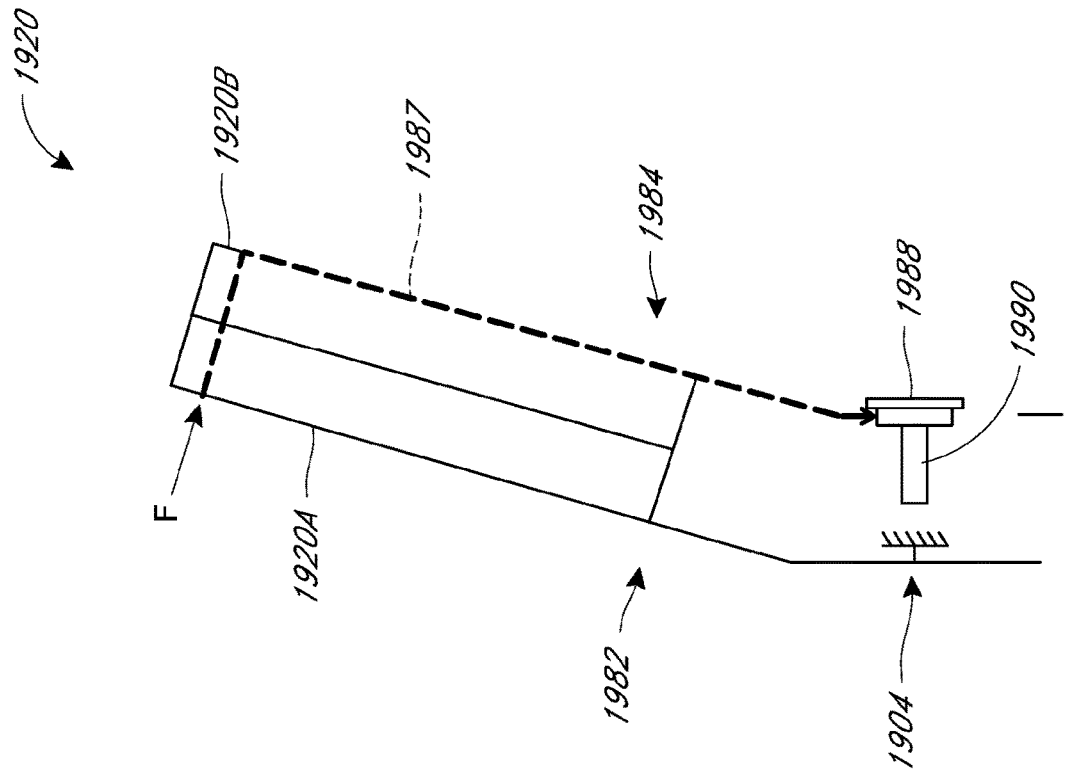
FIGS. 40E-40F illustrate schematically an unloaded configuration of the prosthetic digit of FIGS. 36A-36B and a loaded configuration in which the support side of the digit provides support to the digit in response to a threshold lateral load applied to the digit.
Figure 40E:
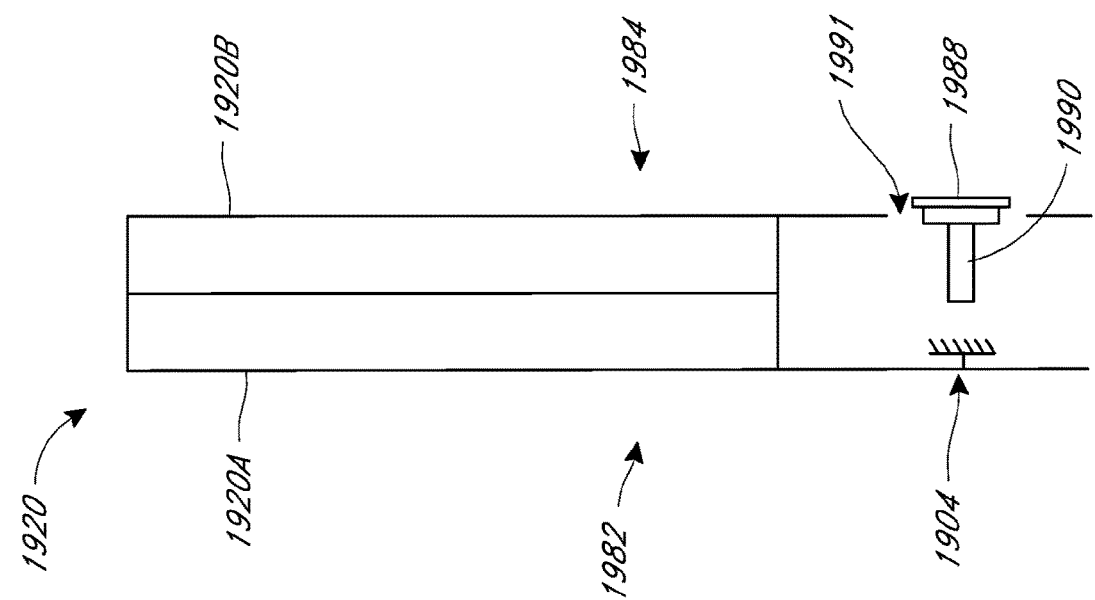

As illustrated in FIGS. 40A-40F, the digit 1900 may have a cantilever drive arrangement (e.g., one-sided drive arrangement) in which the actuator 1904 is configured to rotate the proximal segment 1920 via the drive side 1982 of the digit 1900. For example, as shown in FIGS. 40A-40B, the line of action of the actuation force or force path 1986 may extend along a first lateral side 1920A of the proximal segment 1920. The first side 1920A of the proximal segment 1920 may be configured to transmit actuation to the remainder of the proximal segment 1920. This drive arrangement may advantageously increase the efficiency of the digit 1900 during normal use.

The support side 1984 of the digit 1900 located opposite the drive side 1982 may be a non-contact support side during normal use, e.g., in the absence of a lateral load beyond a threshold lateral load being applied to the digit 1900. For example, in the absence of a lateral load beyond a threshold lateral load being applied to the digit 1900, the support side 1984 may add no frictional losses, or nominal frictional losses, to the digit 1900. During normal use, there may be a gap such that an outer portion of the bearing pin 1988 may not contact other components of the digit 1900. As illustrated schematically in FIG. 40E, when the digit 1900 is in an unloaded configuration, e.g., in the absence of a lateral load beyond a threshold lateral load being applied to the digit 1900, there is a gap 1991 laterally adjacent to the bearing pin 1988 on the support side 1984 of the digit 1900. "Lateral" as used herein may refer to directions generally parallel to the axes of rotation of the digit segments. The gap 1991 (e.g., clearance) around the bearing pin 1988 may allow the bearing pin 1988 to idle and/or rotate freely.

The support side 1984 of the digit 1900 (e.g., the second side 1920B of the proximal segment 1920) may be configured to provide support to the digit 1900 in response to a lateral load beyond a threshold lateral load being applied to the digit 1900 (e.g., to the distal segment 1940, middle segment 1930, and/or proximal segment 1920). A first bearing surface 1973 and a second bearing surface 1975 separated laterally by a gap during normal loading operations that do not satisfy a threshold lateral load may contact each other under loading conditions that satisfy the threshold lateral load. The threshold lateral load may be one quarter, one half, three quarters, one, two, three, four, five, or more pounds. For example, as illustrated schematically in FIG. 40F, when the digit 1900 is in a loaded configuration (e.g., when a lateral load F is applied to the digit 1900 beyond a threshold lateral load), the proximal segment 1920 is configured to flex laterally (e.g., deflect) to close the gap 1991 between the bearing pin 1988 and an opposing surface, and increase rotational friction of the digit 1900. The proximal segment 1920 may be configured to deflect to close the gap 1991 between a first bearing surface 1973 of the bearing pin 1988 and a second bearing surface 1975 on the second side 1920B of the proximal segment 1900 (see bearing surfaces 1973, 1975 in FIG. 39A). The first bearing surface 1973 of the bearing pin 1988 may be an outer radial edge of the bearing pin 1988. The second bearing surface 1975 of the second side 1920B of the proximal segment 1920 may be a corresponding inner radial edge of an opening in the second side 1920B (e.g., the opening that is configured to receive the bearing pin 1988). The bearing pin 1988 may be configured to slide axially along its axis of rotation to contact the second side 1920B of the proximal segment 1920 (e.g., the second bearing surface 1975) when the proximal segment 1920 flexes laterally. When the proximal segment 1920 deflects, the digit 1900 is still rotatable but receives support from the additional bearing surface formed by the bearing pin 1988 (see force path 1987 in FIG. 40F). When the proximal segment 1920 deflects, the bearing pin 1988 on the support side 1984 of the digit 1900 may serve as a stopper to prevent further movement of the digit 1900 relative to the actuator 1904.

The one-sided drive arrangement may advantageously allow the digit 1900 to be more compact (e.g., narrower) and/or may provide additional space within the digit 1900 for other components (e.g., bearings). For example, the one-sided drive arrangement may reduce the number of dynamic seals of the digit 1900 (e.g., the drive mechanism may include only one dynamic seal).

FIGS. 41A-41B illustrate the parallel arrangement of the gearbox 1903, such as a planetary gearbox, and the motor

1915 of the actuator 1904. The actuator 1904 may include a motor 1915, the planetary gearbox 1903, and one or more transfer gears 1992A, 1992B, 1992C disposed in a transfer gearbox 1906. The motor 1915 and the planetary gearbox 1903 may be positioned in parallel and connected by one or more transfer gears 1992A, 1992B, 1992C (see FIG. 41B). The motor 1915 and the planetary gearbox 1903 may extend longitudinally in parallel directions with respect to each other, and parallel or approximately parallel to a proximal segment of the digit when straightened (see, e.g., FIG. 38A). For example, the output shaft of the motor 1915 may be in mechanical communication with the planetary gearbox 1903 via a series of transfer gears 1992A, 1992B, 1992C that extend perpendicular to the motor 1915 and the planetary gearbox 1903. The gear 1992A that is coupled to the output shaft of the motor 1915 may have a smaller diameter than the transfer gear 1992B that is positioned between the output shaft of the motor 1915 and the input shaft of the planetary gearbox 1903 and/or a smaller diameter than the gear 1992C that is coupled to the input shaft of the planetary gearbox 1903. The gears 1992A, 1992B, 1992C may be disposed in the transfer gearbox 1906 beneath (e.g., proximal of) the motor 1915 and the planetary gearbox 1903 and may be protected (e.g., enclosed) by the housing 1908 of the transfer gearbox 1906. This actuator 1904 arrangement, in which the motor 1915 extends parallel to the planetary gearbox 1903, can advantageously allow the actuator 1904 to be more compact (e.g., shorter, having a smaller volume, etc.). In some embodiments, the digit 1900 may include a transfer belt in place of the one or more transfer gears 1992A, 1992B, 1992C.

The digit 1900 may include one or more position encoders (e.g., one sensor, two sensors, three sensors, four sensors, etc.), such as Hall Effect sensors, configured to measure the position of the digit 1900. The sensor(s) may be coupled to, or integrated within, the motor 1915. For example, the sensors may be disposed at the proximal end of the motor 1915. The sensor(s) may measure the position of the rotor in the motor 1915 (e.g., the relative position and/or the absolute position). The rotor position measurements may be used to calculate the position of the digit 1900.

FIGS. 42A-42C illustrate a digit tip assembly 1994. Certain portions of the digit tip assembly 1994 are omitted for clarity in FIG. 42B. The digit tip assembly 1994 may include a digit tip insert 1996 configured to be received in a corresponding channel in the distal segment 1940 of the digit 1900. The digit tip insert 1996 may be replaceable and/or removable from the distal segment 1940. The digit tip assembly 1994 may include a support member 1997 that is coupled to, or integral with, the digit tip insert 1996. The support member 1997 may be configured to extend proximally from the digit tip insert 1996 through an opening 1942 in the distal segment 1940 of the digit 1900. The support member 1997 may be used as an assembly aid to position the digit tip insert 1996 within the distal segment 1940. A portion of the support member 1997 as shown in FIG. 42C may be trimmed and/or shortened after the digit tip insert 1996 has been positioned. When the digit tip insert 1996 is coupled to the distal segment 1940, a distal portion of the distal segment 1940 may be configured to protrude distally beyond the digit tip insert 1996 when the digit tip insert 1996 is compressed (e.g., when the user applies pressure to the digit tip insert 1996 while picking up objects). This configuration can advantageously allow the user to pick up small objects.

The digit tip insert 1996 may be configured to couple to a pivot assembly 1998. The pivot assembly 1998 may be configured to couple to the pivot 1976 and to rotate about the pivot 1976. Rotation of the pivot assembly 1998 about the pivot 1976 may cause the digit tip insert 1996 and/or the distal segment 1940 to rotate.

At least a portion of the digit tip insert 1996 may be made of an elastomeric material. At least a portion of the digit tip insert 1996 may be conductive (e.g., may be coated in a conductive material). This advantageously allows the user to interact with a touch screen interface (e.g., of a phone, tablet, smart watch, etc.) using the digit tip insert 1996. The digit tip insert 1996 may be compliant and/or configured to allow the user to grip objects. The digit tip insert 1996 may allow for grip and/or pitch precision. A distal surface of the digit tip insert 1996 may include a pattern (e.g., in the form of ridges or raised surfaces). The ridges may be configured to create friction to assist the user in gripping objects. The volume within the digit tip insert 1996 may allow for retrofitting the insert 1996 (e.g., with respect to pressure, heat, vibration, touch sensor(s), etc.).

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A prosthetic digit comprising:
a mount configured to attach to a hand;
a proximal segment, a middle segment, and a distal segment, with the proximal segment rotatably attached to the mount, and the middle segment rotatably attached to the proximal and distal segments, wherein the proximal segment has a drive side configured to be actuated to rotate the proximal segment and a support side configured to provide rotational resistance to the digit in response to a threshold lateral load applied to the digit;
a link rotatably attached to the mount and rotatably attached to the middle segment, the link comprising a flexible portion at a distal portion thereof and configured to flex in response to a threshold rotational force applied to the digit; and
an actuator coupled with the mount and configured to rotate the proximal segment via the drive side, wherein the actuator comprises a motor and a gearbox in parallel and mechanically connected by a series of gears.

2. The prosthetic digit of claim 1, wherein the link further comprises a proximal link and a distal link, and the distal link comprises the flexible portion.

3. The prosthetic digit of claim 2, wherein the distal link is rotatably attached to the proximal link and the distal segment.

4. The prosthetic digit of claim 2, wherein the proximal link comprises a dogleg.

5. The prosthetic digit of claim 1, wherein rotation of the proximal segment causes the proximal, middle, and distal segments to rotate simultaneously.

6. The prosthetic digit of claim 1, wherein the actuator further comprises an extension spring and a worm wheel, wherein the extension spring is configured to rotationally bias the worm wheel in an angular direction.

7. The prosthetic digit of claim 1, further comprising a thrust bearing configured to provide the rotational resistance in response to the threshold lateral load applied to the digit.

8. The prosthetic digit of claim 1, further comprising an elastomeric digit tip insert configured to couple to the distal segment, wherein at least a portion of the insert is conductive.

9. A prosthetic digit comprising:
a mount configured to attach to a hand;
a proximal segment, a middle segment, and a distal segment, with the proximal segment rotatably attached to the mount, and the middle segment rotatably attached to the proximal and distal segments, wherein the proximal segment has a drive side configured to transmit actuation to the proximal segment and a support side configured to provide support to the digit in response to a threshold lateral load applied to the digit, wherein the support side comprises a first opposing surface separated from a second opposing surface by a gap therebetween, and wherein under a lateral load applied to the digit beyond a threshold lateral load the proximal segment is configured to flex laterally to close the gap such that the first and second opposing surfaces contact each other and increase rotational friction of the digit;
a link rotatably attached to the mount and rotatably attached to the middle segment, the link comprising a flexible portion; and
an actuator coupled with the mount and configured to rotate the proximal segment via the drive side, wherein the actuator comprises a motor and a gearbox in parallel and mechanically connected by a series of gears.

10. The prosthetic digit of claim 9, wherein the link further comprises a proximal link and a distal link, and the distal link comprises the flexible portion.

11. The prosthetic digit of claim 10, wherein the distal link is rotatably attached to the proximal link and the distal segment.

12. The prosthetic digit of claim 9, wherein rotation of the proximal segment causes the proximal, middle, and distal segments to rotate simultaneously.

13. The prosthetic digit of claim 9, wherein the actuator further comprises an extension spring and a worm wheel, wherein the extension spring is configured to rotationally bias the worm wheel in an angular direction.

14. The prosthetic digit of claim 9, further comprising a thrust bearing configured to provide rotational motion while taking an axial force.

15. The prosthetic digit of claim 9, further comprising an elastomeric digit tip insert configured to couple to the distal segment, wherein at least a portion of the insert is conductive.

16. A prosthetic digit comprising:
a mount configured to attach to a hand;
a proximal segment, a middle segment, and a distal segment, with the proximal segment rotatably attached to the mount, and the middle segment rotatably attached to the proximal and distal segments, wherein the proximal segment has a drive side configured to be actuated to rotate the proximal segment and a support side configured to provide rotational resistance to the digit in response to a threshold lateral load applied to the digit;
a link rotatably attached to the mount and the middle segment, the link comprising a flexible portion configured to flex in response to a threshold rotational force applied to the digit; and
an actuator coupled with the mount and configured to rotate the proximal segment via the drive side, wherein the actuator comprises a motor extending parallel to a planetary gearbox, wherein an output shaft of the motor is in mechanical communication with the planetary gearbox by a series of transfer gears located at a first end of the motor and planetary gearbox and that extend perpendicular to the motor and planetary gearbox.

17. The prosthetic digit of claim 16, wherein the link further comprises a proximal link and a distal link, and the distal link comprises the flexible portion.

18. The prosthetic digit of claim 17, wherein the distal link is rotatably attached to the proximal link and the distal segment.

19. The prosthetic digit of claim 16, wherein a longitudinal axis of the motor extends parallel to a longitudinal axis of the gearbox.

20. The prosthetic digit of claim 16, wherein a longitudinal axis of the motor extends perpendicular to a longitudinal axis of a transfer gearbox housing the series of transfer gears.

21. The prosthetic digit of claim 16, wherein rotation of the proximal segment causes the proximal, middle, and distal segments to rotate simultaneously.

22. The prosthetic digit of claim 16, wherein the actuator further comprises an extension spring and a worm wheel, wherein the extension spring is configured to rotationally bias the worm wheel in an angular direction.

23. The prosthetic digit of claim 16, further comprising a thrust bearing configured to provide the rotational resistance in response to the threshold lateral load applied to the digit.

24. The prosthetic digit of claim 16, further comprising an elastomeric digit tip insert configured to couple to the distal segment, wherein at least a portion of the insert is conductive.

* * * * *